(12) United States Patent
Bromberg et al.

(10) Patent No.: US 12,076,918 B2
(45) Date of Patent: Sep. 3, 2024

(54) ADDITIVE MANUFACTURING APPARATUSES AND METHODS FOR USING THE SAME

(71) Applicant: General Electric Company, Schenectady, NY (US)

(72) Inventors: Vadim Bromberg, Niskayuna, NY (US); John Sterle, Clifton Park, NY (US); Victor Fulton, Amelia, OH (US); Tyler Andrew Griffith, Norwood, OH (US); Peter Douglas Lueschen, Covington, KY (US); Carlos H. Bonilla, Lebanon, OH (US); Joseph L. Smolenski, Singerlands, NY (US); Timothy Francis Andrews, Sharonville, OH (US); Younkoo Jeong, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 112 days.

(21) Appl. No.: 17/608,809

(22) PCT Filed: May 22, 2020

(86) PCT No.: PCT/US2020/034259
§ 371 (c)(1),
(2) Date: Nov. 4, 2021

(87) PCT Pub. No.: WO2020/237165
PCT Pub. Date: Nov. 26, 2020

(65) Prior Publication Data
US 2022/0314329 A1    Oct. 6, 2022

Related U.S. Application Data

(60) Provisional application No. 62/851,946, filed on May 23, 2019.

(51) Int. Cl.
*B33Y 30/00* (2015.01)
*B22F 10/68* (2021.01)
(Continued)

(52) U.S. Cl.
CPC ............ *B29C 64/153* (2017.08); *B22F 10/68* (2021.01); *B22F 10/73* (2021.01); *B22F 10/80* (2021.01);
(Continued)

(58) Field of Classification Search
CPC ... B29C 64/165; B29C 64/364; B29C 64/371; B29C 64/386; B29C 64/393
See application file for complete search history.

(56) References Cited

U.S. PATENT DOCUMENTS

| 4,034,219 A | 7/1977 | Louden et al. |
| 4,680,895 A | 7/1987 | Roestenberg |

(Continued)

FOREIGN PATENT DOCUMENTS

| CN | 204366039 U | 6/2015 |
| CN | 106862570 A | 6/2017 |

(Continued)

OTHER PUBLICATIONS

International Search Report and Written Opinion for application PCT/US2020/034254 mail date Aug. 24, 2020 (14 pages).
(Continued)

*Primary Examiner* — Xiao S Zhao
*Assistant Examiner* — Nicholas J Chidiac
(74) *Attorney, Agent, or Firm* — Dinsmore & Shohl LLP

(57) ABSTRACT

Additive manufacturing apparatuses are disclosed. In one embodiment, an additive manufacturing apparatus may comprise a support chassis including a print bay, a build bay, and a material supply bay. Each bay may comprise an upper compartment and a lower compartment. A working surface
(Continued)

may separate each of the print bay, the build bay, and the material supply bay into the upper compartment and the lower compartment, wherein: the build bay may be disposed between the print bay and the material supply bay. The lower compartment of the build bay comprises bulkheads sealing the lower compartment of the build bay from the lower compartment of the print bay and the lower compartment of the material supply bay.

18 Claims, 32 Drawing Sheets

(51) Int. Cl.

| | | |
|---|---|---|
| *B22F 10/73* | (2021.01) | |
| *B22F 10/80* | (2021.01) | |
| *B22F 12/00* | (2021.01) | |
| *B22F 12/17* | (2021.01) | |
| *B22F 12/52* | (2021.01) | |
| *B22F 12/53* | (2021.01) | |
| *B22F 12/55* | (2021.01) | |
| *B22F 12/63* | (2021.01) | |
| *B22F 12/67* | (2021.01) | |
| *B22F 12/70* | (2021.01) | |
| *B22F 12/90* | (2021.01) | |
| *B28B 1/00* | (2006.01) | |
| *B29C 64/153* | (2017.01) | |
| *B33Y 40/00* | (2020.01) | |
| *B33Y 50/00* | (2015.01) | |

(52) U.S. Cl.
CPC ............ *B22F 12/222* (2021.01); *B22F 12/38* (2021.01); *B22F 12/53* (2021.01); *B22F 12/70* (2021.01); *B22F 12/90* (2021.01); *B28B 1/001* (2013.01); *B33Y 30/00* (2014.12); *B33Y 40/00* (2014.12); *B33Y 50/00* (2014.12); *B22F 12/17* (2021.01); *B22F 12/52* (2021.01); *B22F 12/55* (2021.01); *B22F 12/63* (2021.01); *B22F 12/67* (2021.01)

(56) References Cited

U.S. PATENT DOCUMENTS

| | | | |
|---|---|---|---|
| 4,722,824 A | 2/1988 | Wiech, Jr. | |
| 4,853,717 A | 8/1989 | Harmon et al. | |
| 5,204,055 A | 4/1993 | Sachs et al. | |
| 5,234,636 A | 8/1993 | Hull et al. | |
| 5,387,380 A | 2/1995 | Cima et al. | |
| 5,610,824 A | 3/1997 | Vinson et al. | |
| 5,672,579 A | 9/1997 | Diaz et al. | |
| 5,810,988 A | 9/1998 | Smith, Jr. et al. | |
| 5,847,283 A | 12/1998 | Finot et al. | |
| 5,902,537 A | 5/1999 | Almquist et al. | |
| 5,997,128 A | 12/1999 | Lou et al. | |
| 6,007,318 A | 12/1999 | Russell et al. | |
| 6,146,567 A | 11/2000 | Sachs et al. | |
| 6,158,838 A | 12/2000 | Capurso | |
| 6,159,085 A | 12/2000 | Hara | |
| 6,164,751 A | 12/2000 | Griffin et al. | |
| 6,241,337 B1 | 6/2001 | Sharma et al. | |
| 6,372,178 B1 | 4/2002 | Tseng | |
| 6,375,874 B1 | 4/2002 | Russell et al. | |
| 6,406,122 B1 | 6/2002 | Sharma et al. | |
| 6,416,850 B1 | 7/2002 | Bredt et al. | |
| 6,454,811 B1 | 9/2002 | Sherwood et al. | |
| 6,471,800 B2 * | 10/2002 | Jang ..................... | B29C 64/40 156/305 |
| 6,497,471 B1 | 12/2002 | Gargir | |
| 6,595,618 B1 | 7/2003 | Roy et al. | |
| 6,596,224 B1 | 7/2003 | Sachs et al. | |
| 6,764,636 B1 | 7/2004 | Allanic et al. | |
| 6,896,839 B2 | 5/2005 | Kubo et al. | |
| 6,899,777 B2 | 5/2005 | Vaidyanathan et al. | |
| 6,986,654 B2 | 1/2006 | Imiolek et al. | |
| 6,989,115 B2 | 1/2006 | Russell et al. | |
| 7,037,382 B2 | 5/2006 | Davidson et al. | |
| 7,225,803 B2 | 6/2007 | Boyadjieff | |
| 7,291,002 B2 | 11/2007 | Russell et al. | |
| 7,296,990 B2 | 11/2007 | Devos et al. | |
| 7,387,359 B2 | 6/2008 | Hernandez et al. | |
| 7,389,154 B2 | 6/2008 | Hunter et al. | |
| 7,435,368 B2 | 10/2008 | Davidson et al. | |
| 7,520,740 B2 | 4/2009 | Wahlstrom et al. | |
| 7,665,636 B2 | 2/2010 | Ederer et al. | |
| 7,686,995 B2 | 3/2010 | Davidson et al. | |
| 7,690,909 B2 | 4/2010 | Wahlstrom | |
| 7,700,020 B2 | 4/2010 | Nielsen et al. | |
| 7,736,578 B2 | 6/2010 | Ederer | |
| 7,790,093 B2 | 9/2010 | Shkolnik et al. | |
| 7,824,001 B2 | 11/2010 | Fienup et al. | |
| 7,897,074 B2 | 3/2011 | Batchelder et al. | |
| 7,962,238 B2 | 6/2011 | Shkolnik et al. | |
| 7,979,152 B2 | 7/2011 | Davidson | |
| 8,017,055 B2 | 9/2011 | Davidson et al. | |
| 8,033,812 B2 | 10/2011 | Collins et al. | |
| 8,105,527 B2 | 1/2012 | Wahlstrom | |
| 8,167,395 B2 | 5/2012 | Fienup et al. | |
| 8,185,229 B2 | 5/2012 | Davidson | |
| 8,862,260 B2 | 10/2014 | Shkolnik et al. | |
| 8,979,244 B2 | 3/2015 | Kritchman et al. | |
| 8,997,799 B2 | 4/2015 | Hodson et al. | |
| 9,193,164 B2 | 11/2015 | Kritchman et al. | |
| 9,403,322 B2 | 8/2016 | Das et al. | |
| 9,415,443 B2 | 8/2016 | Ljungblad et al. | |
| 9,434,838 B2 | 9/2016 | Jung et al. | |
| 9,446,448 B2 | 9/2016 | Mccoy et al. | |
| 9,561,622 B2 | 2/2017 | Das et al. | |
| 9,586,364 B2 | 3/2017 | El-Siblani et al. | |
| 9,757,831 B2 | 9/2017 | Ederer et al. | |
| 9,912,915 B2 | 3/2018 | Sinclair | |
| 9,956,612 B1 | 5/2018 | Redding et al. | |
| 9,962,767 B2 | 5/2018 | Buller et al. | |
| 10,000,009 B2 | 6/2018 | Maier | |
| 10,022,794 B1 | 7/2018 | Redding et al. | |
| 10,022,795 B1 | 7/2018 | Redding et al. | |
| 10,029,440 B2 | 7/2018 | Satoh | |
| 10,073,434 B1 | 9/2018 | Hollander | |
| 10,166,718 B2 * | 1/2019 | Park ..................... | B22F 10/73 |
| 10,232,443 B2 | 3/2019 | Myerberg et al. | |
| 10,737,326 B2 * | 8/2020 | Kaneko ................. | B23K 26/14 |
| 10,928,876 B2 * | 2/2021 | Liarte .................. | B29C 64/153 |
| 11,072,027 B2 * | 7/2021 | Juan ..................... | B29C 64/255 |
| 11,548,221 B2 * | 1/2023 | Freiderikos ........... | B29C 64/106 |
| 11,583,930 B2 * | 2/2023 | Lin ....................... | B22F 12/60 |
| 2001/0050448 A1 | 12/2001 | Kubo et al. | |
| 2002/0062909 A1 * | 5/2002 | Jang ..................... | B33Y 10/00 156/307.3 |
| 2002/0079601 A1 | 6/2002 | Russell et al. | |
| 2002/0089081 A1 | 7/2002 | Fong | |
| 2004/0145623 A1 | 7/2004 | Choi | |
| 2004/0160472 A1 | 8/2004 | Khalid et al. | |
| 2004/0173946 A1 | 9/2004 | Pfeifer et al. | |
| 2004/0263557 A1 | 12/2004 | Premnath et al. | |
| 2006/0098040 A1 | 5/2006 | Kang | |
| 2006/0246222 A1 | 11/2006 | Winkler | |
| 2007/0077323 A1 | 4/2007 | Stonesmith et al. | |
| 2008/0190905 A1 | 8/2008 | Heinlein | |
| 2008/0200104 A1 | 8/2008 | Chuang | |
| 2008/0241404 A1 | 10/2008 | Allaman et al. | |
| 2010/0151136 A1 | 6/2010 | Davidson et al. | |
| 2011/0074866 A1 | 3/2011 | Imamura et al. | |
| 2011/0190923 A1 | 8/2011 | Matsui et al. | |
| 2012/0274701 A1 | 11/2012 | Zhou et al. | |
| 2013/0000553 A1 | 1/2013 | Hoechsmann et al. | |
| 2014/0092172 A1 | 4/2014 | Ikoshi et al. | |
| 2014/0220168 A1 | 8/2014 | Perez et al. | |
| 2015/0145177 A1 | 5/2015 | El-Siblani et al. | |
| 2015/0151973 A1 | 6/2015 | Lee et al. | |
| 2015/0258706 A1 | 9/2015 | Okamoto et al. | |
| 2015/0266242 A1 | 9/2015 | Comb et al. | |

(56) References Cited

U.S. PATENT DOCUMENTS

| | | | |
|---|---|---|---|
| 2015/0273762 A1 | 10/2015 | Okamoto | |
| 2015/0343533 A1 | 12/2015 | Park et al. | |
| 2016/0039207 A1 | 2/2016 | Kritchman et al. | |
| 2016/0067929 A1 | 3/2016 | Park | |
| 2016/0075085 A1 | 3/2016 | Sasaki | |
| 2016/0151973 A1 | 6/2016 | Jover et al. | |
| 2016/0214320 A1 | 7/2016 | Sasaki et al. | |
| 2016/0221263 A1 | 8/2016 | Din et al. | |
| 2016/0221269 A1 | 8/2016 | Okamoto et al. | |
| 2016/0325496 A1 | 11/2016 | De Pena et al. | |
| 2016/0325503 A1 | 11/2016 | Mironets et al. | |
| 2016/0332380 A1 | 11/2016 | De Pena et al. | |
| 2016/0361874 A1* | 12/2016 | Park | B29C 64/357 |
| 2016/0368054 A1 | 12/2016 | Ng et al. | |
| 2016/0368214 A1 | 12/2016 | Sasaki et al. | |
| 2017/0014911 A1 | 1/2017 | Ng et al. | |
| 2017/0021569 A1 | 1/2017 | Puigardeu Aramendia et al. | |
| 2017/0056974 A1 | 3/2017 | Miyashita et al. | |
| 2017/0072644 A1 | 3/2017 | Ng et al. | |
| 2017/0095980 A1 | 4/2017 | Kritchman et al. | |
| 2017/0100937 A1 | 4/2017 | Ohnishi | |
| 2017/0115594 A1 | 4/2017 | Martin | |
| 2017/0136695 A1 | 5/2017 | Versluys et al. | |
| 2017/0203513 A1 | 7/2017 | Chanclon et al. | |
| 2017/0217104 A1 | 8/2017 | Cortes I Herms et al. | |
| 2017/0239889 A1 | 8/2017 | Ganapathiappan et al. | |
| 2017/0239932 A1 | 8/2017 | Knecht et al. | |
| 2017/0252975 A1 | 9/2017 | Park | |
| 2017/0259456 A1 | 9/2017 | Sasaki et al. | |
| 2017/0305142 A1 | 10/2017 | Yamaguchi | |
| 2017/0318186 A1 | 11/2017 | Morovic et al. | |
| 2017/0326792 A1 | 11/2017 | Paternoster et al. | |
| 2017/0334138 A1 | 11/2017 | Vilajosana et al. | |
| 2017/0341365 A1 | 11/2017 | De Lajudie et al. | |
| 2017/0355137 A1 | 12/2017 | Ederer et al. | |
| 2017/0368756 A1 | 12/2017 | Sanz Ananos et al. | |
| 2018/0001559 A1 | 1/2018 | Paternoster et al. | |
| 2018/0001567 A1* | 1/2018 | Juan | B29C 64/259 |
| 2018/0004192 A1 | 1/2018 | Perret et al. | |
| 2018/0009157 A1 | 1/2018 | Gutierrez et al. | |
| 2018/0009167 A1 | 1/2018 | Alejandre et al. | |
| 2018/0011475 A1 | 1/2018 | Donovan et al. | |
| 2018/0071820 A1 | 3/2018 | Natarajan et al. | |
| 2018/0079137 A1 | 3/2018 | Herzog et al. | |
| 2018/0126632 A1 | 5/2018 | Bonatsos et al. | |
| 2018/0141271 A1 | 5/2018 | Gunther et al. | |
| 2018/0154480 A1 | 6/2018 | Bai et al. | |
| 2018/0193947 A1 | 7/2018 | Harding et al. | |
| 2018/0200791 A1 | 7/2018 | Redding et al. | |
| 2018/0236549 A1 | 8/2018 | Spears et al. | |
| 2018/0283323 A1* | 10/2018 | Wada | F02M 27/04 |
| 2018/0311898 A1 | 11/2018 | Schwarzbaum et al. | |
| 2018/0326660 A1 | 11/2018 | Gifford et al. | |
| 2018/0339467 A1 | 11/2018 | Donovan et al. | |
| 2018/0370213 A1 | 12/2018 | Gold et al. | |
| 2019/0001571 A1 | 1/2019 | Stockett et al. | |
| 2019/0022752 A1 | 1/2019 | Twelves, Jr. et al. | |
| 2019/0091766 A1 | 3/2019 | Kasperchik et al. | |
| 2019/0111619 A1 | 4/2019 | Schalk et al. | |
| 2019/0118468 A1* | 4/2019 | Bobar | B22F 12/37 |
| 2019/0126554 A1 | 5/2019 | Iwase | |
| 2019/0129484 A1* | 5/2019 | Liarte | B22F 12/20 |
| 2019/0134707 A1* | 5/2019 | Kaneko | B23K 26/082 |
| 2020/0188307 A1* | 6/2020 | Freiderikos | B33Y 40/00 |
| 2021/0094102 A1* | 4/2021 | Lin | B33Y 40/00 |
| 2021/0221052 A1* | 7/2021 | Berger | G06T 7/70 |

FOREIGN PATENT DOCUMENTS

| | | |
|---|---|---|
| CN | 107175827 A | 9/2017 |
| CN | 107364126 A | 11/2017 |
| CN | 108165961 A | 6/2018 |
| CN | 108927491 A | 12/2018 |
| EP | 1018429 A1 | 7/2000 |
| EP | 1108546 A1 | 6/2001 |
| EP | 1270185 A1 | 1/2003 |
| EP | 1440803 A1 | 7/2004 |
| EP | 1946907 A2 | 7/2008 |
| EP | 2543514 A2 | 1/2013 |
| EP | 3168035 A1 | 5/2017 |
| EP | 3205483 A1 | 8/2017 |
| EP | 3486008 A1 | 5/2019 |
| GB | 2550341 A | 11/2017 |
| GB | 2568518 A | 5/2019 |
| JP | H11157087 A | 6/1999 |
| JP | 2001334582 A | 12/2001 |
| JP | 2003508246 A | 3/2003 |
| JP | 2003211687 A | 7/2003 |
| JP | 2005319650 A | 11/2005 |
| JP | 2008086846 A | 4/2008 |
| JP | 2014065179 A | 4/2014 |
| JP | 2014527481 A | 10/2014 |
| JP | 2015174338 A | 10/2015 |
| JP | 2015182428 A | 10/2015 |
| JP | 2015193184 A | 11/2015 |
| JP | 2016093909 A | 5/2016 |
| JP | 2016107543 A | 6/2016 |
| JP | 2016141151 A | 8/2016 |
| JP | 2017508063 A | 3/2017 |
| JP | 2018503543 A | 2/2018 |
| JP | 2018516774 A | 6/2018 |
| JP | 2018520029 A | 7/2018 |
| JP | 2018523595 A | 8/2018 |
| JP | 2018526527 A | 9/2018 |
| WO | 20010117783 A1 | 3/2001 |
| WO | 2015100085 A2 | 7/2015 |
| WO | 2015151832 A1 | 10/2015 |
| WO | 2017023281 A1 | 2/2017 |
| WO | 2017177603 A1 | 10/2017 |
| WO | 2017196337 A1 | 11/2017 |
| WO | 2018026011 A1 | 2/2018 |
| WO | 2018072975 A1 | 4/2018 |
| WO | 2018091007 A1 | 5/2018 |
| WO | 2018143953 A1 | 8/2018 |
| WO | 2018194688 A1 | 10/2018 |
| WO | 2018231205 A1 | 12/2018 |
| WO | 2019027405 A1 | 2/2019 |
| WO | 2019027431 A1 | 2/2019 |
| WO | 2019059099 A1 | 3/2019 |
| WO | 2019066781 A1 | 4/2019 |
| WO | 2019194795 A1 | 10/2019 |
| WO | 2020237161 A1 | 11/2020 |

OTHER PUBLICATIONS

International Search Report and Written Opinion for application PCT/US2020/034261 mail date Jan. 29, 2021 (32 pages).
Japanese Office Action for Application No. 2021-567071 dated Nov. 29, 2022 (8 pages).
International Search Report and Written Opinion for application PCT/US2020/034144 mail date Jan. 13, 2021 (22 pages).
International Search Report and Written Opinion for application PCT/US2020/034207 mail date Sep. 1, 2020 (16 pages).
International Search Report and Written Opinion for application PCT/US2020/034205 mail date Nov. 13, 2020 (23 pages).
Japanese Patent Office Action for Application No. 2021-567073 dated Dec. 6, 2022 (5 pages).
International Search Report and Written Opinion for application PCT/US2020/034189 mail date Oct. 1, 2020 (24 pages).
International Search Report and Written Opinion for application PCT/US2020/034204 mail date Sep. 2, 2020 (15 pages).
International Search Report and Written Opinion for application PCT/US2020/034244 mail date Nov. 12, 2020 (23 pages).
Hewlett Packard Thermal Inkjet Printhead information sheet, undated (1 page).
International Search Report and Written Opinion for application PCT/US2020/034145 mail date Dec. 1, 2020 (21 pages).
International Search Report and Written Opinion for application PCT/US2020/034259 mail date of Dec. 1, 2020 (23 pages).
International Search Report and Written Opinion application PCT/US2020/034142 mail date Aug. 20, 2020 (15 pages).

(56) References Cited

OTHER PUBLICATIONS

International Search Report and Written Opinion for application PCT/US2020/034141 mail date Aug. 20, 2020 (27 pages).
Mercedes-Benz USA: "Magic Vision Control—Mercedes-Benz Windshield Wipers", YouTube, dated Nov. 21, 2013 (Nov. 21, 2013), pp. 1-1, XP054980752, Retrieved from the Internet: URL:https://www.youtube.com/watch?v=07AZHkkLR0k [retrieved on Aug. 5, 2020] 0:13-0:40.
International Search Report and Written Opinion for application PCT/US2020/034140 mail date Nov. 27, 2020 (21 pages).
Hewlett Packard HP LaserJet Pro M404 Series information sheet, undated, https://www8.hp.com/h20195/v2/GetPDF.aspx/4AA7-4955EEP.pdf (5 pages).
"Solution Preparation Guidelines" The Sekisui Chemical Group, httpswww.sekisui-sc.comwp-contentuploadsSelvolPVOH_SolutionPreparationGuidelines_EN.pdf.
Cooke et al., "Process Intermittent Measurement for Powder-Bed Based Additive Manufacturing" National Institute of Standards and Technology, Gaithersburg, MD 208991, Institute for Research in Electronics and Applied Physics, University of Maryland, College Park, MD 20742-3511., Aug. 17, 2011.
Hong et al., "Solvent Effect on Structural Change of Poly(vinyl alcohol) Physical Gels" Journal of Applied Polymer Science • Sep. 1998, DOI: 10.1002/(SICI)1097-4628(19980919)69:123.0.CO;2-U.
Shanjani et al., "Material Spreading and Compaction in Powder-Based Solid Freeform Fabrication Methods: Mathematical Modeling" Department of Mechanical and Mechatronics Engineering, University of Waterloo, 200 University Avenue West Waterloo, ON N2L 3G1, Canada, Sep. 10, 2008.
Sparrow, "Evonik, Voxeljet partner to develop 3D-printing systems for series production of finished plastic parts", Plastics Today, Nov. 10, 2019, https://www.plasticstoday.com/3d-printing/evonik-voxeljet-partner-develop-3d-printing-systems-series-production-finished-plastic.
"Advanced DLP for Superior 3D Printing" EnvisionTec, Mar. 9, 2017.
European Patent Office Action for Application No. 20735467.1 dated Mar. 16, 2023 (4 pages).
European Patent Office Action for Application No. 20732377.5 dated Mar. 9, 2023 (5 pages).

* cited by examiner

ADDITIVE MANUFACTURING APPARATUSES AND METHODS FOR USING THE SAME

CROSS REFERENCE TO RELATED APPLICATIONS

The present specification is a National Phase Entry of International Application No. PCT/US2020/034259 filed May 22, 2020 entitled "Additive Manufacturing Apparatuses And Methods For Using The Same" which claims the benefit of U.S. Provisional Patent Application Ser. No. 62/851,946 filed May 23, 2019 and entitled "Additive Manufacturing Apparatuses And Methods For Using The Same", each of which are incorporated by reference herein in their entireties.

FIELD

The present specification generally relates to additive manufacturing apparatuses and methods for using the same.

TECHNICAL BACKGROUND

Additive manufacturing apparatuses may be utilized to "build" an object from build material, such as organic or inorganic powders, in a layer-wise manner. Early iterations of additive manufacturing apparatuses were used for prototyping 3 dimensional objects. However, as additive manufacturing technology has improved, there is an increased interest in utilizing additive manufacturing apparatuses for large-scale commercial production of objects. One issue of scaling additive manufacturing apparatuses to commercial production is improving the throughput of additive manufacturing apparatuses to meet commercial demands.

Accordingly, a need exists for alternative additive manufacturing apparatuses and components thereof that improve manufacturing throughput.

SUMMARY

A first aspect A1 includes an actuator assembly for distributing build material and depositing binder material in an additive manufacturing apparatus comprising an upper support; a lower support spaced from the upper support in a vertical direction, the upper support and the lower support extending in a horizontal direction; a recoat head for distributing build material; a print head for depositing binder material; a recoat head actuator coupled to the recoat head and one of the upper support and the lower support, the recoat head actuator comprising a recoat motion axis, wherein the recoat head actuator is bi-directionally actuatable along the recoat motion axis thereby effecting bi-directional movement of the recoat head; and a print head actuator coupled to the print head and the other of the upper support and the lower support, the print head actuator comprising a print motion axis, wherein the print head actuator is bi-directionally actuatable along the print motion axis thereby effecting bi-directional movement of the print head, wherein the recoat motion axis and the print motion axis are parallel to one another and spaced apart from one another in the vertical direction.

A second aspect A2 includes the actuator assembly of the first aspect A1, wherein the upper support and the lower support are positioned on opposite sides of a support rail.

A third aspect A3 includes the actuator assembly of any of the foregoing aspects A1-A2, wherein the recoat motion axis and the print motion axis are in the same vertical plane.

A fourth aspect A4 includes the actuator assembly of any of the foregoing aspects A1-A3, wherein the actuator assembly further comprises an intermediate support positioned between the upper support and the lower support, the intermediate support extending in the horizontal direction; a process accessory; and an accessory actuator coupled to the process accessory and the intermediate support, the accessory actuator comprising an accessory motion axis, wherein the accessory actuator is bi-directionally actuatable along the accessory motion axis thereby effecting bi-directional movement of the process accessory, wherein the recoat motion axis, the print motion axis, and the accessory motion axis are parallel to one another and spaced apart from one another in the vertical direction.

A fifth aspect A5 includes the actuator assembly of any of the foregoing aspects A1-A4, wherein the process accessory comprises a sensor, an energy source, an end effector or combinations thereof.

A sixth aspect A6 includes the actuator assembly of any of the foregoing aspects A1-A5, wherein the sensor is at least one of an image sensor, a thermal detector, a pyrometer, a profilometer, and an ultrasonic detector.

A seventh aspect A7 includes the actuator assembly of any of the foregoing aspects A1-A6, wherein sensor is at least one of an infrared heater, an ultraviolet lamp, and a laser light source.

An eighth aspect A8 includes the actuator assembly of any of the foregoing aspects A1-A7, wherein: the recoat head comprises a recoat home position; the print head comprises a print home position spaced apart from the recoat home position in the horizontal direction; and a control system is communicatively coupled to the recoat head actuator and the print head actuator, the control system comprising a processor and a non-transitory memory storing computer readable and executable instructions that, when executed by the processor, cause: the recoat head actuator to advance the recoat head from the recoat home position towards the print home position at a recoat advance rate; the recoat head actuator to return the recoat head to the recoat home position at a recoat return rate; the print head actuator to advance the print head from the print home position of the print head towards the recoat home position at a print advance rate; and the print head actuator to return the print head to the print home position at a print return rate.

A ninth aspect A9 includes the actuator assembly of any of the foregoing aspects A1-A8 claim 8, wherein the recoat return rate is greater than the recoat advance rate.

A tenth aspect A10 includes the actuator assembly of any of the foregoing aspects A1-A9, wherein the print return rate is greater than or equal to the print advance rate.

An eleventh aspect A11 includes the actuator assembly of any of the foregoing aspects A1-A10, wherein the print return rate is less than or equal to the print advance rate.

A twelfth aspect A12 includes the actuator assembly of any of the foregoing aspects A1-A11, wherein the recoat advance rate comprises: an initial recoat advance rate; and a distribution advance rate, wherein the initial recoat advance rate is greater than the distribution advance rate.

A thirteenth aspect A13 includes the actuator assembly of any of the foregoing aspects A1-A12, wherein the print advance rate comprises: an initial print head advance rate; and a deposition advance rate, wherein the initial print head advance rate is greater than the deposition advance rate.

A fourteenth aspect A14 includes the actuator assembly of any of the foregoing aspects A1-A13, wherein the print return rate comprises: a deposition return rate; and a print complete return rate, wherein the print complete return rate is greater than the deposition return rate.

A fifteenth aspect A15 includes the actuator assembly of any of the foregoing aspects A1-A14, wherein the print head is advanced from the print home position towards the recoat home position while the recoat head is returned to the recoat home position.

A sixteenth aspect A16 includes the actuator assembly of any of the foregoing aspects A1-A15, wherein the recoat head is advanced from the recoat home position towards the print home position while the print head is returned to the print home position of the print head.

A seventeenth aspect A17 includes the actuator assembly of any of the foregoing aspects A1-A16, wherein the recoat head comprises at least one of a wiper and a roller for distributing build material.

An eighteenth aspect A18 includes the actuator assembly of any of the foregoing aspects A1-A17, wherein the recoat head comprises a leading roller and a trailing roller for distributing build material.

A nineteenth aspect A19 includes the actuator assembly of any of the foregoing aspects A1-A18, wherein the leading roller rotates in a first direction and the trailing roller rotates in a second direction opposite the first direction.

A twentieth aspect A20 includes the actuator assembly of any of the foregoing aspects A1-A19, wherein the recoat head comprises at least one energy source.

A twenty-first aspect A21 includes the actuator assembly of any of the foregoing aspects A1-A20, wherein the print head is a thermal print head or a piezo print head.

A twenty-second aspect A22 includes the actuator assembly of any of the foregoing aspects A1-A21, wherein the print head is fixed in directions orthogonal to the print motion axis.

A twenty-third aspect A23 includes an additive manufacturing apparatus comprising: a cleaning station comprising a cleaning station cycle time; a build platform; a recoat head for distributing build material, the recoat head coupled to a recoat head actuator comprising a recoat motion axis, the recoat head and recoat head actuator comprising a recoat cycle time; and a print head for depositing binder material, the print head coupled to a print head actuator comprising a print motion axis, the print head and the print head actuator comprising a print cycle time, wherein: the recoat motion axis and the print motion axis are parallel to one another and spaced apart from one another in a vertical direction; and the additive manufacturing apparatus comprises an overall build cycle time that is less than the sum of cleaning station cycle time, the recoat cycle time, and the print cycle time.

A twenty-fourth aspect A24 includes the apparatus of any of the twenty-third aspect A23, wherein: the cleaning station cycle time overlaps with both the print cycle time and the recoat cycle time $T_{RH}$; and the overall build cycle time is less than the sum of the recoat cycle time and the print cycle time.

A twenty-fifth aspect A25 includes the apparatus of any of the foregoing aspects A23-A24, wherein: the recoat head actuator is coupled to one of an upper support and a lower support; and the print head actuator is coupled to the other of the upper support and the lower support, wherein the upper support and the lower support are positioned above the build platform and extend in a horizontal direction.

A twenty-sixth aspect A26 includes the apparatus of any of the foregoing aspects A23-A25, wherein the recoat motion axis and the print motion axis are located in the same vertical plane.

A twenty-seventh aspect A27 includes the apparatus of any of the foregoing aspects A23-A26, wherein: the recoat head comprises a recoat home position; the print head comprises a print home position spaced apart from the recoat home position in a horizontal direction; and further comprising a control system communicatively coupled to the recoat head actuator and the print head actuator, the control system comprising a processor and a non-transitory memory storing computer readable and executable instructions that, when executed by the processor, cause: the recoat head actuator to advance the recoat head from the recoat home position towards the print home position at a recoat advance rate; the recoat head actuator to return the recoat head to the recoat home position at a recoat return rate; the print head actuator to advance the print head from the print home position of the print head towards the recoat home position at a print advance rate; and the print head actuator to return the print head to the print home position at a print return rate, wherein: the recoat return rate is greater than the recoat advance rate; and the print return rate is greater than the print advance rate.

A twenty-eighth aspect A28 includes the apparatus of any of the foregoing aspects A23-A27, wherein the recoat advance rate comprises: an initial recoat advance rate; and a distribution advance rate, wherein the initial recoat advance rate is greater than the distribution advance rate.

A twenty-ninth aspect A29 includes the apparatus of any of the foregoing aspects A23-A28, wherein the print advance rate comprises: an initial print head advance rate; and a deposition advance rate, wherein the initial print head advance rate is greater than the deposition advance rate.

A thirtieth aspect A30 includes the apparatus of any of the foregoing aspects A23-A29, wherein the print return rate comprises: a deposition return rate; and a print complete return rate, wherein the print complete return rate is greater than the deposition return rate.

A thirty-first aspect A31 includes the apparatus of any of the foregoing aspects A23-A30, wherein the print head is advanced from the print home position towards the recoat home position while the recoat head is returned to the recoat home position.

A thirty-second aspect A32 includes the apparatus of any of the foregoing aspects A23-A31, wherein the recoat head is advanced from the recoat home position towards the print home position while the print head is returned to the print home position of the print head.

A thirty-third aspect A33 includes the apparatus of any of the foregoing aspects A23-A32 further comprising a supply platform bi-directionally actuatable along a vertical axis, wherein the build platform is positioned between the cleaning station and the supply platform.

A thirty-fourth aspect A34 includes the apparatus of any of the foregoing aspects A23-A33 further comprising a build material hopper coupled to the recoat head.

A thirty-fifth aspect A35 includes the apparatus of any of the foregoing aspects A23-A34 further comprising a build material hopper positioned over the build platform.

A thirty-sixth aspect A36 includes a method of building an object by additive manufacturing, the method comprising: distributing a new layer of build material on a build platform with a recoat head coupled to a recoat head actuator, the recoat head actuator comprising a recoat motion axis whereby actuation of the recoat head actuator along the recoat motion axis in a first recoat direction causes the recoat head to distribute the new layer of build material on the build platform; and depositing a binder material on the new layer of build material with a print head coupled to a print head actuator, the print head actuator comprising a print motion axis whereby the binder material is deposited with the print head by actuating the print head actuator along the print motion axis in a first print direction opposite the first recoat direction, wherein the recoat motion axis and the print motion axis are parallel to one another and spaced apart from one another in a vertical direction.

A thirty-seventh aspect A37 includes the method of the thirty-sixth aspect A36, wherein: the recoat head and recoat head actuator comprise a recoat cycle time during which the new layer of build material is distributed on the build platform; and the print head and print head actuator comprise a print cycle time during which the binder material is deposited on the new layer of build material, wherein the print cycle time overlaps with the recoat cycle time.

A thirty-eighth aspect A38 includes the method of any of the foregoing aspects A36-A37, wherein the recoat motion axis and the print motion axis are in the same vertical plane.

A thirty-ninth aspect A39 includes the method of any of the foregoing aspects A36-A38, wherein: the recoat head is actuated by the recoat head actuator along the recoat motion axis at a recoat advance rate; and the print head is actuated by the print head actuator along the print motion axis at a print advance rate, wherein the print advance rate is greater than the recoat advance rate.

A fortieth aspect A40 includes the method of any of the foregoing aspects A36-A3–9, wherein the recoat advance rate comprises: an initial recoat advance rate; and a distribution advance rate, wherein the initial recoat advance rate is greater than the distribution advance rate.

A forty-first aspect A41 includes the method of any of the foregoing aspects A36-A40, wherein the print advance rate comprises: an initial print head advance rate; and a deposition advance rate, wherein the initial print head advance rate is greater than the deposition advance rate.

A forty-second aspect A42 includes the method of any of the foregoing aspects A36-A41, wherein: after the distributing the new layer of build material on the build platform, the recoat head is actuated by the recoat head actuator along the recoat motion axis in a second recoat direction opposite the first recoat direction at a recoat return rate.

A forty-third aspect A43 includes the method of any of the foregoing aspects A36-A42, wherein the recoat return rate is greater than the recoat advance rate.

A forty-fourth aspect A44 includes the method of any of the foregoing aspects A36-A43, wherein the print head is actuated by the print head actuator along the print motion axis in the first print direction as the recoat head is actuated by the recoat head actuator along the recoat motion axis in the second recoat direction.

A forty-fifth aspect A45 includes the method of any of the foregoing aspects A36-A44, wherein: after the depositing the binder material on the new layer of build material, the print head is actuated by the print head actuator along the print motion axis in a second print direction opposite the first print direction at a print return rate.

A forty-sixth aspect A46 includes the method of any of the foregoing aspects A36-A45, wherein the print return rate is greater than the print advance rate.

A forty-seventh aspect A47 includes the method of any of the foregoing aspects A36-A46, wherein the print head deposits binder material on the new layer of build material as the print head is actuated by the print head actuator along the print motion axis in the second print direction.

A forty-eighth aspect A48 includes the method of any of the foregoing aspects A36-A47, wherein the print return rate comprises: a deposition return rate; and a print complete return rate, wherein the print complete return rate is greater than the deposition return rate.

A forty-ninth aspect A49 includes the method of any of the foregoing aspects A36-A48, wherein the distributing the new layer of build material on the build platform comprises spreading build material from a supply platform to the build platform with at least one of a wiper or a roller coupled to the recoat head.

A fiftieth aspect A50 includes the method of any of the foregoing aspects A36-A49, wherein the distributing the new layer of build material on the build platform comprises: spreading build material from a supply platform to the build platform with a first roller coupled to the recoat head; and compacting build material on the build platform with a second roller coupled to the recoat head, wherein the first roller and the second roller are rotated in opposite directions.

A fifty-first aspect A51 includes the method of any of the foregoing aspects A36-A50, wherein the distributing the new layer of build material on the build platform further comprises heating the new layer of build material with an energy source coupled to the recoat head.

A fifty-second aspect A52 includes the method of any of the foregoing aspects A36-A51, wherein the new layer of build material is distributed over a previous layer of build material disposed on the build platform and the method further comprises curing binder material deposited on the previous layer of build material prior to the distributing the new layer of build material.

A fifty-third aspect A53 includes the method of any of the foregoing aspects A36-A52, wherein the binder material deposited on the previous layer of build material is cured with an energy source coupled to the recoat head.

A fifty-fourth aspect A54 includes an actuator assembly for distributing build material and depositing binder material in an additive manufacturing apparatus, the assembly comprising: a support extending in a horizontal direction; a recoat head for distributing build material; a print head for depositing binder material; a recoat head actuator coupled to the recoat head and the support, the recoat head actuator comprising a recoat motion axis, wherein the recoat head actuator is bi-directionally actuatable along the recoat motion axis thereby effecting bi-directional movement of the recoat head; and a print head actuator coupled to the print head and the support, the print head actuator comprising a print motion axis, wherein the print head actuator is bi-directionally actuatable along the print motion axis thereby effecting bi-directional movement of the print head, wherein the recoat motion axis and the print motion axis are co-linear and bi-directional actuation of the print head actuator on the print motion axis and bi-directional actuation of the recoat head actuator on the recoat motion axis are independent of one another.

A fifty-fifth aspect A55 includes the actuator assembly of the fifty-fourth aspect A54, wherein: the support is positioned in a first vertical plane; and the recoat motion axis and the print motion axis are positioned in a second vertical plane parallel to the first vertical plane.

A fifty-sixth aspect A56 includes the actuator assembly of any of the foregoing aspects A54-A55, wherein: the print head is cantilevered from the support; and the recoat head is cantilevered from the support.

A fifty-seventh aspect A57 includes an actuator assembly for distributing build material and depositing binder material in an additive manufacturing apparatus, the assembly comprising: an upper support; a lower support spaced from the upper support in a vertical direction; an intermediate support positioned between the upper support and the lower support and space from the upper support and the lower support in a vertical direction, the upper support, the lower support, and the intermediate support extending in a horizontal direction; a recoat head for distributing build material; a print head for depositing binder material; a process accessory; a recoat head actuator coupled to the recoat head and one of the upper support, the lower support, and the intermediate support, the recoat head actuator comprising a recoat motion axis, wherein the recoat head actuator is bi-directionally actuatable along the recoat motion axis thereby effecting bi-directional movement of the recoat head; a print head actuator coupled to the print head and another of the upper support, the lower support, and the intermediate support, the print head actuator comprising a print motion axis, wherein the print head actuator is bi-directionally actuatable along the print motion axis thereby effecting bi-directional movement of the print head; and an accessory actuator coupled to the process accessory and the other of the upper support, the lower support, and the intermediate support, the accessory actuator comprising an accessory motion axis, wherein the accessory actuator is bi-directionally actuatable along the accessory motion axis thereby effecting bi-directional movement of the process accessory, wherein the recoat motion axis, the print motion axis, and the accessory motion axis are parallel to one another and spaced apart from one another in the vertical direction.

A fifty-eighth aspect A58 includes the actuator assembly of the fifty-seventh A57, wherein the process accessory comprises a sensor, an energy source, an end effector or combinations thereof.

A fifty-ninth aspect A59 includes the actuator assembly of any of the foregoing aspects A57-A58, wherein the sensor is at least one of an image sensor, a thermal detector, a pyrometer, a profilometer, and an ultrasonic detector.

A sixtieth aspect A60 includes the actuator assembly of any of the foregoing aspects A57-A59, wherein the energy source is at least one of an infrared heater, an ultraviolet lamp, and a laser light source.

A sixty-first aspect A61, includes a build receptacle for an additive manufacturing apparatus which may be used in conjunction with the actuator assemblies, additive manufacturing apparatuses, and methods of any of the foregoing aspects. The build receptacle may comprise a housing comprising a sidewall at least partially enclosing a build chamber, and a build platform positioned within the build chamber. A position of the build platform is slidably adjustable within the build chamber in a vertical direction from a lower position to one of a plurality of upper positions and from the one of the plurality of upper positions to the lower position. The build receptacle further comprises a plurality of heating elements disposed around the build chamber.

A sixty-second aspect A62 includes the build receptacle of aspect A61, wherein a seal is disposed between the build platform and an interior surface of the sidewall.

A sixty-third aspect A63 includes the build receptacle of aspect A62, wherein the seal comprises a core portion and an enveloping portion. The enveloping portion at least partially encloses the core portion, the core portion comprises polytetrafluoroethylene, and the enveloping portion comprises fibrous material.

A sixty-four aspect A64 includes the build receptacle of any of the foregoing aspects A61-A63, wherein the enveloping portion comprises felt.

A sixty-fifth aspect A65 includes the build receptacle of any of foregoing aspects A61-A64, wherein the core portion comprises a braided polytetrafluoroethylene packing seal.

A sixty-sixth aspect A66 includes the build receptacle of any of the foregoing aspects A61-A65, wherein the build platform comprises a seal seat in an edge of the build platform, the seal positioned in the seal seat such that the seal is disposed between the build platform and the interior surface of the sidewall.

A sixty-seventh aspect A67 includes the build receptacle of any of the foregoing aspects A61-A66, further comprising a seal frame enclosing at least a portion of the seal seat.

An sixty-eighth aspect A68 includes the build receptacle of any of the foregoing aspects A61-A67, wherein the housing further comprises a plurality of retention tabs extending from the sidewall into the build chamber proximate a bottom of the sidewall.

A sixty-ninth aspect A69 includes the build receptacle of any of the foregoing aspects A61-A68, wherein the build platform is seated on the retention tabs when the build platform is in the lower position.

A seventieth aspect A70 includes the build receptacle of any of the foregoing aspects A61-A69, wherein the housing comprises a flange extending from the sidewall proximate a top of the sidewall.

A seventy-first aspect A71 includes the build receptacle of any of the foregoing aspects A61-A70, further comprising a plurality of lift points located on the flange, the sidewall, or both, the lift points facilitating lifting and lowering the build receptacle.

A seventy-second aspect A72 includes the build receptacle of any of the foregoing aspects A61-A71, wherein each lift point of the plurality of lift points comprises a handle extending from the flange, the sidewall, or both.

A seventy-third aspect A73 includes the build receptacle of any of the foregoing aspects A61-A72, wherein each lift point of the plurality of lift points comprises a lift flange extending from the sidewall.

A seventy-fourth aspect A74 includes the build receptacle of any of the foregoing aspects A61-A73, wherein the plurality of heating elements are disposed on an exterior surface of the sidewall.

A seventy-fifth aspect A75 includes the build receptacle of any of the foregoing aspects A61-A74, wherein the plurality of heating elements are disposed within the sidewall.

A seventy-sixth aspect A76 includes the build receptacle of any of the foregoing aspects A61-A75, wherein the plurality of heating elements are arranged in heating zones and each heating zone is independently actuatable.

A seventy-seventh aspect A77 includes the build receptacle of any of the foregoing aspects A61-A76, wherein each heating zone is spaced apart from an adjacent heating zone in the vertical direction.

A seventy-eighth aspect A78 includes the build receptacle of the foregoing aspects A61-A77, wherein each heating zone comprises at least one heating element arranged in a horizontal band.

A seventy-ninth aspect A79 includes the build receptacle of any of the foregoing aspects A61-A78, further comprising at least one cover affixed to an exterior surface of the sidewall such that the plurality of heating elements are disposed between the cover and the exterior surface of the sidewall.

An eightieth aspect A80 includes the build receptacle of any of the foregoing aspects A61-A79, further comprising insulation positioned between the at least one cover and the plurality of heating elements.

An eighty-first aspect A81 includes the build receptacle of any of the foregoing aspects A61-A80, wherein an exterior surface of the sidewall comprises grooves and the plurality of heating elements are positioned in the grooves.

An eighty-second aspect A82 includes the build receptacle of any of the foregoing aspects A61-A81, further comprising a plurality of temperature sensors arranged around the build chamber.

An eighty-third aspect A83 includes the build receptacle of any of the foregoing aspects A61-A82, further comprising a plurality of temperature sensors arranged around the build chamber.

An eighty-fourth aspect A84 includes the build receptacle of any of the foregoing aspects A61-A83, wherein the temperature sensors are disposed within the sidewall.

An eighty-fifth aspect A85 includes the build receptacle of any of the foregoing aspects A61-A84, wherein the temperature sensors are resistance temperature detectors coupled to individual ones of the plurality of heating elements.

An eighty-sixth aspect A86 includes the build receptacle of any of the foregoing aspects A61-A85, wherein two resistance temperature detectors are coupled to individual ones of the plurality of heating elements.

An eighty-seventh aspect A87 includes the build receptacle of any of the foregoing aspects A81-A86, wherein two resistance temperature detectors are coupled to individual ones of the plurality of heating elements.

An eighty-eighth aspect A88 includes the build receptacle of any of the foregoing aspects A61-A87, wherein the electrical connectors supply power to the plurality of heating elements and transmit electrical signals from the build receptacle indicative of a temperature of the sidewall of the build receptacle.

An eighty-ninth aspect A89 includes the build receptacle of any of the foregoing aspects A81-A88, further comprising a lid at least partially enclosing the build chamber.

A ninetieth aspect A90 includes the build receptacle of any of the foregoing aspects A61-A89, wherein a bottom surface of the build platform further comprises connectors for coupling the build platform to a lift system for actuating the build platform from the lower position to one of the plurality of upper positions and from the one of the plurality of upper positions to the lower position.

A ninety-first aspect A91 includes the build receptacle of any of the foregoing aspects A61-A90, further comprising a second plurality of heating elements positioned below a top surface of the build platform.

A ninety-second aspect A92 includes the build receptacle of any of the foregoing aspects A61-A91, wherein the second plurality of heating elements are positioned below a bottom surface of the build platform.

A ninety-third aspect A93 includes an additive manufacturing apparatus comprising a build receptacle and a lift system which may be used in conjunction with the apparatuses, assemblies, and methods of any of the foregoing aspects. The build receptacle comprises a housing comprising a sidewall at least partially enclosing a build chamber, and a build platform positioned within the build chamber. A position of the build platform is slidably adjustable within the build chamber in a vertical direction from a lower position to one of a plurality of upper positions and from the one of the plurality of upper positions to the lower position. The lift system is a position of the build platform is slidably adjustable within the build chamber in a vertical direction from a lower position to one of a plurality of upper positions and from the one of the plurality of upper positions to the lower position.

A ninety-fourth aspect A94 includes the additive manufacturing apparatus of aspect A93, wherein the build platform actuator comprises a ball screw coupled to a motor.

A ninety-fifth aspect A95 includes the additive manufacturing apparatus of any of the foregoing aspects A93-A94, wherein the build platform actuator further comprises a drive linkage connecting the ball screw to an armature of the motor such that the ball screw is rotatably coupled to the armature of the motor.

A ninety-sixth aspect A96 includes the additive manufacturing apparatus of any of the foregoing aspects A93-A95, wherein when the lift system is coupled to the build platform a bottom surface of the build platform is in contact with an upper surface of the heating platen.

A ninety-seventh aspect A97 includes the additive manufacturing apparatus of any of the foregoing aspects A93-A96, wherein the lift system further comprises a plurality of vertical guides coupled to the heating platen.

A ninety-eighth aspect A98 includes the additive manufacturing apparatus of any of the foregoing aspects A93-A97, wherein the lift system further comprises a heating platen position sensor for detecting a vertical position of the heating platen.

A ninety-ninth aspect A99 includes the additive manufacturing apparatus of any of the foregoing aspects A93-A98, wherein the heating platen position sensor is positioned proximate to a lower end of the lift system and comprises a limit switch.

A one-hundredth aspect A100 includes the additive manufacturing apparatus of any of the foregoing aspects A93-A99, wherein the lift system further comprises a build platform position sensor for detecting a vertical position of the build platform.

A hundred and first aspect A101 includes the additive manufacturing apparatus of any of the foregoing aspects A93-A100, wherein the lift system further comprises a build platform position sensor for detecting a vertical position of the build platform.

A hundred and second aspect A102 includes the additive manufacturing apparatus of any of the foregoing aspects A93-A101, wherein a bottom surface of the build platform further comprises connectors to couple to the lift system; and an upper surface of the heating platen comprises corresponding connectors to couple to the bottom surface of the build platform.

A hundred and third aspect A103 includes the additive manufacturing apparatus of any of the foregoing aspects A93-A102, wherein the housing comprises a flange extending from the sidewall proximate a top of the sidewall.

A hundred and fourth aspect A104 includes the additive manufacturing apparatus of any of A93-A103, wherein a seal is disposed between the build platform and an interior surface of the sidewall.

A hundred and fifth aspect A105 includes the additive manufacturing apparatus of any of the foregoing aspects A93-A104, wherein the build platform comprises a seal seat in an edge of the build platform, the seal positioned in the seal seat such that the seal is disposed between the build platform and the interior surface of the sidewall.

A hundred and sixth aspect A106 includes the additive manufacturing apparatus of any of the foregoing aspects A93-A105, wherein the build platform comprises a seal seat in an edge of the build platform, the seal positioned in the seal seat such that the seal is disposed between the build platform and the interior surface of the sidewall.

A hundred and seventh aspect A107 includes the additive manufacturing apparatus of any of the foregoing aspects A93-A106, wherein the build platform is seated on the retention tabs when the build platform is in the lower position.

A hundred and eighth aspect A108 includes the additive manufacturing apparatus of any of the foregoing aspects A93-A107, further comprising a second plurality of heating elements disposed on an exterior surface of the sidewall.

A hundred and ninth aspect A109 includes the additive manufacturing apparatus of any of the foregoing aspects A93-A108, further comprising a plurality of sensors disposed throughout the plurality of heating elements.

A hundred and tenth aspect A110 includes the additive manufacturing apparatus of any of the foregoing aspects A93-A109, wherein the plurality of heating elements are communicatively coupled to at least one electrical connector disposed on the exterior surface of the sidewall.

A hundred and eleventh aspect A111 includes the additive manufacturing apparatus of any of the foregoing aspects A93-A110, wherein the electrical connectors supply power to the heating elements and transmit electrical signals from the build receptacle indicative of a temperature of the sidewall of the build receptacle.

A hundred and twelfth aspect A112 includes a method of building an object by additive manufacturing that may be used in conjunction with any of the methods, apparatuses, or assemblies of any of the foregoing aspects. The method includes pre-heating a deposition region of a build chamber to a pre-heat temperature, distributing a layer of build material on a build platform positioned within the build chamber, depositing a layer of binder material on the layer of build material, and adjusting a position of the build platform such that a portion of build material and binder is within a curing region of the build chamber. The curing region of the build chamber is below the deposition region of the build chamber. The method further includes heating the curing region of the build chamber to a curing temperature, wherein the curing temperature is greater than the pre-heat temperature. The method further includes curing the portion of binder within the lower portion of the build chamber, and distributing a new layer of build material above the portion of build material and binder on the build platform.

A hundred and thirteenth aspect A113 includes the method of aspect A112, wherein the heating and pre-heating are achieved with a plurality of heating elements positioned around the build chamber.

A hundred and fourteenth aspect A114 includes the method of any of the foregoing aspects A112-A113, wherein the heating and pre-heating are achieved with a plurality of heating elements positioned around the build chamber.

A hundred and fifteenth aspect A115 includes the method of any of the foregoing aspects A112-A114, wherein the pre-heat temperature is from 25° C. to 130° C.

A hundred and sixteenth aspect A116 includes the method of any of the foregoing aspects A112-A115, wherein the pre-heat temperature is less than or equal to 70° C.

A hundred and seventeenth aspect A117 includes the method of any of the foregoing aspects A112-A116, wherein the curing temperature is from 100° C. to 250° C.

A hundred and eighteenth aspect A118 includes the method of any of the foregoing aspects A112-A117, wherein the curing temperature is from 100° C. to 250° C.

A hundred and nineteenth aspect A119 includes the method of any of the foregoing aspects A112-A118, further comprising detecting a temperature of the curing region and adjusting the curing temperature based on the detected temperature of the curing region.

A hundred and twentieth aspect A120 includes an additive manufacturing apparatus that may be used in conjunction with any of the foregoing apparatuses, assemblies and methods. The additive manufacturing apparatus comprises: a support chassis comprising a print bay, a build bay, and a material supply bay, each bay comprising an upper compartment and a lower compartment; and a working surface separating each of the print bay, the build bay, and the material supply bay into the upper compartment and the lower compartment, wherein: the build bay is disposed between the print bay and the material supply bay; and the lower compartment of the build bay comprises bulkheads sealing the lower compartment of the build bay from the lower compartment of the print bay and the lower compartment of the material supply bay.

A hundred and twenty-first aspect A121 includes the additive manufacturing apparatus of aspect A120, further comprising: a high voltage electrical supply cabinet; and a low voltage electrical supply cabinet, wherein the high voltage electrical supply cabinet is located at a first end of the support chassis and the low voltage supply cabinet is located at a second end of the support chassis opposite the first end.

A hundred and twenty-second aspect A122 includes the additive manufacturing apparatus of any of the foregoing aspects A120-A121, wherein: the support chassis comprises a front and back; low voltage supply lines are directed through cable trays at the front or the back of the support chassis; and high voltage supply lines are directed through cable trays at the other of the front and back of the support chassis.

A hundred and twenty-third aspect A123 includes the additive manufacturing apparatus of any of the foregoing aspects A120-A122, wherein the cable trays comprising low voltage supply lines further comprise at least on of air lines, vacuum lines, and liquid lines.

A hundred and twenty-fourth aspect A124 includes the additive manufacturing apparatus of any of the foregoing aspects A120-A123, wherein the cable trays are positioned proximate a top of the support chassis, a bottom of the support chassis, or proximate both a top and bottom of the support chassis.

A hundred and twenty-fifth aspect A125 includes the additive manufacturing apparatus of any of the foregoing aspects A120-A124, wherein the cable trays, low voltage supply lines, and high voltage supply lines extend through the lower compartment of the build bay and are sealed to the bulk heads of the build bay with sealing glands.

A hundred and twenty-sixth aspect A126 includes the additive manufacturing apparatus of any of the foregoing aspects A120-A125, wherein: the print bay comprises a cleaning station; a cleaning solution supply tank is positioned in the lower compartment of the print bay and fluidly coupled to the cleaning station; and a binder supply tank positioned in the lower compartment of the print bay, wherein the binder supply tank is fluidly coupled to a print head of the additive manufacturing apparatus.

A hundred and twenty-seventh aspect A127 includes the additive manufacturing apparatus of any of the foregoing aspects A120-A126 further comprising a cleaning solution recovery tank is positioned in the lower compartment of the print bay and fluidly coupled to the cleaning station.

A hundred and twenty-eighth aspect A128 includes the additive manufacturing apparatus of any of the foregoing aspects A120-A127, wherein: the working surface in the build bay comprises an opening for removably receiving a build receptacle; and a lift system is positioned in the lower compartment of the build bay, the lift system for raising and lowering a build platform of the build receptacle when the build receptacle is positioned in the opening of the working surface of the build bay.

A hundred and twenty-ninth aspect A129 includes the additive manufacturing apparatus of any of the foregoing aspects A120-A128 further comprising a build temperature sensor positioned in the build bay and oriented to detect a temperature of a surface of the build platform of the build receptacle when the build receptacle is positioned in the opening of the working surface of the build bay.

A hundred and thirtieth aspect A130 includes the additive manufacturing apparatus of any of the foregoing aspects A120-A129 further comprising a build bay temperature sensor positioned in the lower compartment of the build bay, the build receptacle temperature sensor configured to detect a temperature of the lower compartment of the build bay.

A hundred and thirty-first aspect A131 includes the additive manufacturing apparatus of any of the foregoing aspects A120-A130 further comprising a camera system oriented to capture images of a surface of the build platform of the build receptacle when the build receptacle is positioned in the opening of the working surface of the build bay.

A hundred and thirty-second aspect A132 includes the additive manufacturing apparatus of any of the foregoing aspects A120-A131 further comprising an environmental sensor positioned within the build bay, the material supply bay, or the print bay, the environmental sensor configured to detect at least one of an air temperature within the support chassis and humidity within the support chassis.

A hundred and thirty-third aspect A133 includes the additive manufacturing apparatus of any of the foregoing aspects A120-A132, wherein: the working surface in the material supply bay comprises an opening for receiving a supply receptacle; and a lift system is positioned in the lower compartment of the material supply bay, the lift system for raising and lowering a supply platform of the supply receptacle when the supply receptacle is positioned in the opening of the working surface of the material supply bay.

A hundred and thirty-fourth aspect A134 includes the additive manufacturing apparatus of any of the foregoing aspects A120-A133, wherein the print bay, the build bay, and the material supply bay each comprise at least one access panel coupled to the lower compartment and at least one access panel coupled to the upper compartment.

A hundred and thirty-fifth aspect A135 includes the additive manufacturing apparatus of any of the foregoing aspects A120-A134 further comprising: air inlets in the lower compartment of the build bay; and a lower exhaust system coupled to the lower compartment of the build bay, wherein air is drawn into the lower compartment of the build bay through the air inlets and exhausted out of the build bay with the lower exhaust system.

A hundred and thirty-sixth aspect A136 includes the additive manufacturing apparatus of any of the foregoing aspects A120-A135, wherein the air inlets are positioned proximate a top of the lower compartment of the build bay and the lower exhaust system is coupled to the lower compartment of the build bay proximate a bottom of the lower compartment of the build bay.

A hundred and thirty-seventh aspect A137 includes the additive manufacturing apparatus of any of the foregoing aspects A120-A136, wherein the lower exhaust system is coupled to a floor panel of the build bay.

A hundred and thirty-eighth aspect A138 includes the additive manufacturing apparatus of any of the foregoing aspects A120-A137, wherein the lower exhaust system comprises a filter.

A hundred and thirty-ninth aspect A139 includes the additive manufacturing apparatus of any of the foregoing aspects A120-A138, wherein: the support chassis comprises a top panel enclosing a top of the support chassis; and an upper exhaust system is coupled to the top panel.

A hundred and fortieth aspect A140 includes the additive manufacturing apparatus of any of the foregoing aspects A120-A139, wherein the upper exhaust system comprises a filter.

A hundred and forty-first aspect A141 includes the additive manufacturing apparatus of any of the foregoing aspects A120-A140 further comprising: a powder recovery slot extending through the working surface in one of the build bay and the material supply bay; a recovery funnel coupled to the powder recovery slot; and a vacuum system coupled to the recovery funnel, the vacuum system applying a negative pressure to the recovery funnel and the powder recovery slot.

A hundred and forty-second aspect A142 includes the additive manufacturing apparatus of any of the foregoing aspects A120-A141, wherein a sidewall of the powder recovery slot comprises a cone angle of less than or equal to 60 degrees with respect to a vertical axis.

A hundred and forty-third aspect A143 includes the additive manufacturing apparatus of any of the foregoing aspects A120-A142, wherein the vacuum system couples the powder recovery slot and recovery funnel to the sieve system.

A hundred and forty-fourth aspect A144 includes the additive manufacturing apparatus of any of the foregoing aspects A120-A143 further comprising: an actuator assembly comprising a recoat head, the recoat head comprising a containment housing; and a vacuum system coupled to the containment housing, whereby the vacuum system applies a negative pressure to the containment housing.

A hundred and forty-fifth aspect A145 includes the additive manufacturing apparatus of any of the foregoing aspects A120-A144, wherein the vacuum system couples the containment housing to the sieve system.

A hundred and forty-sixth aspect A146 includes the additive manufacturing apparatus of any of the foregoing aspects A120-A145 further comprising: an actuator assembly comprising a print head, the print head comprising a print head housing; and an air pump coupled to the print head housing, the air pump providing an overpressure to the print head housing.

Additional features and advantages of the additive manufacturing apparatuses described herein, the components thereof, and methods of using the same will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 16:
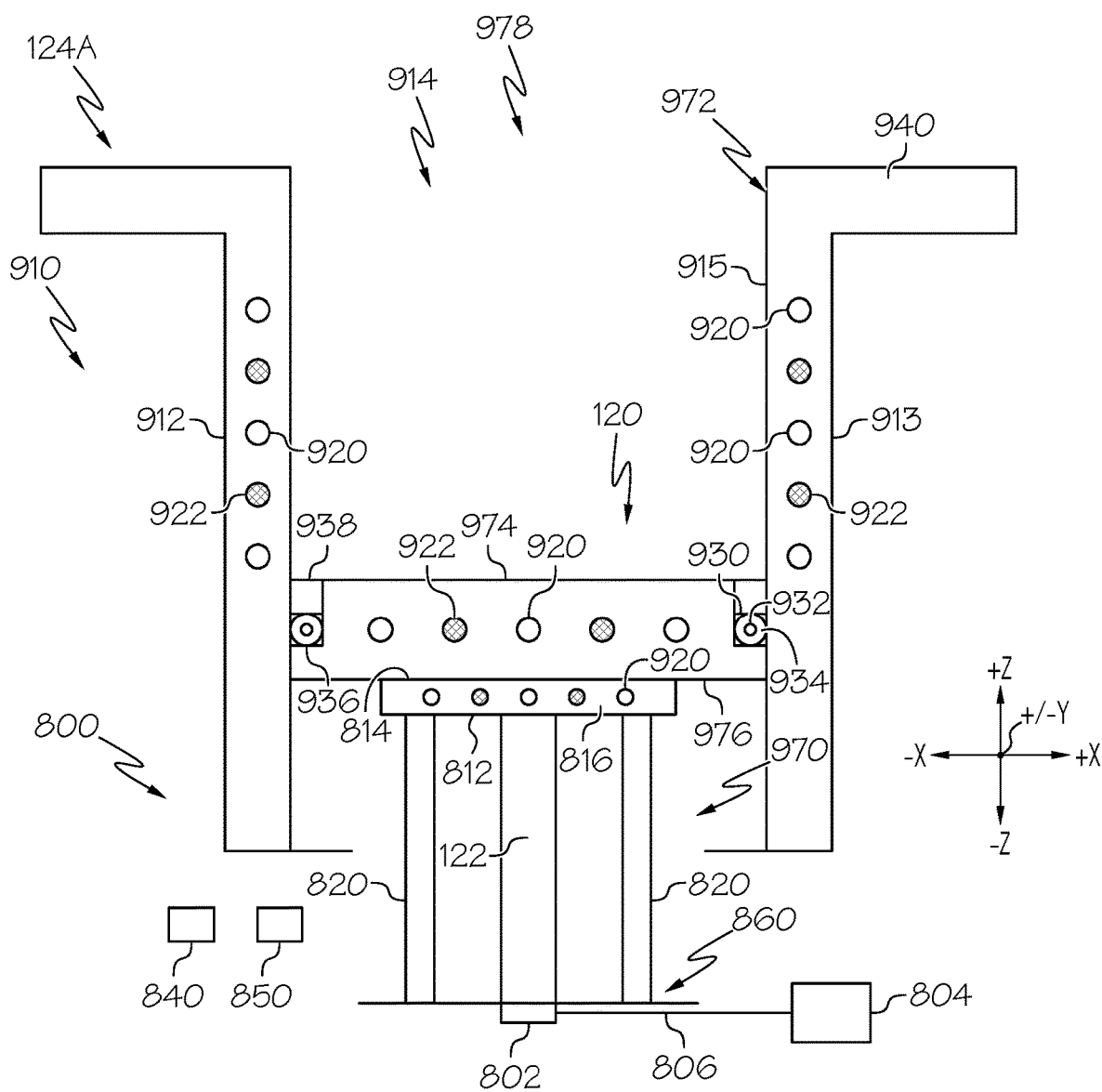
FIG. 16 schematically depicts a cross section of a build receptacle for use with an additive manufacturing apparatus according to one or more embodiments shown and described herein.

Reference will now be made in detail to embodiments of additive manufacturing apparatuses, and components thereof, examples of which are illustrated in the accompanying drawings. Whenever possible, the same reference numerals will be used throughout the drawings to refer to the same or like parts. One embodiment of a build receptacle for an additive manufacturing apparatus is schematically depicted in FIG. 16. The additive manufacturing apparatus may comprise a support chassis including a print bay, a build bay, and a material supply bay. Each bay may comprise an upper compartment and a lower compartment. A working surface may separate each of the print bay, the build bay, and the material supply bay into the upper compartment and the lower compartment, wherein: the build bay may be disposed between the print bay and the material supply bay. The lower compartment of the build bay comprises bulkheads sealing the lower compartment of the build bay from the lower compartment of the print bay and the lower compartment of the material supply bay. Various embodiments of additive manufacturing apparatuses and methods of using the same will be described in further detail herein with specific reference to the appended drawings.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom, upper, lower,—are made only with reference to the figures as drawn and are not intended to imply absolute orientation unless otherwise expressly stated.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Figure 1:
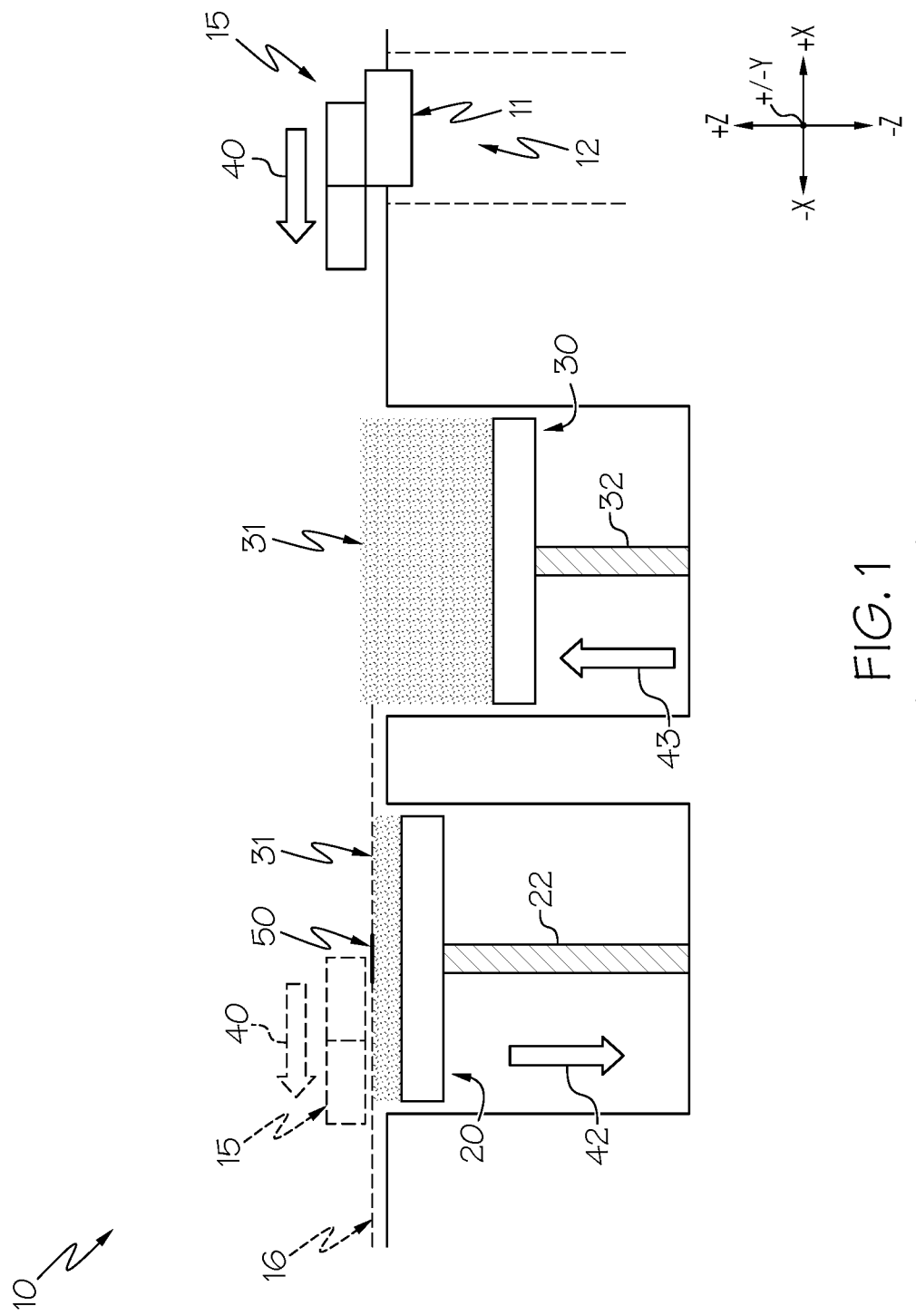
FIG. 1 schematically depicts a conventional additive manufacturing apparatus.

Referring now to FIG. 1, a conventional additive manufacturing apparatus 10 is schematically depicted. The conventional additive manufacturing apparatus 10 includes a supply platform 30, a build platform 20, a cleaning station 11, and a build head 15. The supply platform 30 is coupled to a supply platform actuator 32. The supply platform actuator 32 is actuatable in the vertical direction (i.e., the +/−Z direction of the coordinate axes depicted in the figure) such that the supply platform 30 may be raised or lowered. The build platform 20 is located adjacent to the supply platform 30 and, like the supply platform 30, is coupled to an actuator, specifically a build platform actuator 22. The build platform actuator 22 is actuatable in the vertical direction such that the build platform 20 may be raised or lowered. The cleaning station 11 is located adjacent to the supply platform 30 opposite the build platform 20. That is, the supply platform 30 is located between the cleaning station 11 and the build platform 20 along the working axis of the conventional additive manufacturing apparatus 10 (i.e., an axis extending parallel to the +/−X axis of the coordinate axes depicted in the figure). The build head 15 may be traversed along the working axis of the conventional additive manufacturing apparatus 10 with an actuator (not depicted) such that the build head 15 passes from a home position 12 co-located with the cleaning station 11 over the supply platform 30, over the build platform 20, and back again, ultimately returning to the home position 12. To facilitate this motion, the build head 15 of the conventional additive manufacturing apparatus 10 is mounted on a gantry (not depicted) that rides on a pair of rails (not depicted) horizontally spaced (i.e., spaced apart in the +/−Y direction in the coordinate axes shown in FIG. 1) in a horizontal plane (i.e., a plane parallel to the XY plane of the coordinate axes depicted in FIG. 1) and laterally adjacent to the build platform 20 and the supply platform 30 in the +/−Y directions of the coordinate axes depicted in FIG. 1. The rails may be positioned at or near the build plane 16 as indicated by dashed line.

In operation, build material 31, such as organic or inorganic powder, is positioned on the supply platform 30. The supply platform 30 is actuated to present a layer of the build material 31 in the path of the build head 15. The build head 15 is then actuated along the working axis of the conventional additive manufacturing apparatus 10 from the home position 12 towards the build platform 20 in the direction indicated by arrows 40. As the build head 15 traverses the working axis over the supply platform 30 towards the build platform 20, the build head 15 distributes the layer of build material 31 in the path of the build head 15 from the supply platform 30 to the build platform 20. Thereafter, as the build head 15 continues along the working axis over the build platform 20, the build head 15 deposits a layer of binder material 50 in a predetermined pattern on the layer of build material 31 that has been distributed on the build platform 20. Optionally, after the binder material 50 is deposited, an energy source within the build head 15 is utilized to cure the deposited binder material 50. The build head 15 then returns to the home position 12 where at least a portion of the build head 15 is positioned over the cleaning station 11. While the build head 15 is in the home position 12, the build head 15 works in conjunction with the cleaning station 11 to provide cleaning and maintenance operations on the elements of the build head 15 which deposit the binder material 50 to ensure the elements are not fouled or otherwise clogged. This ensures that the build head is capable of depositing the binder material 50 in the desired pattern during a subsequent deposition pass. During this maintenance interval, the supply platform 30 is actuated in an upward vertical direction (i.e., in the +Z direction of the coordinate axes depicted in the figure) as indicated by arrow 43 to present a new layer of build material 31 in the path of the build head 15. The build platform 20 is actuated in the downward vertical direction (i.e., in the −Z direction of the coordinate axes depicted in the figure) as indicated by arrow 42 to prepare the build platform 20 to receive a new layer of build material 31 from the supply platform 30. The build head 15 is then actuated along the working axis of the conventional additive manufacturing apparatus 10 again to add another layer of build material 31 and binder material 50 to the build platform 20. This sequence of steps is repeated multiple times to build an object on the build platform 20 in a layer-wise manner.

As described above, the operation of the conventional additive manufacturing apparatus 10 is performed in a series of steps (e.g., distribute-deposit-cure-clean-repeat). However, given the configuration of the build head 15, it is not possible to decouple the cycle times of the individual steps. As such, the overall cycle time of the additive manufacturing apparatus 10 (i.e., the time it takes to "build" a single layer of the object on the build platform 20) may be limited by the architecture of the conventional additive manufacturing apparatus 10.

The embodiments described herein are directed to alternative configurations of additive manufacturing apparatuses and components for additive manufacturing apparatuses.

Figure 2:
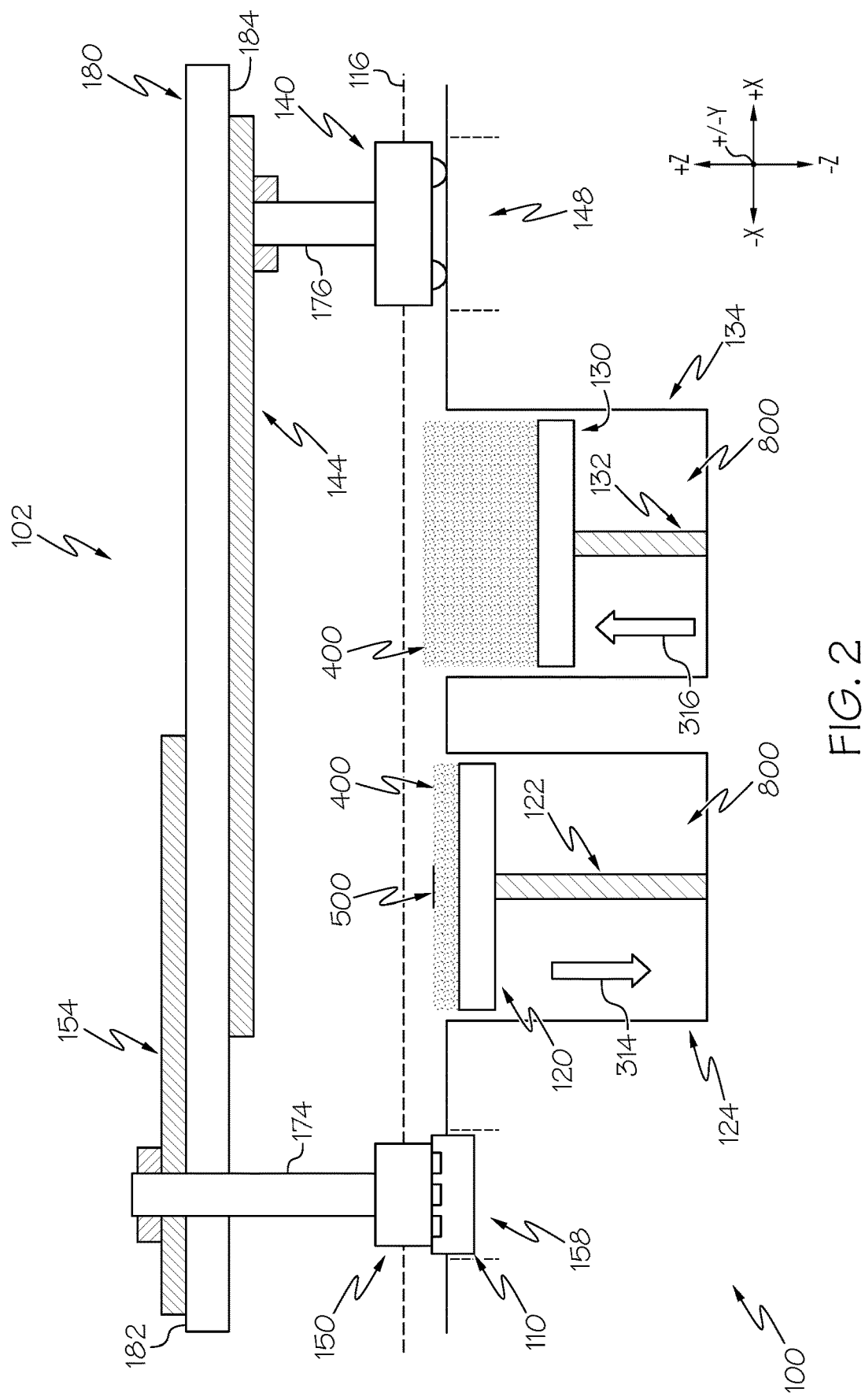
FIG. 2 schematically depicts components of an additive manufacturing apparatus according to one or more embodiments shown and described herein.

Referring now to FIG. 2, an embodiment of an additive manufacturing apparatus 100 is schematically depicted. The apparatus 100 includes a cleaning station 110, a build platform 120, and an actuator assembly 102. The apparatus 100 may optionally include a supply platform 130. The actuator assembly 102 comprises, among other elements, a recoat head 140 for distributing build material 400 and a print head 150 for depositing binder material 500. In embodiments, the recoat head 140 may further comprise an energy source for curing the binder material 500 as will be described in further detail herein. The actuator assembly 102 may be constructed to facilitate independent control of the recoat head 140 and the print head 150 along the working axis 116 of the apparatus 100. This allows for the recoat head 140 and the print head 150 to traverse the working axis 116 of the apparatus 100 in the same direction and/or in opposite directions and for the recoat head 140 and the print head 150 to traverse the working axis of the apparatus 100 at different speeds and/or the same speed. Independent actuation and control of the recoat head 140 and the print head 150, in turn, allows for at least some steps of the additive manufacturing process to be performed simultaneously thereby reducing the overall cycle time of the additive manufacturing process to less than the sum of the cycle time for each individual step. In the embodiments of the apparatus 100 described herein, the working axis 116 of the apparatus 100 is parallel to the +/−X axis of the coordinate axes depicted in the figures. It should be understood that the components of the additive manufacturing apparatus 100 traversing the working axis 116, such as the recoat head 140, the print head 150, or the like, need not be centered on the working axis 116. However, in the embodiments described herein, at least two of the components of the additive manufacturing apparatus 100 are arranged with respect to the working axis 116 such that, as the components traverse the working axis, the components could occupy the same or an overlapping volume along the working axis if not properly controlled.

In the embodiment depicted in FIG. 2, the apparatus 100 includes a cleaning station 110, a build platform 120, a supply platform 130 and an actuator assembly 102. However, it should be understood that, in other embodiments, the apparatus 100 does not include a supply platform 130, such as in embodiments where build material is supplied to the build platform 120 with, for example and without limitation, a build material hopper. In the embodiment depicted in FIG. 2, the cleaning station 110, the build platform 120, and the supply platform 130 are positioned in series along the working axis 116 of the apparatus 100 between a print home position 158 of the print head 150 located proximate an end of the working axis 116 in the −X direction, and a recoat home position 148 of the recoat head 140 located proximate an end of the working axis 116 in the +X direction. That is, the print home position 158 and the recoat home position 148 are spaced apart from one another in a horizontal direction that is parallel to the +/−X axis of the coordinate axes depicted in the figures and the cleaning station 110, the build platform 120, and the supply platform 130 are positioned therebetween. In the embodiments described herein, the build platform 120 is positioned between the cleaning station 110 and the supply platform 130 along the working axis 116 of the apparatus 100.

The cleaning station 110 is positioned proximate one end of the working axis 116 of the apparatus 100 and is co-located with the print home position 158 where the print head 150 is located or "parked" before and after depositing binder material 500 on a layer of build material 400 positioned on the build platform 120. The cleaning station 110 may include one or more cleaning sections (not shown) to facilitate cleaning the print head 150 between depositing operations. The cleaning sections may include, for example and without limitation, a soaking station containing a cleaning solution for dissolving excess binder material on the print head 150, a wiping station for removing excess binder material and excess build material from the print head 150, a jetting station for purging binder material and cleaning solution from the print head 150, a park station for maintaining moisture in the nozzles of the print head 150, or various combinations thereof. The print head 150 may be transitioned between the cleaning sections by the actuator assembly 102.

The build platform 120 is coupled to a lift system 800 comprising a build platform actuator 122 to facilitate raising and lowering the build platform 120 relative to the working axis 116 of the apparatus 100 in a vertical direction (i.e., a direction parallel to the +/−Z directions of the coordinate axes depicted in the figures). The build platform actuator 122 may be, for example and without limitation, a mechanical actuator, an electro-mechanical actuator, a pneumatic actuator, a hydraulic actuator, or any other actuator suitable for imparting linear motion to the build platform 120 in a vertical direction. Suitable actuators may include, without limitation, a worm drive actuator, a ball screw actuator, a pneumatic piston, a hydraulic piston, an electro-mechanical linear actuator, or the like. The build platform 120 and build platform actuator 122 are positioned in a build receptacle 124 located below the working axis 116 (i.e., in the −Z direction of the coordinate axes depicted in the figures) of the apparatus 100. During operation of the apparatus 100, the build platform 120 is retracted into the build receptacle 124 by action of the build platform actuator 122 after each layer of binder material 500 is deposited on the build material 400 located on build platform 120.

The supply platform 130 is coupled to a lift system 800 comprising a supply platform actuator 132 to facilitate raising and lowering the supply platform 130 relative to the working axis 116 of the apparatus 100 in a vertical direction (i.e., a direction parallel to the +/−Z directions of the coordinate axes depicted in the figures). The supply platform actuator 132 may be, for example and without limitation, a mechanical actuator, an electro-mechanical actuator, a pneumatic actuator, a hydraulic actuator, or any other actuator suitable for imparting linear motion to the supply platform 130 in a vertical direction. Suitable actuators may include, without limitation, a worm drive actuator, a ball screw actuator, a pneumatic piston, a hydraulic piston, an electro-mechanical linear actuator, or the like. The supply platform 130 and supply platform actuator 132 are positioned in a supply receptacle 134 located below the working axis 116 (i.e., in the −Z direction of the coordinate axes depicted in the figures) of the apparatus 100. During operation of the apparatus 100, the supply platform 130 is raised relative to the supply receptacle 134 and towards the working axis 116 of the apparatus 100 by action of the supply platform actuator 132 after a layer of build material 400 is distributed from the supply platform 130 to the build platform 120, as will be described in further detail herein.

Figure 3:
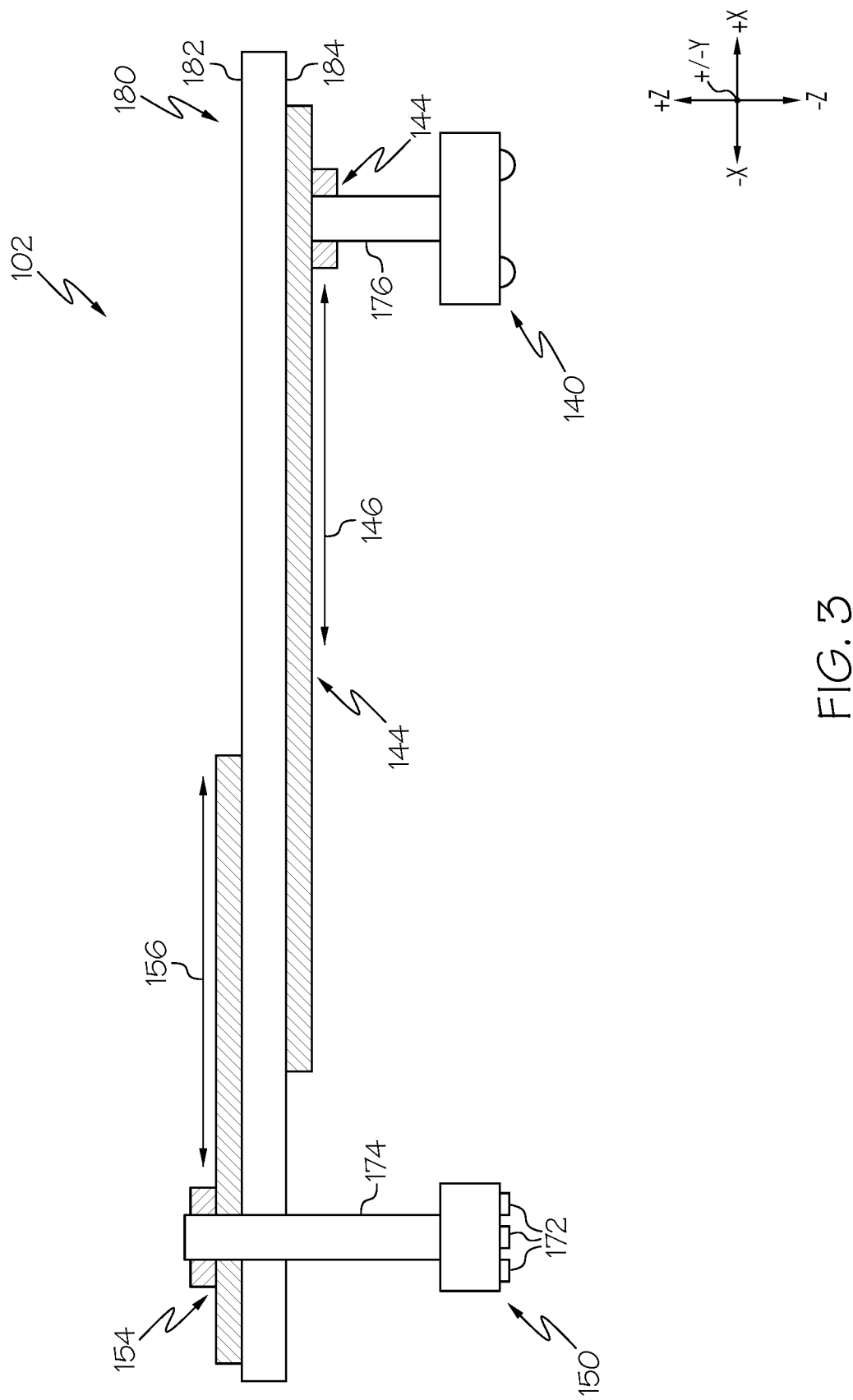
FIG. 3 schematically depicts an embodiment of an actuator assembly for an additive manufacturing apparatus according to one or more embodiments shown and described herein.

Referring now to FIGS. 2 and 3, FIG. 3 schematically depicts the actuator assembly 102 of the additive manufacturing apparatus 100 of FIG. 2. The actuator assembly 102 generally comprises the recoat head 140, the print head 150, a recoat head actuator 144, a print head actuator 154, an upper support 182, and a lower support 184. In the embodiments described herein, the upper support 182 and the lower support 184 extend in a horizontal direction (i.e., a direction parallel to the +/−X direction of the coordinate axes depicted in the figures) parallel to the working axis 116 (FIG. 2) of the apparatus 100 and are spaced apart from one another in the vertical direction. When the actuator assembly 102 is assembled over the cleaning station 110, the build platform 120, and the supply platform 130 as depicted in FIG. 2, the upper support 182 and the lower support 184 extend in a horizontal direction from at least the cleaning station 110 to beyond the supply platform 130.

In one embodiment, such as the embodiment of the actuator assembly 102 depicted in FIG. 2, the upper support 182 and the lower support 184 are opposite sides of a rail 180 that extends in a horizontal direction and is oriented such that the upper support 182 is positioned above and spaced apart from the lower support 184. For example, in one embodiment, the rail 180 may be rectangular or square in vertical cross section (i.e., a cross section in the Y-Z plane of the coordinate axes depicted in the figures) with the top and bottom surfaces of the rectangle or square forming the upper support 182 and the lower support 184, respectively. In an alternative embodiment (not depicted), the rail 180 may have an "I" configuration in vertical cross section (i.e., a cross section in the Y-Z plane of the coordinate axes depicted in the figures) with the upper and lower flanges of the "I" forming the upper support 182 and the lower support 184, respectively. However, it should be understood that other embodiments are contemplated and possible. For example and without limitation, the upper support 182 and the lower support 184 may be separate structures, such as separate rails, extending in the horizontal direction and spaced apart from one another in the vertical direction as depicted in an alternative embodiment of the actuator assembly shown in FIG. 4.

In the embodiments described herein, the recoat head actuator 144 is coupled to one of the upper support 182 and the lower support 184 and the print head actuator 154 is coupled to the other of the upper support 182 and the lower support 184 such that the recoat head actuator 144 and the print head actuator 154 are arranged in a "stacked" configuration. For example, in the embodiment of the actuator assembly 102 depicted in FIGS. 2 and 3, the recoat head actuator 144 is coupled to the lower support 184 and the print head actuator 154 is coupled to the upper support 182. However, it should be understood that, in other embodiments (not depicted) the recoat head actuator 144 may be coupled to the upper support 182 and the print head actuator 154 may be coupled to the lower support 184.

In the embodiments described herein, the recoat head actuator 144 is bi-directionally actuatable along a recoat motion axis 146 and the print head actuator 154 is bi-directionally actuatable along a print motion axis 156. That is, the recoat motion axis 146 and the print motion axis 156 define the axes along which the recoat head actuator 144 and the print head actuator 154 are actuatable, respectively. The recoat motion axis 146 and the print motion axis 156 extend in a horizontal direction and are parallel with the working axis 116 (FIG. 2) of the apparatus 100. In the embodiments described herein, the recoat motion axis 146 and the print motion axis 156 are parallel with one another and spaced apart from one another in the vertical direction due to the stacked configuration of the recoat head actuator 144 and the print head actuator 154. In some embodiments, such as the embodiment of the actuator assembly 102 depicted in FIG. 2, the recoat motion axis 146 and the print motion axis 156 are located in separate vertical planes (i.e., a plane parallel to the X-Z plane of the coordinate axes depicted in the figures). However, it should be understood that other embodiments are contemplated and possible, such as embodiments in which the recoat motion axis 146 and the print motion axis 156 are located in the same vertical plane.

In the embodiments described herein, the recoat head actuator 144 and the print head actuator 154 may be, for example and without limitation, mechanical actuators, electro-mechanical actuators, pneumatic actuators, hydraulic actuators, or any other actuator suitable for providing linear motion. Suitable actuators may include, without limitation, worm drive actuators, ball screw actuators, pneumatic pistons, hydraulic pistons, electro-mechanical linear actuators, or the like. In one particular embodiment, the recoat head actuator 144 and the print head actuator 154 are linear actuators manufactured by Aerotech® Inc. of Pittsburgh, Pennsylvania, such as the PRO225LM Mechanical Bearing, Linear Motor Stage.

In embodiments, the recoat head actuator 144 and the print head actuator 154 may each be a cohesive sub-system that is affixed to the rail 180, such as when the recoat head actuator 144 and the print head actuator 154 are PRO225LM Mechanical Bearing, Linear Motor Stages, for example. However, it should be understood that other embodiments are contemplated and possible, such as embodiments where the recoat head actuator 144 and the print head actuator 154 comprise multiple components that are individually assembled onto the rail 180 to form the recoat head actuator 144 and the print head actuator 154, respectively.

Still referring to FIGS. 2 and 3, the recoat head 140 is coupled to the recoat head actuator 144 such that the recoat head 140 is positioned below (i.e., in the −Z direction of the coordinate axes depicted in the figures) the upper support 182 and the lower support 184. When the actuator assembly 102 is assembled over the cleaning station 110, the build platform 120, and the supply platform 130 as depicted in FIG. 2, the recoat head 140 is situated on the working axis 116 (FIG. 2) of the apparatus 100. Thus, bi-directional actuation of the recoat head actuator 144 along the recoat motion axis 146 affects bi-directional motion of the recoat head 140 on the working axis 116 of the apparatus 100. In the embodiment of the actuator assembly 102 depicted in FIGS. 2 and 3, the recoat head 140 is coupled to the recoat head actuator 144 with support bracket 176 such that the recoat head 140 is positioned on the working axis 116 (FIG. 2) of the apparatus 100 while the recoat head actuator 144 is positioned above the working axis 116. Positioning the recoat head actuator 144 above the working axis 116 of the apparatus 100 reduces fouling of the recoat head actuator 144 with powder from either the build platform 120 or the supply platform 130. This increases the maintenance interval for the recoat head actuator, increases the service life of the recoat head actuator, reduces machine downtime, and reduces build errors due to fouling of the recoat head actuator 144. In addition, positioning the recoat head actuator 144 above the working axis 116 of the apparatus 100 allows for improved visual and physical access to the build platform 120 and the supply platform 130, improving the ease of maintenance and allowing for better visual observation (from human observation, camera systems, or the like) of the additive manufacturing process. In some embodiments described herein, the recoat head 140 may be fixed in directions orthogonal to the recoat motion axis 146 and the working axis 116 (i.e., fixed along the +/−Z axis and/or fixed along the +/−Y axis).

Similarly, the print head 150 is coupled to the print head actuator 154 such that the print head 150 is positioned below (i.e., in the −Z direction of the coordinate axes depicted in the figures) the upper support 182 and the lower support 184. When the actuator assembly 102 is assembled over the cleaning station 110, the build platform 120, and the supply platform 130 as depicted in FIG. 2, the print head 150 is situated on the working axis 116 (FIG. 2) of the apparatus 100. Thus, bi-directional actuation of the print head actuator 154 along the print motion axis 156 affects bi-directional motion of the print head 150 on the working axis 116 of the apparatus 100. In the embodiment of the actuator assembly 102 depicted in FIGS. 2 and 3, the print head 150 is coupled to the print head actuator 154 with support bracket 174 such that the print head 150 is positioned on the working axis 116 (FIG. 2) of the apparatus 100 and the print head actuator 154 is positioned above the working axis 116. Positioning the print head actuator 154 above the working axis 116 of the apparatus 100 reduces fouling of the print head actuator 154 with powder from either the build platform 120 or the supply platform 130. This increases the maintenance interval for the print head actuator 154, increases the service life of the print head actuator 154, reduces machine downtime, and reduces build errors due to fouling of the print head actuator 154. In addition, positioning the print head actuator 154 above the working axis 116 of the apparatus 100 allows for improved visual and physical access to the build platform 120 and the supply platform 130, improving the ease of maintenance and allowing for better visual observation (from human observation, camera systems, or the like) of the additive manufacturing process. In some embodiments described herein, the print head 150 may be fixed in directions orthogonal to the print motion axis 156 and the working axis 116 (i.e., fixed along the +/−Z axis and/or fixed along the +/−Y axis).

In embodiments, the recoat head actuator 144 and the print head actuator 154 overlap over the build receptacle 124, as depicted in FIG. 2. As such, the range of motion of the recoat head actuator 144 (and attached recoat head 140) and the print head actuator 154 (and attached print head 150) also overlap over the build receptacle 124. In embodiments, the range of motion of the recoat head actuator (and attached recoat head 140) is greater than the range of motion of the print head actuator 154 (and attached print head 150). This is true when, for example, the apparatus 100 includes a supply receptacle 134 positioned between the build receptacle 124 and the recoat home position 148. However, it should be understood that other embodiments are contemplated and possible. For example, in embodiments (not depicted) the recoat head actuator 144 and the print head actuator 154 may overlap along the entire length of the working axis 116 of the apparatus 100. In these embodiments, the range of motion of the recoat head actuator 144 (and attached recoat head 140) and the print head actuator 154 (and attached print head 150) are co-extensive over the working axis 116 of the apparatus 100.

As noted above, in the embodiments described herein the recoat head 140 and the print head 150 are both located on the working axis 116 of the apparatus 100. As such, the movements of the recoat head 140 and the print head 150 on the working axis 116 occur along the same axis and are thus co-linear. With this configuration, the recoat head 140 and the print head 150 may occupy the same space (or portions of the same space) along the working axis 116 of the apparatus 100 at different times during a single build cycle. However, the recoat motion axis 146 of the recoat head actuator 144 and the print motion axis 156 of the print head actuator 154 are spaced apart from one another in a vertical direction due to the stacked configuration of the actuators 144, 154. The spacing of the recoat motion axis 146 and the print motion axis 156 permits the recoat head 140 and the print head 150 to be moved along the working axis 116 of the apparatus 100 simultaneously in a coordinated fashion, in the same direction and/or in opposing directions, at the same speeds or different speeds. This, in turn, allows for individual steps of the additive manufacturing process, such as the distributing step (also referred to herein as the recoating step), the depositing step (also referred to herein as the printing step), the curing (or heating) step, and/or the cleaning step to be performed with overlapping cycle times. For example, the distributing step may be initiated while the cleaning step is being completed; the depositing step may be initiated while the distributing step in completed; and/or the cleaning step may be initiated while the distributing step is being completed. This may reduce the overall cycle time of the additive manufacturing apparatus 100 to less than the sum of the distributing cycle time (also referred to herein as the recoat cycle time), the depositing cycle time (also referred to herein as the print cycle time), and/or the cleaning cycle time.

While FIGS. 2 and 3 schematically depict an embodiment of an actuator assembly 102 which comprises an upper support 182 and a lower support 184 with the recoat head actuator 144 and the print head actuator 154 mounted thereto, respectively, it should be understood that other embodiments are contemplated and possible, such as embodiments which comprise more than two supports and more than two actuators.

Figure 4A:
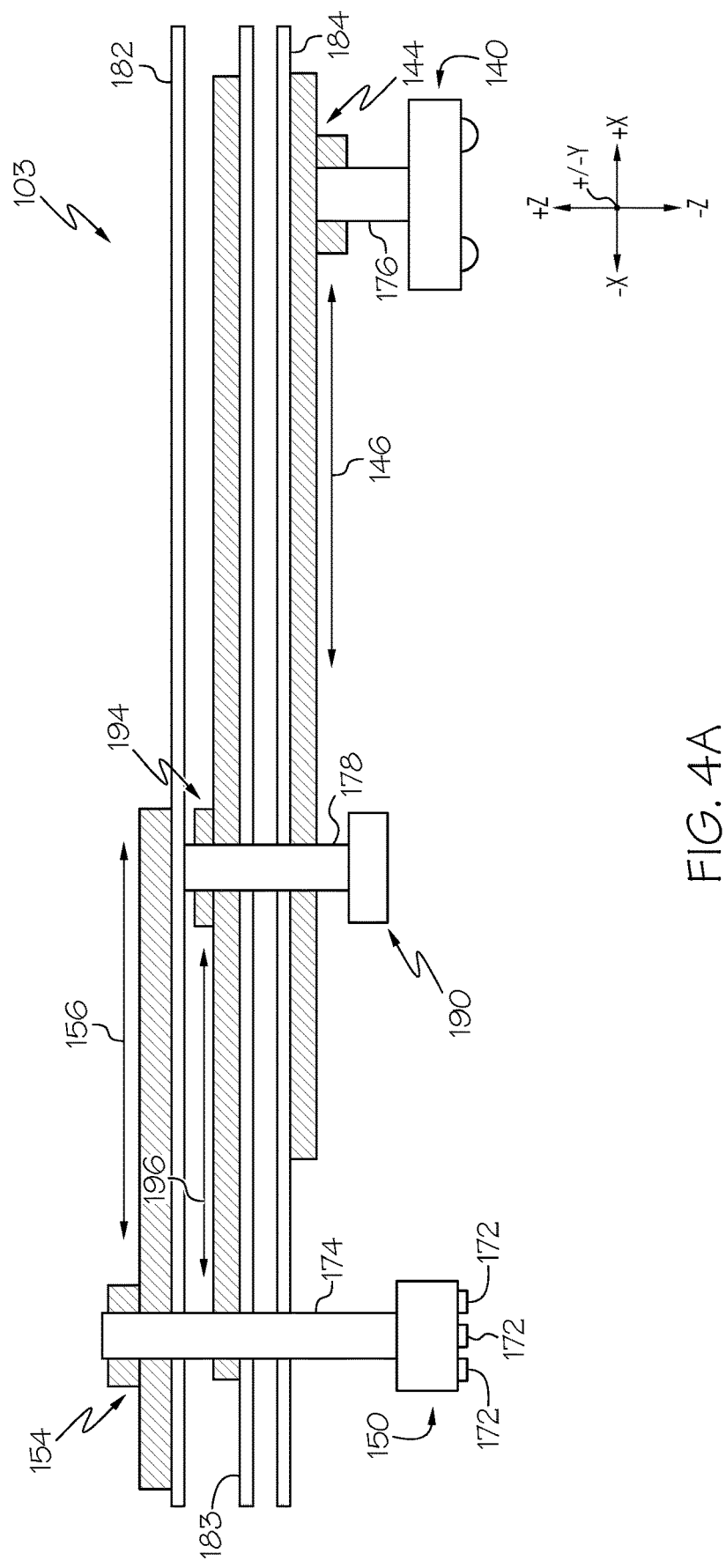
FIG. 4A schematically depicts an embodiment of an actuator assembly for an additive manufacturing apparatus according to one or more embodiments shown and described herein.
Figure 4B:
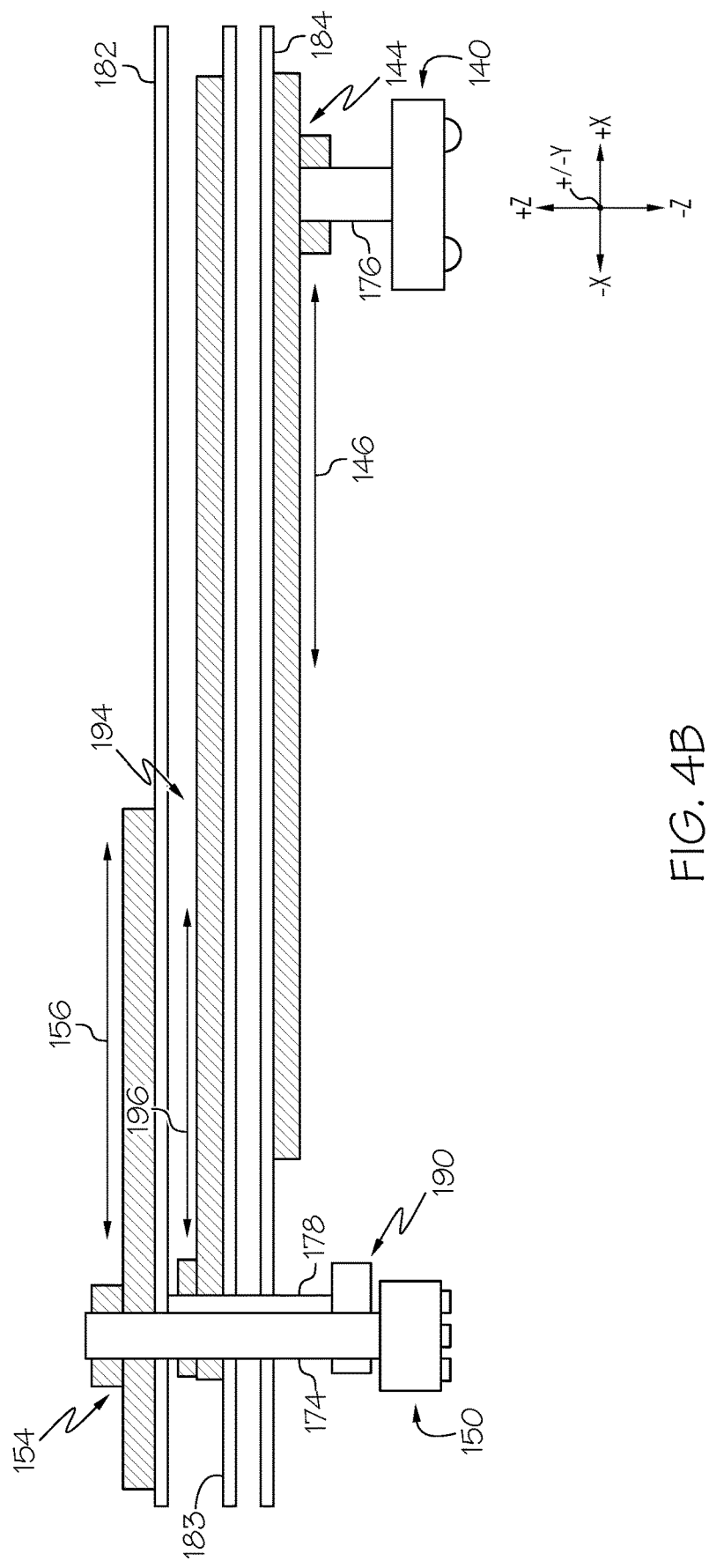
FIG. 4B schematically depicts the actuator assembly of FIG. 4A with the support bracket and process accessory of the process accessory actuator nested within the support bracket of the print head actuator.

For example, FIGS. 4A and 4B schematically depict another embodiment of an actuator assembly 103. In this embodiment, the actuator assembly 103 comprises an upper support 182, a lower support 184, a recoat head 140, a recoat head actuator 144, and a print head actuator 154 as described above with respect to FIG. 3. However, in this embodiment, the actuator assembly 103 further comprises an intermediate support 183 disposed between the upper support 182 and the lower support 184. Each of the upper support 182, the intermediate support 183, and the lower support 184 extend in a horizontal direction (i.e., a direction parallel to the +/−X direction of the coordinate axes depicted in the figures) parallel to the working axis 116 (FIG. 2) of the apparatus 100 and are spaced apart from one another in the vertical direction.

In the embodiment depicted in FIGS. 4A and 4B, the recoat head actuator 144 is coupled to the lower support 184, the print head actuator 154 is coupled to the upper support 182, and a process accessory actuator 194 is coupled to the intermediate support 183 such that the recoat head actuator 144, the print head actuator 154, and the process accessory actuator 194 are arranged in a "stacked" configuration. It should be understood that, in other embodiments (not depicted) the recoat head actuator 144, the print head actuator 154, and the process accessory actuator 194 may be coupled to different ones of the upper support 182, the intermediate support 183, and the lower support 184.

The recoat head actuator 144 and the print head actuator 154 may be bi-directionally actuatable as described herein with respect to FIGS. 2 and 3. Similarly, the process accessory actuator 194 may be bi-directionally actuatable along an accessory motion axis 196. That is, the accessory motion axis 196 defines the axis along which the process accessory actuator 194 is actuatable. Like the recoat motion axis 146 and the print motion axis 156, the accessory motion axis 196 extends in a horizontal direction and is parallel with the working axis 116 (FIG. 2) of the apparatus 100. In the embodiment depicted in FIGS. 4A and 4B, the recoat motion axis 146, the print motion axis 156, and the accessory motion axis 196 are parallel with one another and spaced apart from one another in the vertical direction due to the stacked configuration of the recoat head actuator 144, the print head actuator 154, and the process accessory actuator 194. In some embodiments, the recoat motion axis 146, the print motion axis 156, and the accessory motion axis 196 are located in different vertical planes (i.e., a plane parallel to the X-Z plane of the coordinate axes depicted in the figures). However, it should be understood that other embodiments are contemplated and possible, such as embodiments in which the recoat motion axis 146, the print motion axis 156, and the accessory motion axis 196 are located in the same vertical plane.

Like, the recoat head actuator 144 and the print head actuator 154, the process accessory actuator 194 may be, for example and without limitation, a mechanical actuator, an electro-mechanical actuator, a pneumatic actuator, a hydraulic actuator, or any other actuator suitable for providing linear motion. Suitable actuators may include, without limitation, a worm drive actuator, a ball screw actuator, a pneumatic piston, a hydraulic piston, an electro-mechanical linear actuator, or the like. In one particular embodiment, the process accessory actuator 194 is a linear actuator manufactured by Aerotech® Inc. of Pittsburgh, Pennsylvania, such as the PRO225LM Mechanical Bearing, Linear Motor Stage.

Still referring to FIGS. 4A and 4B, the process accessory 190 is coupled to the process accessory actuator 194 such that the process accessory 190 is positioned below (i.e., in the −Z direction of the coordinate axes depicted in the figures) the upper support 182, the intermediate support 183, and the lower support 184. When the actuator assembly 103 is assembled over the cleaning station 110, the build platform 120, and the supply platform 130, similar to the actuator assembly 102 depicted in FIG. 2, the process accessory 190 may be situated on the working axis 116 (FIG. 2) of the apparatus 100 or above (i.e., in the +Z direction of the coordinate axes depicted in the figures) the working axis 116. Thus, bi-directional actuation of the process accessory actuator 194 along the accessory motion axis 196 affects bi-directional motion of the process accessory 190 on the working axis 116 or parallel to the working axis 116 of the apparatus 100. In the embodiment of the actuator assembly 103 depicted in FIGS. 4A and 4B, the process accessory 190 is coupled to the process accessory actuator 194 with support bracket 178 such that the process accessory 190 is positioned above the working axis 116 (FIG. 2). In some embodiments described herein, the process accessory 190 may be fixed in directions orthogonal to the accessory motion axis 196 and the working axis 116 (i.e., fixed along the +/−Z axis and/or fixed along the +/−Y axis). As noted above, the recoat head 140, the print head 150, and the process accessory 190 may be located on the working axis 116 of the apparatus 100. As such, the movements of the recoat head 140, the print head 150, and the process accessory 190 on the working axis 116 occur along the same axis and are thus co-linear. With this configuration, the recoat head 140, the print head 150, and the process accessory 190 may occupy the same space (or portions of the same space) along the working axis 116 of the apparatus 100 at different times during a single build cycle. However, the recoat motion axis 146 of the recoat head actuator 144, the print motion axis 156 of the print head actuator 154, and the accessory motion axis 196 of the process accessory actuator 194 are spaced apart from one another in a vertical direction due to the stacked configuration of the actuators 144, 154, 194. The spacing of the recoat motion axis 146, the print motion axis 156, and the accessory motion axis 196 permits the recoat head 140, the print head 150, and the process accessory 190 to be moved along the working axis 116 of the apparatus 100 simultaneously in a coordinated fashion, in the same direction and/or in opposing directions, at the same speeds or different speeds. This, in turn, allows for individual steps of the additive manufacturing process, such as the distributing step (also referred to herein as the recoating step), the depositing step (also referred to herein as the printing step), the curing (or heating) step, the cleaning step, and/or additional steps (such as sensing steps, curing steps, or the like) to be performed with overlapping cycle times. For example, the distributing step may be initiated while the cleaning step is being completed; the depositing step may be initiated while the distributing step in completed; and/or the cleaning step may be initiated while the distributing step is being completed. This may reduce the overall cycle time of the additive manufacturing apparatus 100 to less than the sum of the distributing cycle time (also referred to herein as the recoat cycle time), the depositing cycle time (also referred to herein as the print cycle time), and/or the cleaning cycle time.

In embodiments, the support brackets 174, 176, 178 may be sized and shaped to allow the support bracket 178 and process accessory 190 attached to the process accessory actuator 194 to nest within the support bracket 174 attached to the print head actuator 154, as depicted in FIG. 4B. Nesting the process accessory 190 within the support bracket 174 allows the print head 150 and/or the recoat head 140 to traverse the working axis 116 (FIG. 2) of the apparatus 100 unencumbered.

While FIGS. 4A and 4B schematically depicted the print head actuator 154 coupled to the upper support 182, the recoat head actuator 144 coupled to the lower support 184, and the process accessory actuator 194 coupled to the intermediate support, it should be understood that other embodiments are contemplated and possible. For example and without limitation, the print head actuator 154 may be coupled to the lower support 184 and the recoat head actuator 144 could be coupled to the upper support 182. Accordingly, it should be understood that the print head actuator 154 (and print head 150) may be coupled to any one of the upper support 182, the lower support 184 and the intermediate support 183, the recoat head actuator 144 (and recoat head 140) may be coupled to another of the upper support 182, the lower support 184 and the intermediate support 183, and the process accessory actuator 194 (and process accessory 190) may be coupled to the remaining one of the upper support 182, the lower support 184 and the intermediate support 183.

Still referring to FIGS. 4A and 4B, the process accessory 190 may include one or more accessories utilized during the additive manufacturing process. For example and without limitation, the process accessory 190 may be a sensor for detecting a property of the build material 400 distributed on the build platform 120 and/or the binder material 500 deposited on the build platform 120. Examples of sensors may include, without limitation, image sensors such as cameras, thermal detectors, pyrometers, profilometers, ultrasonic detectors, and the like. In these embodiments, signals from the sensors may be fed back to the control system (described in further detail herein) of the additive manufacturing apparatus to facilitate feedback control of one or more functions of the additive manufacturing apparatus. Alternatively or additionally, the process accessory 190 may include an energy source for heating the build material 400 distributed on the build platform 120 and/or curing the binder material 500 deposited on the build platform 120. Examples of energy sources may include, without limitation, infrared heaters, ultraviolet lamps, laser light sources, and the like. In embodiments, the energy source may emit a wavelength or a range of wavelengths of electromagnetic radiation suitable for curing (or at least initiating the curing) of the binder material 500 deposited on the build material 400 distributed on the build platform 120. In instances where the energy source is an infrared heater, the energy source may also preheat the build material 400 as it is distributed from the supply platform 130 to the build platform 120 that may assist in expediting the curing of subsequently deposited binder material 500. Alternatively or additionally, the process accessory 190 may include a projector for projecting a light pattern onto the build platform, such as a DLP projector or the like. The light pattern may be, for example, a pattern corresponding to the pattern of binder material deposited on the build material located on the build platform, an image of a layer of an object to be built on the build platform, or the like. Alternatively or additionally, the process accessory 190 may be an end effector, such as a mechanical gripper or the like, which may be used to position a component (e.g., a material build hopper, a lid of the build receptacle, or the like) along the working axis 116 of the additive manufacturing apparatus). Alternatively or additionally, the process accessory 190 may be a print head, such as, for example, a print head as described herein. Based on the foregoing, it should be understood that the intermediate support 183 and process accessory actuator 194 may be used to support a variety of different process accessories used in conjunction with additive manufacturing processes including, without limitation, those process accessories described herein.

Referring now to FIGS. 2-4B, in the embodiments described herein, the print head 150 may deposit the binder material 500 on a layer of build material 400 distributed on the build platform 120 through an array of nozzles 172 located on the underside of the print head 150 (i.e., the surface of the print head 150 facing the build platform 120). In embodiments, the array of nozzles 172 are spatially distributed in the XY plane of the coordinate axes depicted in the figures. In some embodiments, the print heads may also define the geometry of the part being built. In embodiments, the nozzles 172 may be piezoelectric print nozzles and, as such, the print head 150 is a piezo print head. In alternative embodiments, the nozzles 172 may be thermal print nozzles and, as such, the print head 150 is a thermal print head. In alternative embodiments, the nozzles 172 may be spray nozzles. In such embodiments, the print head 150 and nozzles 172 may work in conjunction with a projector that projects an image that defines the geometry of a layer of an object being built on the build platform. In such embodiments, the projector may be coupled to the accessory actuator, as described herein above. For example, the print head 150 may blanket deposit binder material on the build material and the projector projects a cure pattern of energy on to the binder material to selectively cure the binder material. Alternatively, the print head 150 may selectively deposit binder material in a pattern and the projector projects energy on to the entire build platform thereby curing the binder material. In another embodiment, the print head 150 may deposit binder material in a pre-determined patter and the projector projects a pre-defined patter of energy with spatial variations in intensity to selectively cure (or partially cure) the deposited binder material.

In addition to the nozzles 172, in some embodiment, the print head 150 may further comprise one or more sensors (not depicted) for detecting a property of the build material 400 distributed on the build platform 120 and/or the binder material 500 deposited on the build platform 120. Examples of sensors may include, without limitation, image sensors such as cameras, thermal detectors, pyrometers, profilometers, ultrasonic detectors, and the like. In these embodiments, signals from the sensors may be fed back to the control system (described in further detail herein) of the additive manufacturing apparatus to facilitate feedback control of one or more functions of the additive manufacturing apparatus.

Alternatively or additionally, the print head 150 may comprise at least one energy source (not depicted). The energy source may emit a wavelength or a range of wavelengths of electromagnetic radiation suitable for curing (or at least initiating curing) the binder material 500 deposited on the build material 400 distributed on the build platform 120. For example, the energy source may comprise an infrared heater or an ultraviolet lamp which emit wavelengths of infrared or ultraviolet electromagnetic radiation suitable for curing the binder material 500 previously deposited on the layer of build material 400 distributed on the build platform 120. In instances where the energy source is an infrared heater, the energy source may also preheat the build material 400 as it is distributed from the supply platform 130 to the build platform 120 that may assist in expediting the curing of subsequently deposited binder material 500.

Referring now to FIGS. 2-4B and 5A-5C, FIGS. 5A-5C depict different embodiments of recoat heads 140a, 140b, 140c. As noted herein, the recoat head 140 is used in the additive manufacturing apparatus 100 to distribute build material 400 and, more specifically, to distribute build material 400 from the supply platform 130 to the build platform 120. That is, the recoat head 140 is used to "recoat" the build platform 120 with build material 400. The recoat head 140 may include at least one of a roller, blade, or wiper to facilitate the distribution of build material 400 from the supply platform 130 to the build platform 120.

Figure 5A:
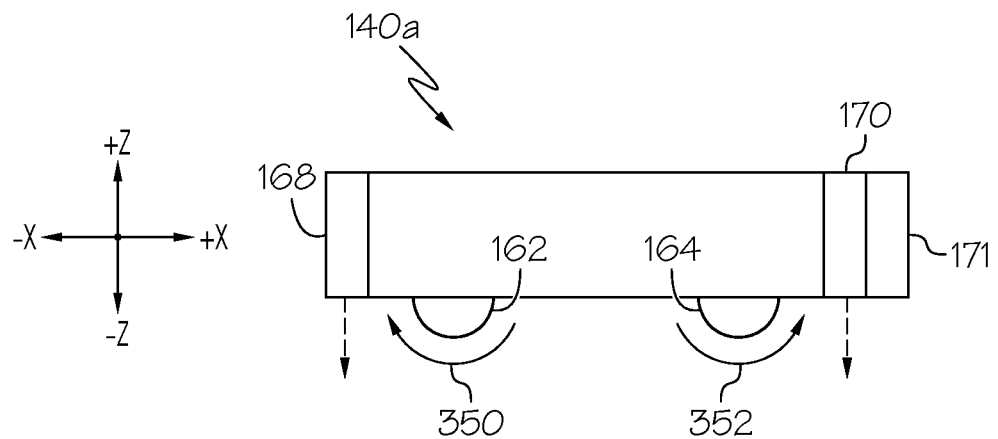
FIG. 5A schematically depicts a recoat head for an additive manufacturing apparatus according to one or more embodiments shown and described herein.

For example, FIG. 5A schematically depicts one embodiment of a recoat head 140a which includes a pair of rollers 162, 164. In one embodiment, the rollers 162, 164 may be rotated in the same direction. In another embodiment, the rollers 162, 164 may be rotated in opposite directions. For example, the leading roller 162 (i.e., the first roller to contact the build material 400 when the recoat head 140a is traversed from the recoat home position 148 towards the print home position 158) may be rotated counter to the direction of travel of the recoat head 140a (i.e., clockwise in FIG. 5A) as indicated by arrow 350 while the trailing roller 164 is rotated in the same direction of travel of the recoat head 140a (i.e., counter clockwise in FIG. 5A) as indicated by arrow 152. In this embodiment, the leading roller 162 lofts the build material 400, which aids in distributing the build material 400 from the supply platform 130 to the build platform 120, while the trailing roller 164 compacts the build material that has been distributed.

Figure 5B:
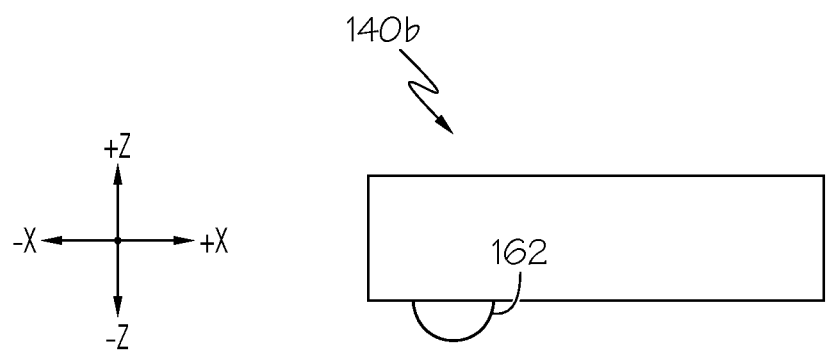
FIG. 5B schematically depicts a recoat head for an additive manufacturing apparatus according to one or more embodiments shown and described herein.

FIG. 5B depicts another embodiment of a recoat head 140b. In this embodiment, the recoat head 140b includes a single roller 162. The roller 162 may be rotated counter to the direction of travel as the recoat head 140 is traversed from the recoat home position 148 towards the print home position 158. This allows the roller 162 to initially loft and distribute the build material 400 as it advances towards the print home position 158 and compact the build material 400 as it returns towards the recoat home position 148.

Figure 5C:
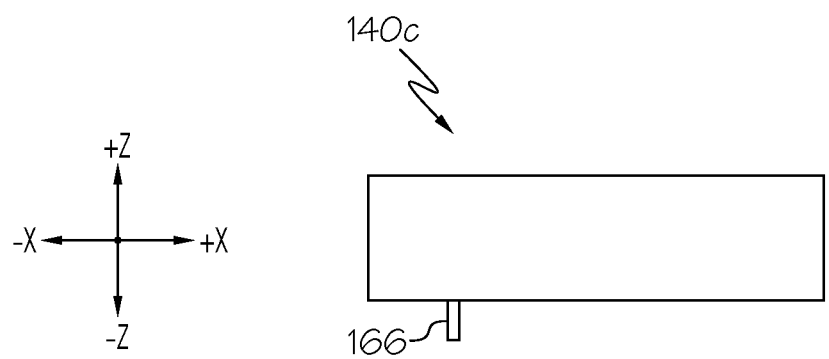
FIG. 5C schematically depicts a recoat head for an additive manufacturing apparatus according to one or more embodiments shown and described herein.

Referring to FIG. 5C, in another embodiment, the recoat head 140c may comprise a blade or wiper 166 (e.g., a doctor blade) extending from an underside (i.e., the surface of the recoat head 140c facing the supply platform 130) of the recoat head 140c. In another embodiment (not depicted) the recoat head may include one or more wipers and one or more rollers. As the recoat head 140c is traversed from the recoat home position 148 towards the print home position 158, the wiper 166 distributes build material from the supply platform 130 to the build platform 120.

In addition to at least one of a roller 162 and a wiper 166, the recoat head 140 may further comprise at least one energy source. Referring again to FIG. 5A by way of example, the recoat head 140a includes a leading energy source 168 and a trailing energy source 170. In these embodiments, the energy source(s) may emit a wavelength or a range of wavelengths of electromagnetic radiation suitable for curing (or at least initiating curing) the binder material 500 deposited on the build material 400 distributed on the build platform 120. For example, the leading energy source 168 and/or the trailing energy source 170 may comprise an infrared heater or an ultraviolet lamp which emit wavelengths of infrared or ultraviolet electromagnetic radiation, respectively, suitable for curing the binder material 500 previously deposited on the layer of build material 400 distributed on the build platform 120. In instances where the energy sources 168, 170 are infrared heaters, the energy sources may also preheat the build material 400 as it is distributed from the supply platform 130 to the build platform 120 that may assist in expediting the curing of subsequently deposited binder material 500.

While FIG. 5A depicts the recoat head 140a as comprising two energy sources 168, 170, it should be understood that the recoat head 140a may comprise a single energy source, such as either the leading energy source 168 or the trailing energy source 170. Moreover, it should be understood that, while energy sources are only depicted in conjunction with the embodiment of the recoat head 140a of FIG. 5A, the energy sources may be used in conjunction with any embodiment of the recoat head.

In addition to at least one of a roller 162 and a wiper 166, in some embodiments, the recoat head 140 may further comprise at least one sensor 171. Referring again to FIG. 5A by way of example, the recoat head 140a may further comprise at least one sensor 171 for detecting a property of the build material 400 distributed on the build platform 120 and/or the binder material 500 deposited on the build platform 120. Examples of sensors may include, without limitation, image sensors such as cameras, thermal detectors, pyrometers, profilometers, ultrasonic detectors, and the like. In these embodiments, signals from the sensors may be fed back to the control system (described in further detail herein) of the additive manufacturing apparatus to facilitate feedback control of one or more functions of the additive manufacturing apparatus.

While FIG. 5A depicts the recoat head 140a as comprising at least one sensor 171, it should be understood that at least one sensor may be used in conjunction with any embodiment of the recoat head described herein.

Referring again to FIG. 2, at least one of the recoat head 140, the print head 150, and the process accessory 190 (when included) may include a working axis proximity sensor (not depicted), such as a capacitive proximity sensor, a photoelectric sensor, an inductive proximity sensor, or the like, to detect the relative position of another of the recoat head 140, the print heads 150, and the process accessory 190 (when included) along the working axis 116 of the additive manufacturing apparatus 100. The working axis proximity sensors may be communicatively coupled to the control system 200 (described in further detail herein) of the additive manufacturing apparatus 100. Signals from the working axis proximity sensor may be fed back to the control system 200 and the control system utilizes the signals to detect potential collisions between the recoat head 140, the print head 150, and the process accessory 190 (when included) as they are individually traversed along the working axis 116 of the additive manufacturing apparatus 100.

More specifically, the motion of the recoat head 140, the print head 150, and the process accessory 190 (when included) may be controlled by the control system 200 according to computer readable and executable instructions stored in a memory of the control system 200. It is assumed that the computer readable and executable instructions are formulated to avoid co-locating the recoat head 140, the print head 150, and the process accessory 190 (when included) in the same space (or portions of the same space) along the working axis 116 of the apparatus 100 at the same time during a single build cycle. However, the control system 200 may utilize signal(s) from the working axis proximity sensor to ensure that the recoat head 140, the print head 150, and the process accessory 190 (when included) do not occupy the same space (or portions of the same space) along the working axis 116 of the apparatus 100 at the same time during a single build cycle. If the potential for a collision is determined based on the signals received from the working axis proximity sensor, the control system 200 may change the speed of one or more of recoat head 140, the print head 150, and the process accessory 190 (when included) along the working axis 116 to avoid the collision. Alternatively, if the potential for a collision is determined based on the signals received from the working axis proximity sensor, the control system 200 may halt the additive manufacturing process to prevent damage to one or more of the recoat head 140, the print head 150, and the process accessory 190 (when included).

In some other embodiments, collisions between components may be avoided by knowing the position of the components along the working axis and controlling the positioning of the components with a control system to prevent the components from occupying the same space at the same time. For example, linear encoders may be used in conjunction with the print head actuator and the recoat head actuator (and the knowledge of the dimensions of the print head and recoat head) to determine the position of the print head and the recoat head along the working axis. With this information, the control system can be programmed to avoid collisions between the print head and recoat head based on the location as determined by the linear encoders.

Alternatively or additionally, the additive manufacturing apparatus (specifically the control system) may be programmed to avoid collisions between the print head and the recoat head. For example, using the recoat head start positions with respect to the build platform and the supply platform, the recoat head end positions with respect to the build platform and the supply platform, the speed of the recoat head over the build platform, the speed of the recoat head over the supply platform, the acceleration(s) of the recoat head, the print head start position, the print head end position, the speed of the print head over the print platform, and the acceleration of the print head over the build platform, the motion of the print head and the recoat head can be synchronized and choreographed to avoid collisions.

Figure 6:
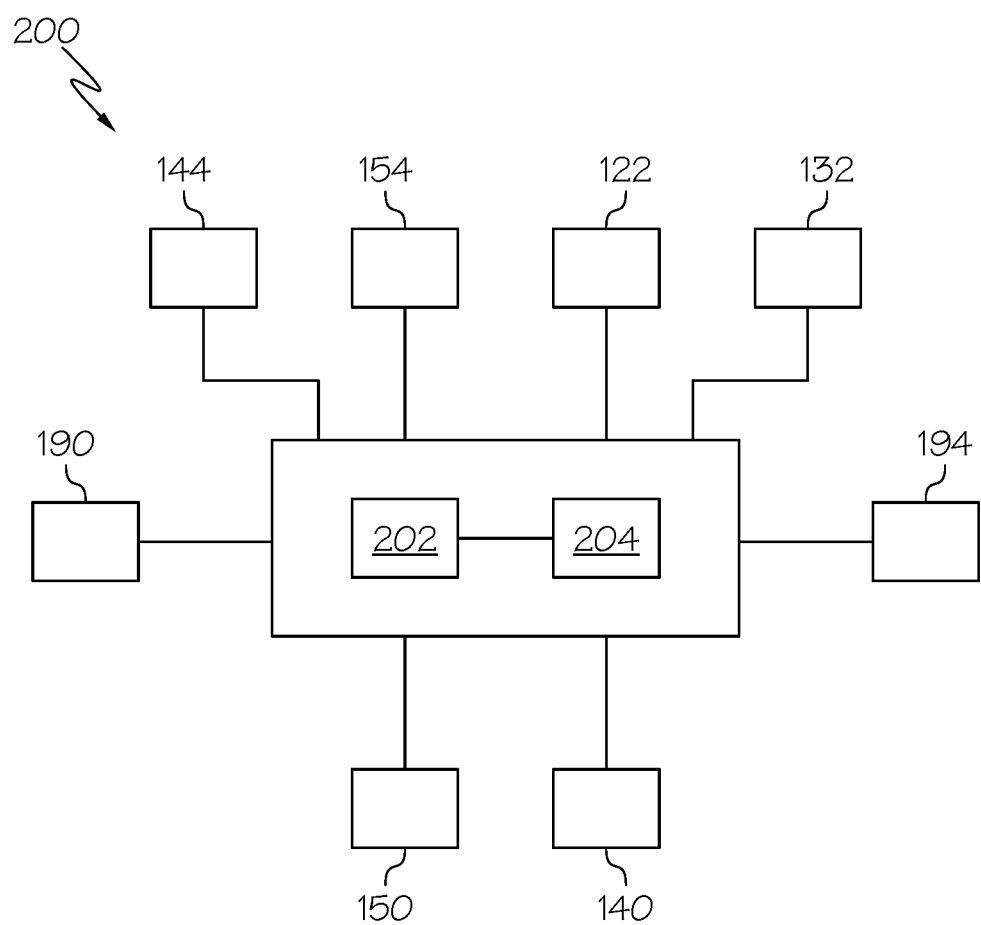
FIG. 6 schematically depicts a portion of control system for an additive manufacturing apparatus according to one or more embodiments shown and described herein.

Referring now to FIGS. 2 and 6, FIG. 6 schematically depicts a portion of a control system 200 for controlling the additive manufacturing apparatus 100 of FIG. 2 with an actuator assembly as depicted in either FIG. 3 or FIG. 4. The control system 200 is communicatively coupled to the recoat head actuator 144, the print head actuator 154, the build platform actuator 122, the supply platform actuator 132, and the process accessory actuator 194 (when included). The control system 200 may also be communicatively coupled to the print head 150, the recoat head 140, and the process accessory 190 (when included). In embodiments where one or more of the print head 150, the recoat head 140, and the process accessory 190 (when included) comprise a working axis proximity sensor (not depicted), the control system 200 may also be communicatively coupled to the working axis proximity sensor(s). In the embodiments described herein, the control system 200 comprises a processor 202 communicatively coupled to a memory 204. The processor 202 may include any processing component(s), such as a central processing unit or the like, configured to receive and execute computer readable and executable instructions stored in, for example, the memory 204. In the embodiments described herein, the processor 202 of the control system 200 is configured to provide control signals to (and thereby actuate) the recoat head actuator 144, the print head actuator 154, the build platform actuator 122, the supply platform actuator 132, and the process accessory actuator 194 (when included). The processor 202 may also be configured to provide control signals to (and thereby actuate) the print head 150, the recoat head 140, and the process accessory 190 (when included). The control system 200 may also be configured to receive signals from one or more sensors of the process accessory 190 and/or recoat head 140 and, based on these signals, actuate one or more of the recoat head actuator 144, the print head actuator 154, the build platform actuator 122, the supply platform actuator 132, the process accessory actuator 194, the print head 150, the recoat head 140, and/or the process accessory 190.

In the embodiments described herein, the computer readable and executable instructions for controlling the additive manufacturing apparatus 100 are stored in the memory 204 of the control system 200. The memory 204 is a non-transitory computer readable memory. The memory 204 may be configured as, for example and without limitation, volatile and/or nonvolatile memory and, as such, may include random access memory (including SRAM, DRAM, and/or other types of random access memory), flash memory, registers, compact discs (CD), digital versatile discs (DVD), and/or other types of storage components.

The operation of the additive manufacturing apparatus 100 will now be described in further detail with specific reference to FIGS. 2, 6, and 7A-7C.

Referring to FIG. 2, the additive manufacturing apparatus 100 is schematically depicted at initiation of a build cycle. The phrase "build cycle," as used herein, refers to the process of building a single layer of an object on the build platform 120. In the embodiments described herein, the "build cycle" may include one iteration each of raising the supply platform 130, lowering the build platform 120, distributing a new layer of build material 400 from the supply platform 130 to the build platform 120, depositing binder material 500 on the new layer of build material 400 distributed on the build platform 120, and optionally the cleaning of the print head 150. The additive manufacturing apparatus 100 comprises an overall build cycle time $T_{BC}$ which is the elapsed time during a single build cycle.

In describing the operation of the additive manufacturing apparatus 100, specific reference will be made herein to build material 400 and binder material 500. The build material generally comprises a powder material that is spreadable or flowable. Categories of suitable powder material include, without limitation, dry powder material and wet powder material (e.g., a powder material entrained in a slurry). In embodiments, the build material may be capable of being bound together with the binder material. In embodiments, the build material may also be capable of being fused together, such as by sintering. In embodiments, the build material may be an inorganic powder material including, for example and without limitation, ceramic powders, metal powders, glass powders, carbon powder, sand, cement, calcium phosphate powder, and various combinations thereof. In embodiments, the build material may comprise an organic powder material including, for example and without limitation, plastic powders, polymer powders, soap, powders formed from foodstuff (i.e., edible powders), and various combinations thereof. In some embodiments, the build material may be (or include) pharmaceutically active components, such as when the build material is or contains a pharmaceutical. In embodiments, the build material may be a combination of inorganic powder material and organic powder material.

The build material may be uniform in size or non-uniform in size. In embodiments, the build material may have a powder size distribution such as, for example and without limitation, a bi-modal or tri-modal powder size distribution. In embodiments, the build material may be, or may include, nanoparticles.

The build material may be regularly or irregularly shaped, and may have different aspect ratios or the same aspect ratio. For example, the build material may take the form of small spheres or granules, or may be shaped like small rods or fibers.

In embodiments, the build material can be coated with a second material. For example and without limitation, the build material may be coated with a wax, a polymer, or another material that aids in binding the build material together (in conjunction with the binder). Alternatively or additionally, the build material may be coated with a sintering agent and/or an alloying agent to promote fusing the build material.

The binder material may comprise a material which is radiant-energy curable and which is capable of adhering or binding together the build material when the binder material is in the cured state. The term "radiant-energy curable," as used herein, refers to any material that solidifies in response to the application of radiant energy of a particular wavelength and energy. For example, the binder material may comprise a known photopolymer resin containing photoinitiator compounds functioning to trigger a polymerization reaction, causing the resin to change from a liquid state to a solid state. Alternatively, the binder material may comprise a material that contains a solvent that may be evaporated out by the application of radiant energy. The uncured binder material may be provided in solid (e.g. granular) form, liquid form including a paste or slurry, or a low viscosity solution compatible with print heads. The binder material may be selected to have the ability to out-gas or burn off during further processing, such as during sintering of the build material. In embodiments, the binder material may be as described in U.S. Patent Publication No. 2018/0071820 entitled "Reversible Binders For Use In Binder Jetting Additive Manufacturing Techniques" and assigned to General Electric Corporation, Schenectady, N.Y. However, it should be understood that other binder materials are contemplated and possible, including combinations of various binder materials.

Referring initially to FIG. 2, at initiation of the build cycle, the control system 200 sends a control signal to the supply platform actuator 132 that actuates the supply platform actuator 132 in the upward vertical direction (i.e., in the +Z direction of the coordinate axes depicted in the figures) as indicated by arrow 316, thereby moving the supply platform 130, and the build material 400 positioned thereon, in the upward vertical direction towards the working axis 116 of the apparatus 100. The supply platform 130 is moved in the upward vertical direction by an amount sufficient to position a predetermined amount of the build material 400 in the pathway of the recoat head 140 as it traverses over the working axis 116 of the apparatus 100. Actuation of the supply platform actuator 132 occurs over a supply platform cycle time $T_{SP}$. While FIG. 2 schematically depicts an initiation of a build cycle in which binder material 500 is already present on a layer of build material 400 (such as on a previously distributed layer of build material 400), it should be understood that the initiation of the build cycle may occur without any build material 400 or binder material 500 disposed on the build platform 120.

Figure 7A:
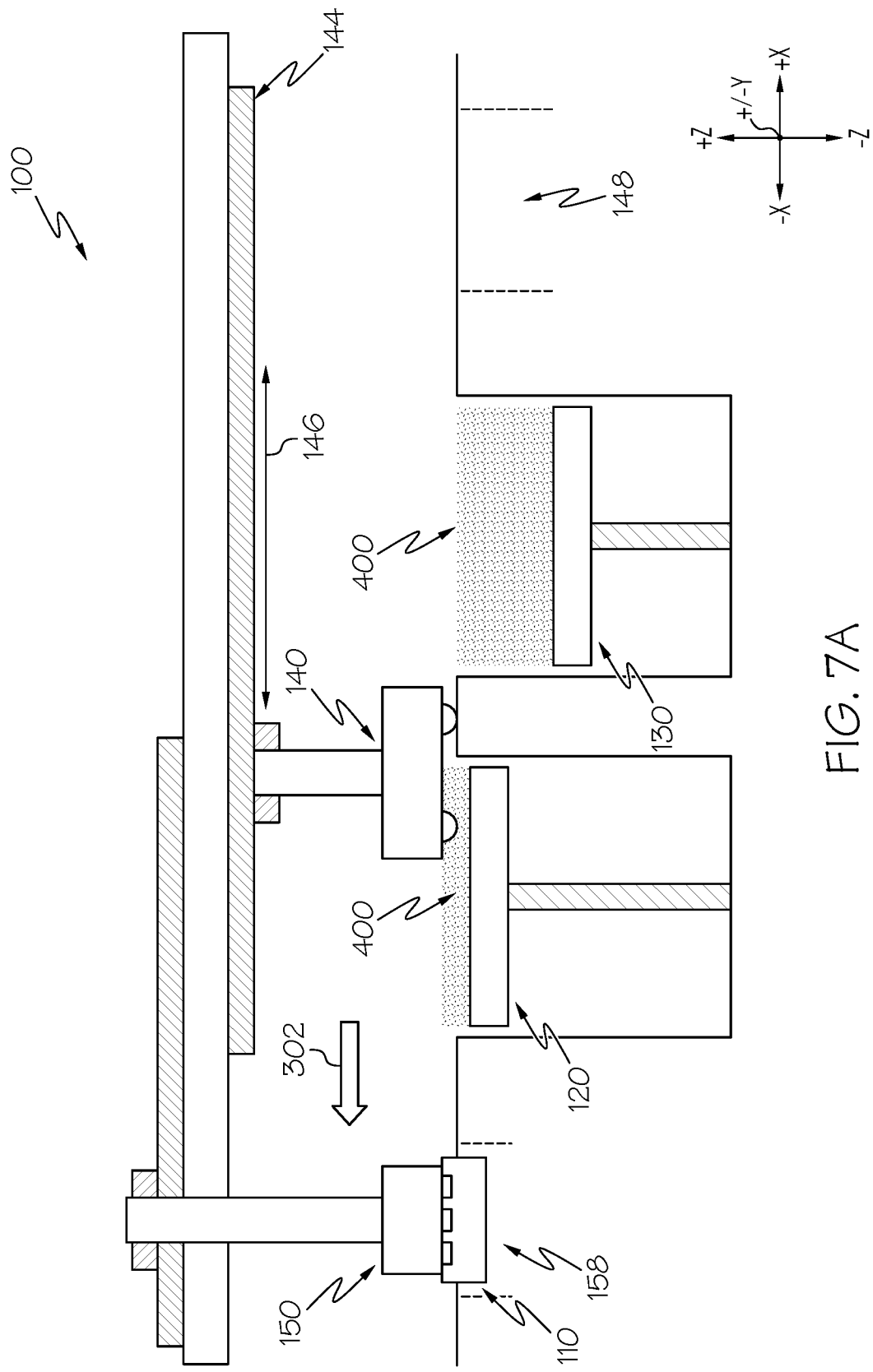
FIG. 7A schematically depicts an additive manufacturing apparatus comprising the actuator assembly of FIG. 3 in use according to one or more embodiments shown and described herein.

Referring now to FIGS. 2 and 7A, as the supply platform 130 is raised (i.e., during the platform cycle time $T_{SP}$), the control system 200 also sends a control signal to the recoat head actuator 144 causing the recoat head actuator 144 to advance the recoat head 140 from the recoat home position 148 towards the print home position 158 along the working axis 116 in a first recoat direction, as indicated by arrow 302, at a recoat head advance rate. This is accomplished by actuating the recoat head actuator 144 along the recoat motion axis 146 in the −X direction of the coordinate axes depicted in the figures. The advance of the recoat head 140 is coordinated with the upward vertical motion of the supply platform 130 such that the predetermined amount of build material 400 is positioned in the pathway of the recoat head 140 prior to the recoat head 140 traversing over the supply platform 130. As the recoat head 140 traverses over the supply platform 130 towards the build platform 120, the recoat head 140 moves (i.e., distributes) build material 400 from the supply platform 130 to the build platform 120, thereby distributing a new layer of build material 400 on the build platform 120, as indicated in FIG. 7A.

In embodiments, the recoat head advance rate may vary as the recoat head 140 is traversed over the working axis 116 of the apparatus 100 in the direction indicated by arrow 302. For example, the recoat head advance rate may comprise an initial recoat head advance rate prior to traversing over the supply platform 130 from the recoat home position 148 and a distribution advance rate as the recoat head 140 traverses over the supply platform 130 and the build platform 120. In embodiments, the recoat head advance rate may be different (e.g., faster) between the supply platform 130 and the build platform 120. In embodiments, the distribution advance rate may be less than the initial recoat head advance rate. This may promote uniformity in the layer of build material 400 distributed on the build platform 120 from the supply platform 130 and reduce defects in the object.

In embodiments where the recoat head 140 comprises an energy source as described herein with respect to FIGS. 5A-5C, the control system 200 may actuate the energy source as the recoat head 140 distributes the build material 400 from the supply platform 130 to the build platform 120. The energy source may, for example, heat the build material 400 as it is distributed onto the build platform 120 and/or initiate or supplement curing of binder material 500 (FIG. 2) previously deposited on a layer of build material 400 distributed on the build platform 120.

In embodiments where the recoat head 140 comprises at least one sensor as described herein with respect to FIGS. 5A-5C, the control system 200 may receive a signal from the at least one sensor indicative of a property of the build material 400 and/or the binder material 500 deposited on the build platform 120 and adjust an operation of the additive manufacturing apparatus 100 based on the signal. For example, the at least one sensor may comprise a pyrometer that detects a temperature of the binder material 500. Based on the temperature of the binder material 500, the control system 200 may actuate the energy source associated with the recoat head 140 to provide more or less energy to the binder material 500, thereby adjusting the cure rate of the binder material 500.

Figure 7B:
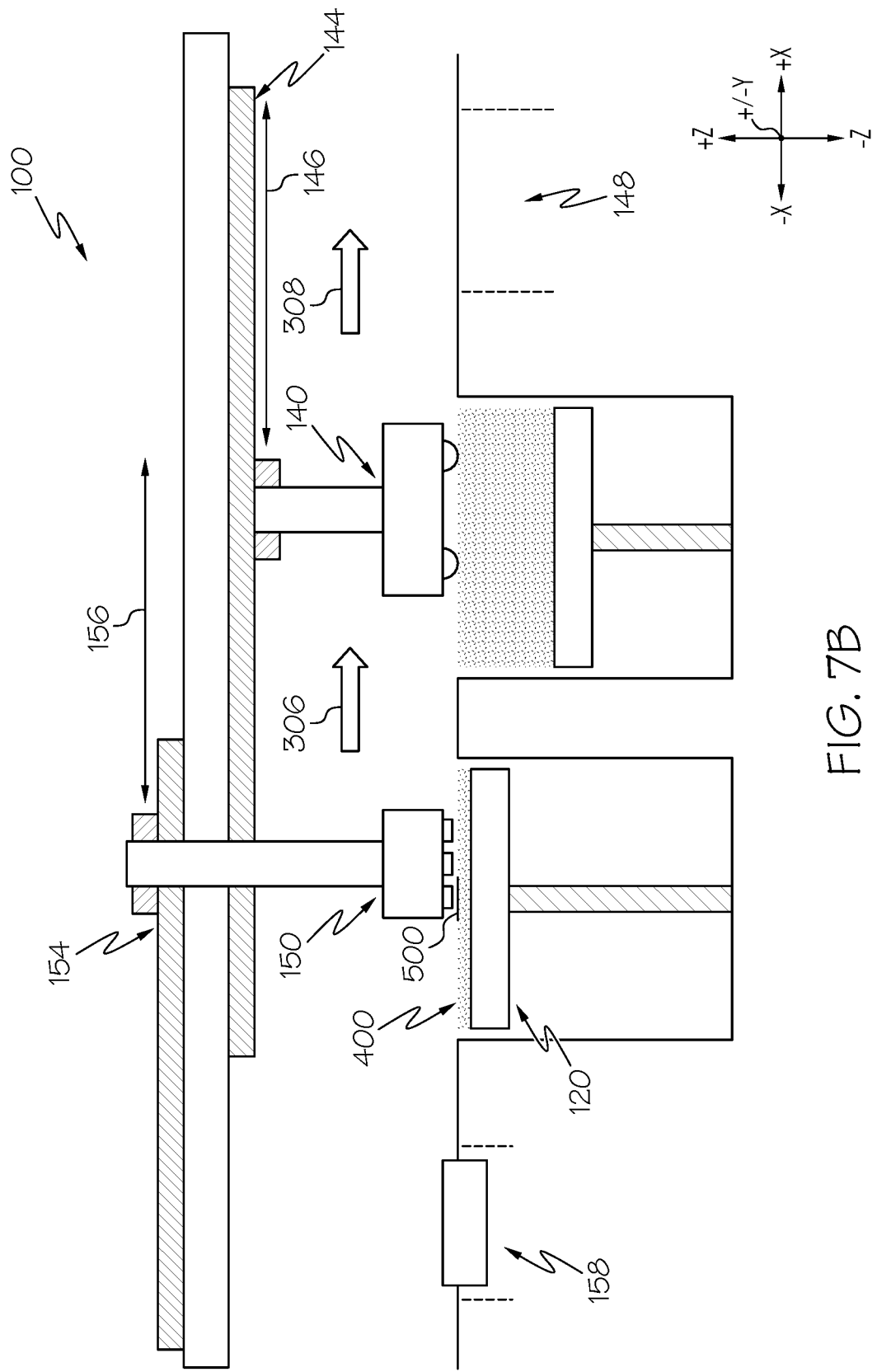
FIG. 7B schematically depicts an additive manufacturing apparatus comprising the actuator assembly of FIG. 3 in use according to one or more embodiments shown and described herein.
Figure 7C:
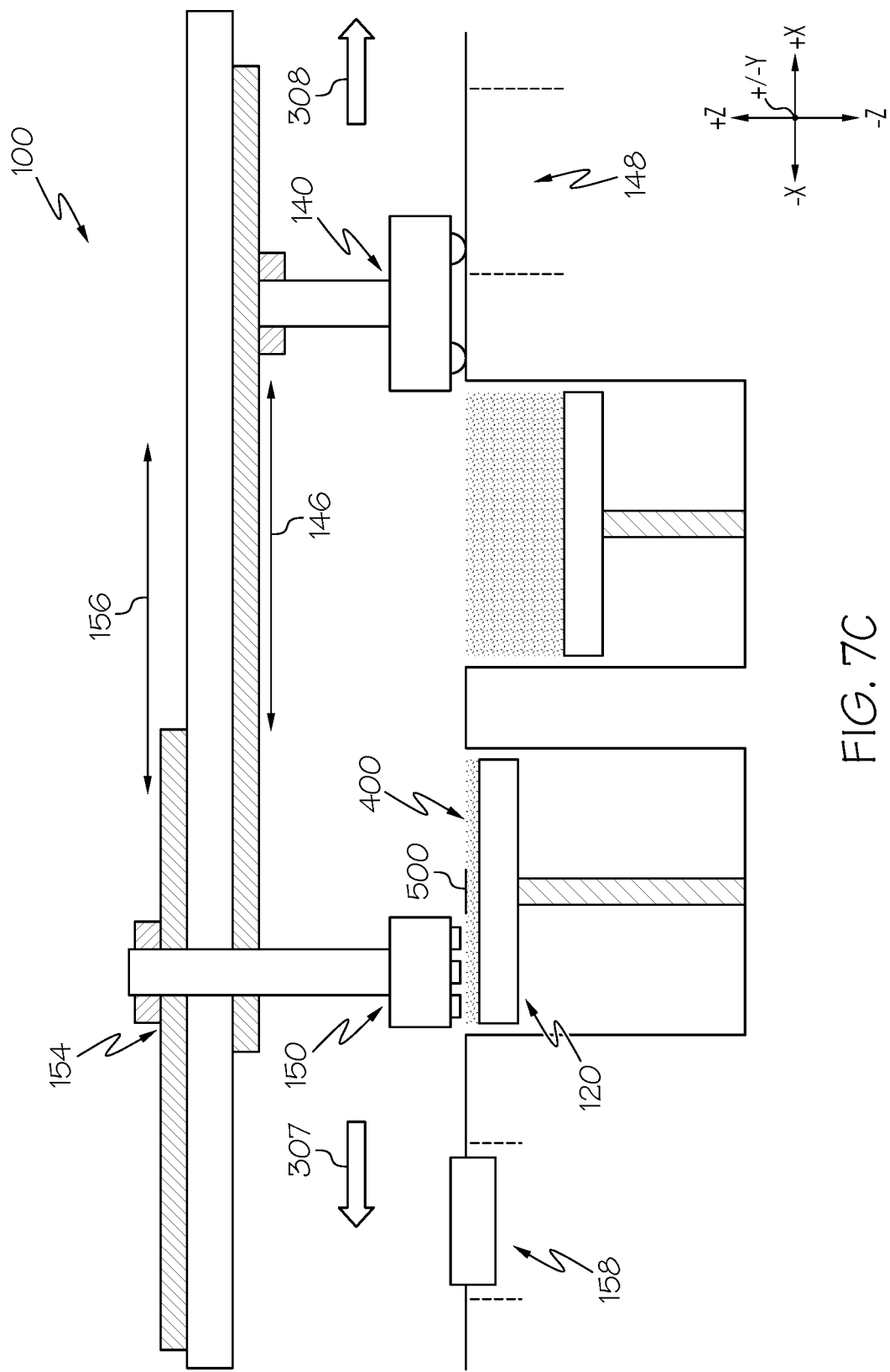
FIG. 7C schematically depicts an additive manufacturing apparatus comprising the actuator assembly of FIG. 3 in use according to one or more embodiments shown and described herein.

Referring now to FIGS. 7A-7C, after the new layer of build material 400 is distributed on the build platform 120, the control system 200 sends a control signal to the recoat head actuator 144 causing the recoat head actuator 144 to return the recoat head 140 to the recoat home position 148 along the working axis 116 (FIG. 2) in a second recoat direction opposite the first recoat direction, as indicated by arrow 308, at a recoat head return rate. In embodiments, the recoat head return rate may be greater than or equal to the recoat head advance rate. In embodiments, where the recoat head advance rate comprises an initial recoat head advance rate and a distribution advance rate as described herein, the recoat head return rate may be greater than the distribution advance rate and greater than or equal to the initial recoat head advance rate. Return of the recoat head 140 to the recoat home position is accomplished by actuating the recoat head actuator 144 along the recoat motion axis 146 in the +X direction of the coordinate axes depicted in the figures.

In the embodiments described herein, the recoat head 140 and the recoat head actuator 144 have a recoat cycle time $T_{RH}$ that is the elapsed time from when the recoat head 140 leaves the recoat home position 148 to when the recoat head 140 returns to the recoat home position 148. In the embodiments described herein, the platform cycle time $T_{SP}$ occurs within the recoat cycle time $T_{RH}$.

Still referring to FIGS. 7A-7C, as the recoat head 140 is returned to the recoat home position 148 (i.e., during the recoat cycle time $T_{RH}$), the control system 200 sends a control signal to the print head actuator 154 causing the print head actuator 154 to advance the print head 150 from the print home position 158 towards the recoat home position 148 along the working axis 116 (FIG. 2) in a first print direction opposite the first recoat direction, as indicated by arrow 306 of FIG. 7B, at a print head advance rate. This is accomplished by actuating the print head actuator 154 along the print motion axis 156 in the +X direction of the coordinate axes depicted in the figures. As shown in FIG. 7B, both the recoat head 140 and the print head 150 are in motion along the working axis 116 (FIG. 2) of the apparatus 100 simultaneously which is facilitated by the recoat head actuator 144 and the print head actuator 154 being arranged in a stacked configuration as described herein. The recoat head 140 and the print head 150 may be in motion simultaneously along the working axis 116 (FIG. 2) of the apparatus 100 in the same direction, as depicted in FIG. 7B, or in opposite directions, as depicted in FIG. 7C. Further, the recoat head 140 and the print head 150 may be in motion simultaneously along the working axis 116 (FIG. 2) of the apparatus 100 at different speeds or at the same speed.

In embodiments, the print head advance rate may vary as the print head 150 is traversed over the working axis 116 of the apparatus 100 in the direction indicated by arrow 306. For example, the print head advance rate may comprise an initial print head advance rate prior to traversing over the build platform 120 from the print home position 158 and a deposition advance rate as the print head 150 traverses over the build platform 120. In embodiments, the deposition advance rate may be less than the initial print head advance rate. This promotes precision in the deposition of the binder material 500 on the build platform 120.

As the print head 150 traverses over the build platform 120 in the direction indicated by arrow 306, the control system 200 sends a signal to the print head 150 causing the print head 150 to deposit a layer of binder material 500 in a predetermined pattern on the layer of build material 400 positioned on the build platform 120, as depicted in FIG. 7B. The predetermined pattern generally corresponds to a horizontal cross section of the object being built on the build platform 120. In embodiments, the print head 150 deposits the binder material 500 in a pattern corresponding to a first portion of the predetermined pattern on the layer of build material 400 positioned on the build platform 120 as the print head 150 traverses over the build platform 120 in the direction indicated by arrow 306 in FIG. 7B. In these embodiments, the print head 150 deposits binder material 500 in a pattern corresponding to a second portion of the predetermined pattern on the layer of build material 400 positioned on the build platform 120 as the print head 150 traverses over the build platform 120 in the direction indicated by arrow 307 in FIG. 7C when returning to the print home position 158. As the print head 150 deposits the binder material 500 in a pattern corresponding to the second portion of the predetermined pattern, the print head 150 may be advanced along the working axis 116 (FIG. 2) of the apparatus 100 in the direction indicated by arrow 307 at a deposition return rate. In embodiments, the deposition return rate may be equal to the deposition advance rate. As shown in FIG. 7C, the print head 150 and the recoat head 140 may be in motion simultaneously along the working axis 116 (FIG. 2) of the apparatus 100 in opposite directions, as indicated by arrows 307 and 308. In embodiments, the second portion of the predetermined pattern may overlap or at least partially overlap with the first portion of the predetermined pattern. Depositing the binder material 500 on the layer of build material 400 in two separate portions may allow the binder material 500 to more fully penetrate the layer of build material 400 between deposition steps, improving the binding action of the binder material 500 with respect to the build material 400. Additionally or alternatively, depositing the binder material 500 on the layer of build material 400 in two separate portions may prevent displacement of the build material 400 in the overlapping portions as less binder material 500 may be deposited per print operation while still achieving deposition of the same amount of binder material 500 on the build material 400 at the end of the print cycle. While deposition of the binder material 500 on the layer of build material 400 has been described herein as occurring in two separate portions, it should be understood that, in other embodiments, the deposition of the binder material 500 on the layer of build material 400 may occur in more than two separate portions, such as when the print head 150 is scanned over the build platform 120 multiple times. For example, in some embodiments the same pattern of binder material 500 may be jetted onto the build material 400 multiple times under a controlled rate to facilitate a gradual build-up of binder material 500 to account for powder wetting speeds. This may also be used to more uniformly control the time between deposition and subsequent curing along different areas of the build platform.

While the binder material 500 has been described as being deposited in two portions which at least partially overlap, it should be understood that other embodiments are contemplated and possible. For example, the binder material 500 may be deposited by the print head 150 in a single pass, such as when the binder material 500 is deposited on the layer of build material 400 as the print head 150 traverses the working axis 116 (FIG. 2) of the apparatus 100 in the direction indicated by arrow 306 of FIG. 7B or the direction indicated by arrow 307 of FIG. 7C.

Figure 7D:
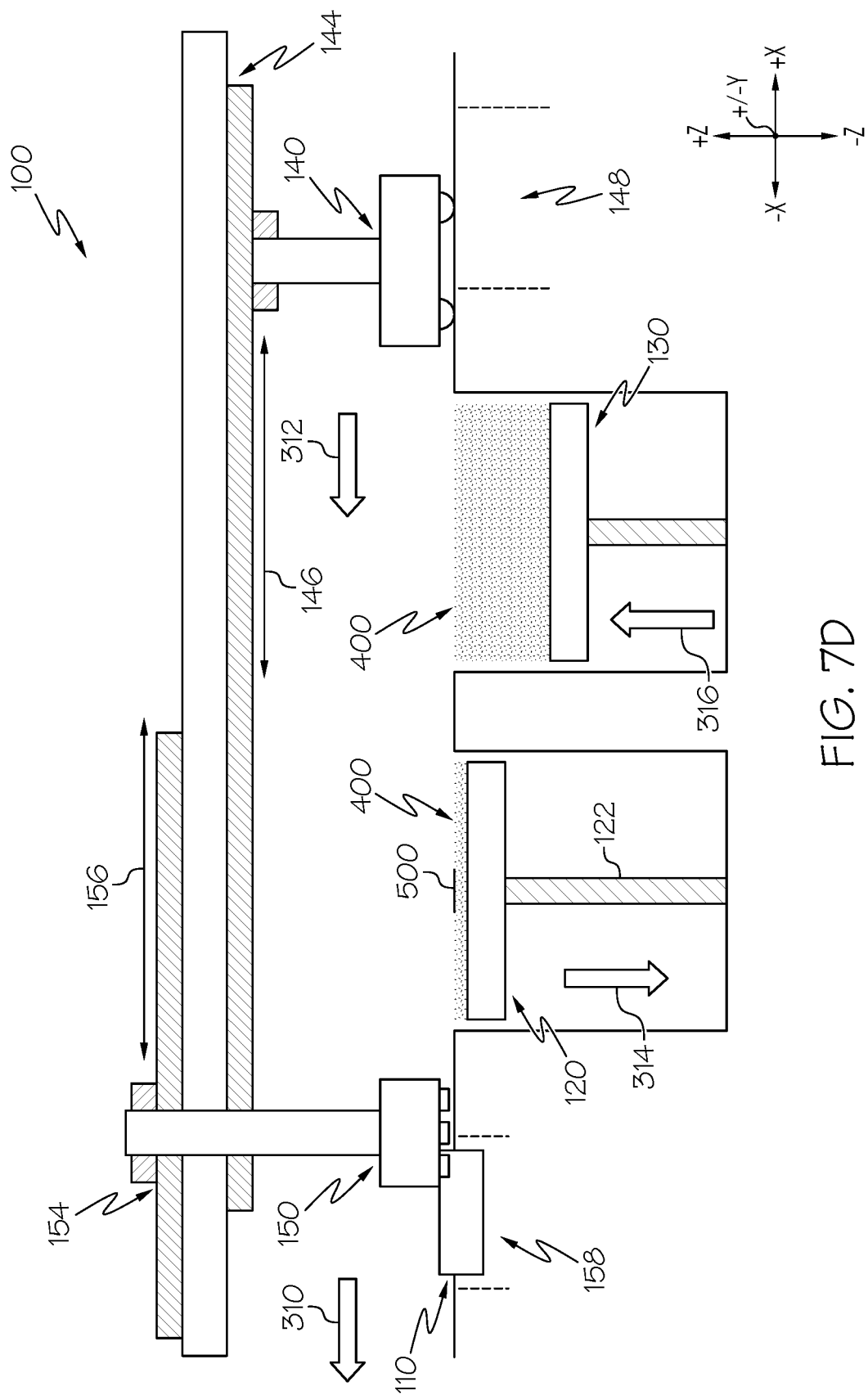
FIG. 7D schematically depicts an additive manufacturing apparatus comprising the actuator assembly of FIG. 3 in use according to one or more embodiments shown and described herein FIG. 8 schematically depicts an additive manufacturing apparatus comprising the actuator assembly of FIG. 3 and further comprising a build material hopper coupled to the recoat head according to one or more embodiments shown and described herein.

Referring now to FIG. 7D, after the layer of binder material 500 is deposited on the layer of build material 400 positioned on the build platform 120, the control system 200 sends a control signal to the print head actuator 154 causing the print head actuator 154 to return the print head 150 to the print home position 158 along the working axis 116 (FIG. 2) in a second print direction opposite the first print direction, as indicated by arrow 310, at a print head return rate. This is accomplished by actuating the print head actuator 154 along the print motion axis 156 in the −X direction of the coordinate axes depicted in the figures. In embodiments, the print head return rate is greater than the deposition return rate. In embodiments, the print head return rate may be greater than the print head advance rate.

In the embodiments described herein, the print head 150 and the print head actuator 154 have a print cycle time $T_{PH}$ that is the elapsed time from when the print head 150 leaves the print home position 158 to when the print head 150 returns to the print home position 158.

Still referring to FIG. 7D, as the print head 150 traverses away from the build platform 120 (i.e., during the print cycle time $T_{PH}$), the control system 200 sends a control signal to the build platform actuator 122 that actuates the build platform actuator 122 in the downward vertical direction (i.e., in the −Z direction of the coordinate axes depicted in FIG. 2), as indicated by arrow 314, thereby moving the build platform 120 in the downward vertical direction away from the working axis 116 of the apparatus 100. The build platform 120 is moved in the downward vertical direction by an amount sufficient to accommodate receiving a new layer of build material 400 from the supply platform 130. Actuation of the build platform actuator 122 occurs over a build platform cycle time $T_{BP}$. Accordingly, the build platform cycle time $T_{BP}$ at least partially overlaps with the print cycle time $T_{PH}$. In embodiments, the build platform cycle time $T_{BP}$ completely overlaps with the print cycle time $T_{PH}$.

Still referring to FIG. 7D, the print home position 158 is generally co-located with the cleaning station 110, as described herein. Accordingly, as the print head 150 returns to the print home position 158, cleaning and maintenance operations on the print head 150 are initiated. The cleaning and maintenance operations occur over a cleaning station cycle time $T_{CS}$. In embodiments, the cleaning station cycle time $T_{CS}$ at least partially overlaps with the print cycle time $T_{PH}$. For example, the cleaning station cycle time $T_{CS}$ may be initiated as soon as a portion of the print head 150 is positioned over the cleaning station 110. Alternatively, the cleaning station cycle time $T_{CS}$ may be initiated before a portion of the print head 150 is positioned over the cleaning station 110, such as when components of the cleaning station 110 are actuated into position prior to the arrival of the print head 150 at the print home position 158. In some embodiments, during the cleaning station cycle time $T_{CS}$, the control system 200 may send a control signal to the print head actuator 154 causing the print head actuator 154 to traverse the print head 150 over individual sections (not depicted) of the cleaning station 110 in the +/−X directions of the coordinate axes depicted in the figures to affect the cleaning and maintenance operations of the cleaning station 110.

As depicted in FIG. 7D, as the print head 150 is traversing towards the print home position 158 (i.e., during the print cycle time $T_{PH}$), the control system 200 initiates the next build cycle. Specifically, the control system 200 initiates the next build cycle by sending a control signal to the supply platform actuator 132 that actuates the supply platform actuator 132 in the upward vertical direction and by sending a control signal to the recoat head actuator 144 causing the recoat head actuator 144 to advance the recoat head 140 from the recoat home position 148 towards the print home position 158 along the working axis 116, as described hereinabove with respect to FIGS. 2 and 7A. Accordingly, at least the end of the print cycle time $T_{PH}$ may overlap with at least the beginning of the recoat cycle time $T_{RH}$. In addition, at least the end of the print cycle time $T_{PH}$ may overlap with at least the beginning of the supply platform cycle time $T_{SP}$. Further, because the next build cycle is initiated while the print head 150 is returning to the print home position 158, and because the cleaning station cycle time $T_{CS}$ at least partially overlaps with the print cycle time $T_{PH}$, the cleaning station cycle time $T_{CS}$ at least partially overlaps with the recoat cycle time $T_{RH}$. In embodiments, the cleaning station cycle time $T_{CS}$ overlaps with both the print cycle time $T_{PH}$ and the recoat cycle time $T_{RH}$. In embodiments, the entire cleaning station cycle time $T_{CS}$ overlaps with at least one of the print cycle time $T_{PH}$ and the recoat cycle time $T_{RH}$. For example, in some embodiments, at least a portion of the cleaning station cycle time $T_{CS}$ overlaps with the print cycle time $T_{PH}$ and the entire cleaning station cycle time $T_{CS}$ overlaps with the recoat cycle time $T_{RH}$.

The build platform cycle time $T_{BP}$ and supply platform cycle time $T_{SP}$ may completely overlap with the print cycle time $T_{PH}$ and/or the recoat cycle time $T_{RH}$ and, as such, the build platform cycle time $T_{BP}$ and supply platform cycle time $T_{SP}$ do not contribute to the overall build cycle time $T_{BC}$. Further, because at least portions of the cleaning station cycle time $T_{CS}$, the print cycle time $T_{PH}$, and the recoat cycle time $T_{RH}$ overlap with one another, the overall build cycle time $T_{BC}$ is less than the sum of the cleaning station cycle time $T_{CS}$, the print cycle time $T_{PH}$, and the recoat cycle time $T_{RH}$. In embodiments, the overall build cycle time $T_{BC}$ is less than the sum of the print cycle time $T_{PH}$ and the recoat cycle time $T_{RH}$, such as when at least a portion of the cleaning station cycle time $T_{CS}$ overlaps with the print cycle time $T_{PH}$ and the entire cleaning station cycle time $T_{CS}$ overlaps with the recoat cycle time $T_{RH}$.

The reduction in the duration of the overall build cycle time $T_{BC}$ to less than the sum of the individual print, recoat, and cleaning cycle times is facilitated by the stacked configuration of the actuators 144, 154 which, in turn, allows the recoat head 140 and the print head 150 to move on the working axis 116 of the additive manufacturing apparatus 100 at the same time.

Based on the foregoing, it should be understood that the actuator assemblies for additive manufacturing apparatuses described herein may be implemented to reduce the overall build cycle time of an additive manufacturing apparatus, thereby improving the manufacturing through-put of the additive manufacturing apparatus. In particular, the actuator assemblies include individual actuators, such as print head actuators and recoat head actuators, which are arranged in a stacked configuration. This allows the print head and the recoat head operatively associated with each actuator to move along the working axis of the additive manufacturing apparatus at the same time, in the same or different directions at the same or different speeds, which, in turn, allows the individual cycle times associated with each of the print head and the recoat head to overlap while maintaining the print quality, thereby reducing the overall build cycle time of the additive manufacturing apparatus to less than the sum of the individual cycle times.

While FIGS. 2 and 7A-7D depict an additive manufacturing apparatus 100 comprising a supply receptacle 134 used in conjunction with the recoat head 140 of the actuator assembly 102 to supply build material 400 to the build platform 120 of the build receptacle 124, it should be understood that other embodiments are contemplated and possible.

Figure 8:
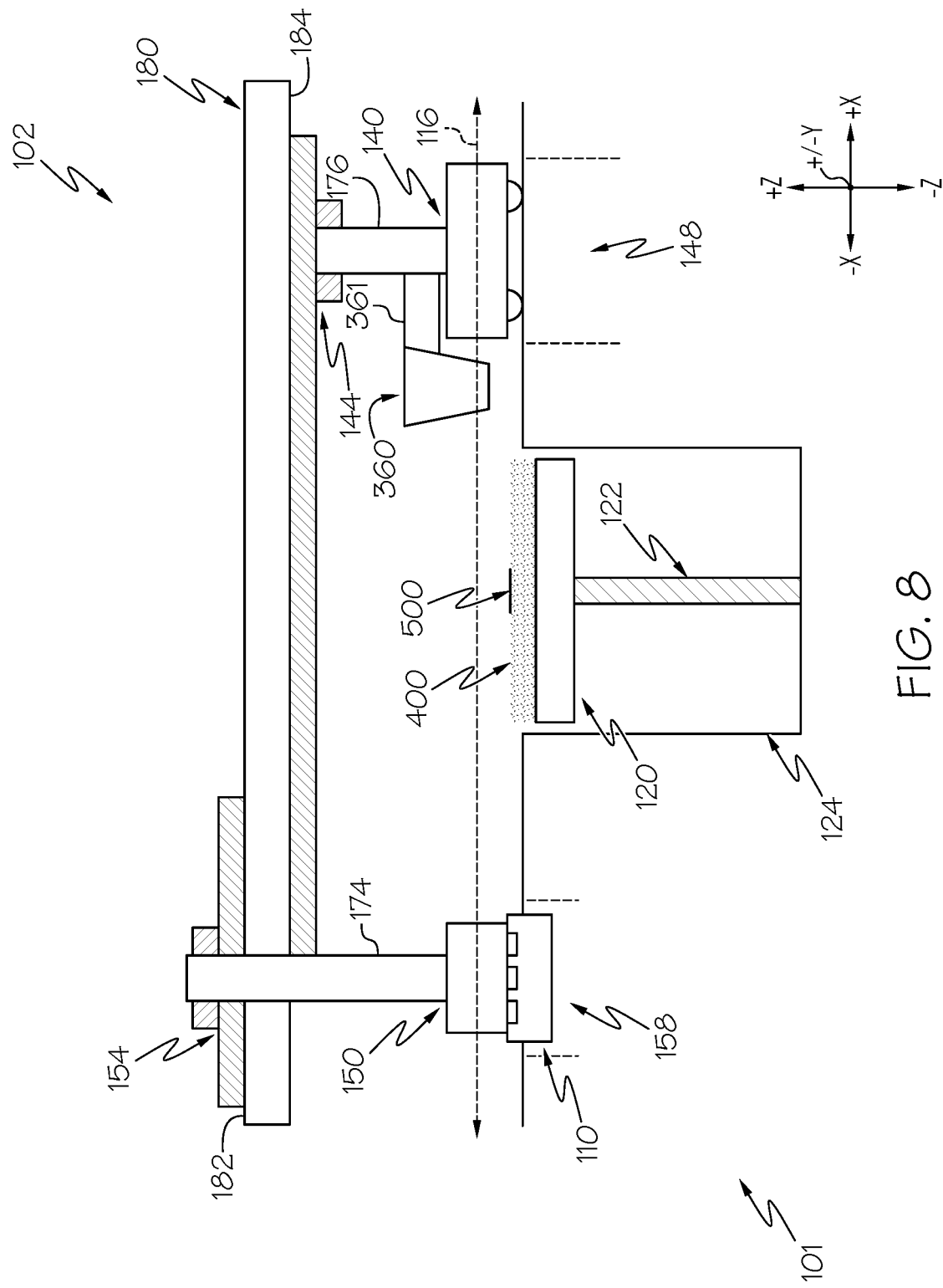

Referring to FIG. 8 by way of example, an alternative embodiment of an additive manufacturing apparatus 101 is schematically depicted. In this embodiment, the additive manufacturing apparatus 101 comprises a cleaning station 110, a build platform 120, and an actuator assembly 102, as described herein with respect to FIG. 2. However, in this embodiment, the apparatus 101 does not include a supply receptacle. Instead, the apparatus 101 comprises a build material hopper 360 that is used to supply build material 400 to the build platform 120 of the build receptacle 124. In this embodiment, the build material hopper 360 is coupled to the recoat head actuator 144 such that the build material hopper 360 traverses the working axis 116 of the apparatus 101 with the recoat head 140. In the embodiment depicted in FIG. 8, the build material hopper 360 is coupled to the support bracket 176 with, for example, bracket 361. However, it should be understood that the build material hopper 360 may be directly coupled to the support bracket 176 without an intermediate bracket. Alternatively, the build material hopper 360 may be coupled to the recoat head 140 either directly or with an intermediate bracket. While FIG. 8 schematically depicts the build material hopper 360 as being external to the recoat head 140, it should be understood that other embodiments are contemplated and possible, such as embodiments where the recoat head is internal to the recoat head 140.

The build material hopper 360 may include an electrically actuated valve (not depicted) to release build material 400 onto the build platform 120 as the build material hopper 360 traverses over the build platform 120. In embodiments, the valve may be communicatively coupled to the control system 200 (FIG. 6) which executes computer readable and executable instructions to open and close the valve based on the location of the build material hopper 360 with respect to the build platform 120. The build material 400 released onto the build platform 120 is then distributed over the build platform 120 with the recoat head 140 as the recoat head 140 traverses over the build platform 120.

The embodiment of the additive manufacturing apparatus 101 depicted in FIG. 8 may be utilized to build an object on the build platform 120 in a similar manner as described herein with respect to FIGS. 2 and 7A-7D. However, with this embodiment of the additive manufacturing apparatus 101, the build material 400 is delivered to the build platform 120 with the build material hopper 360 as described herein, instead of by actuation of a supply platform.

Figure 9:
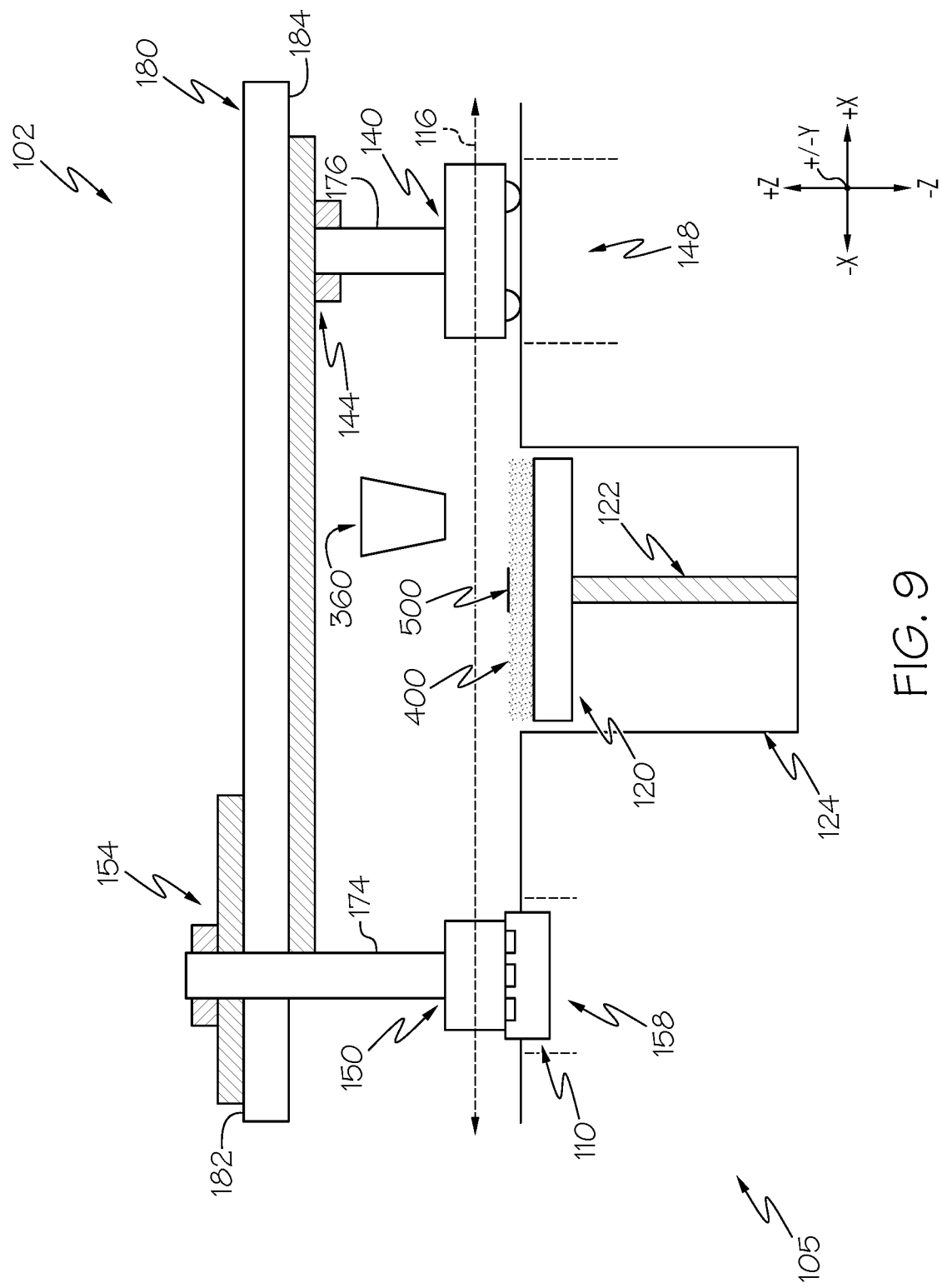
FIG. 9 schematically depicts an additive manufacturing apparatus comprising the actuator assembly of FIG. 3 and further comprising a build material hopper in fixed position according to one or more embodiments shown and described herein.

Another alternative embodiment of an additive manufacturing apparatus 105 is schematically depicted in FIG. 9. In this embodiment, the additive manufacturing apparatus 105 comprises a cleaning station 110, a build platform 120, and an actuator assembly 102, as described herein with respect to FIG. 2. However, in this embodiment, the apparatus 105 does not include a supply receptacle. Instead, the apparatus 105 comprises a build material hopper 360 that is used to supply build material 400 to the build platform 120 of the build receptacle 124. In this embodiment, the build material hopper 360 is fixed over the build platform 120 such that the build material hopper 360 is able to release build material 400 onto the build platform 120. For example, the build material hopper 360 may be coupled to the rail 180 of the actuator assembly 102 either directly, or with a bracket (not depicted). However, it should be understood that the build material hopper 360 may be fixedly coupled to another structural member or support so long as the build material hopper 360 is oriented and arranged to deliver build material 400 to the build platform 120.

In this embodiment, the build material hopper 360 may include an electrically actuated valve (not depicted) to release build material 400 onto the build platform 120. In embodiments, the valve may be communicatively coupled to the control system 200 (FIG. 6) which executes computer readable and executable instructions to open and close the valve at the desired time. In embodiments, opening and closing the valve of the build material hopper 360 may be synchronized with actuation of the build platform actuator 122 and/or actuation of the recoat head actuator 144. The build material 400 released onto the build platform 120 is distributed over the build platform 120 with the recoat head 140 as the recoat head 140 traverses over the build platform 120.

While FIG. 9 depicts the build material hopper 360 as being in a fixed position, it should be understood that other embodiments are contemplated and possible. For example the build material hopper 360 may be coupled to an actuator to facilitate moving the build material hopper in one or more of the +/−X, +/−Y, and/or +/−Z directions. In embodiments the actuator may be, for example, the process accessory actuator depicted in FIG. 4A. This allows for the build material hopper 360 to have independent speed control (e.g., apart from the recoat head and/or print head). In embodiments where the build material hopper 360 is coupled to an actuator, the build material may have a home position where the build material hopper 360 is not positioned over the build platform. In these embodiments, the build material hopper 360 may be actuated over the build platform to facilitate distributing the build material onto the build platform.

The embodiment of the additive manufacturing apparatus 105 depicted in FIG. 8 may be utilized to build an object on the build platform 120 in a similar manner as described herein with respect to FIGS. 2 and 7A-7D. However, with this embodiment of the additive manufacturing apparatus 105, the build material 400 is delivered to the build platform 120 with the build material hopper 360 as described herein, instead of by actuation of a supply platform.

While FIGS. 2 and 7A-7D depict an additive manufacturing apparatus 100 comprising actuator assemblies as depicted in FIGS. 2-4B, it should be understood that other configurations of actuator assemblies are contemplated and possible.

Figure 10A:
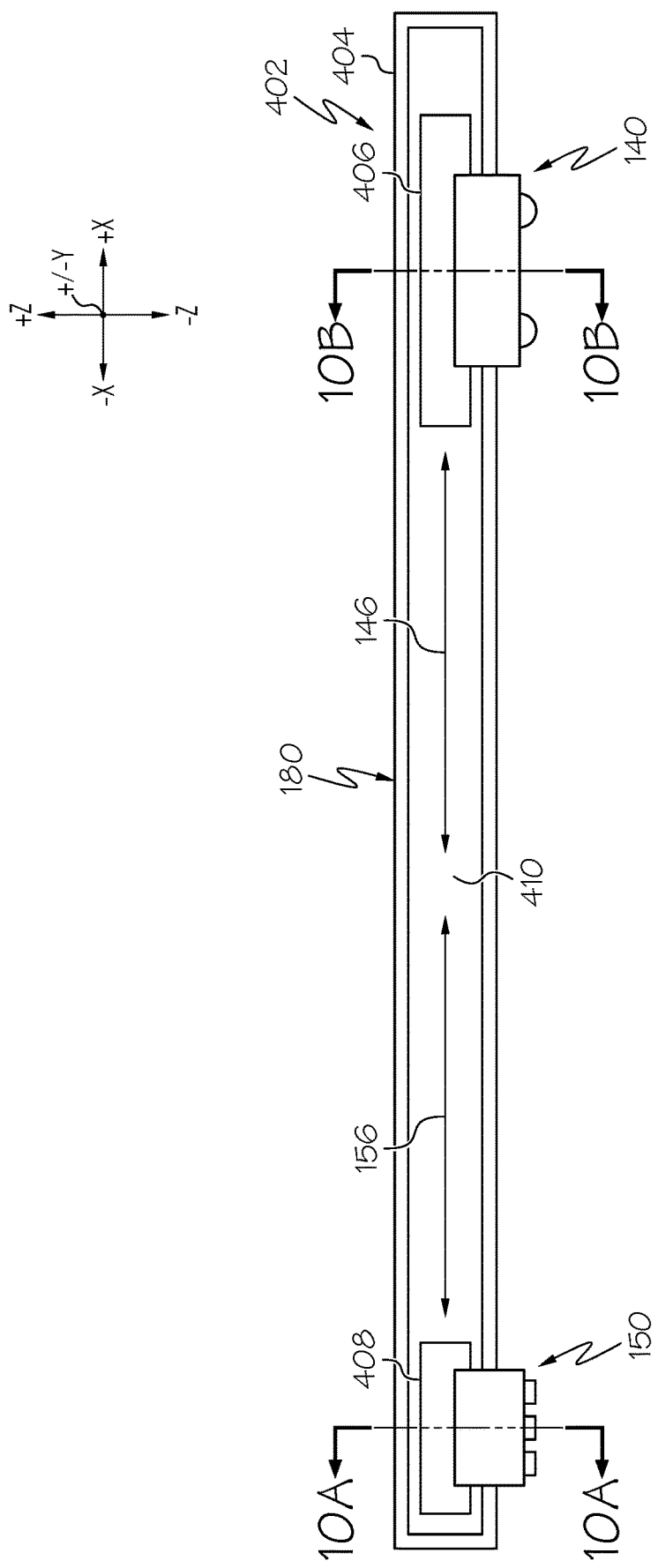
FIG. 10A schematically depicts another embodiment of an actuator assembly for an additive manufacturing apparatus according to one or more embodiments shown and described herein.
Figure 10B:
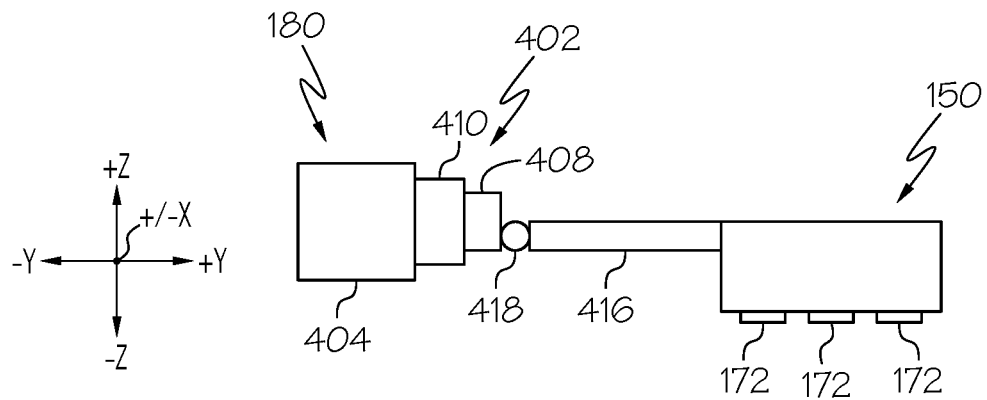
FIG. 10B schematically depicts a cross section of the actuator assembly of FIG. 10A.
Figure 10C:
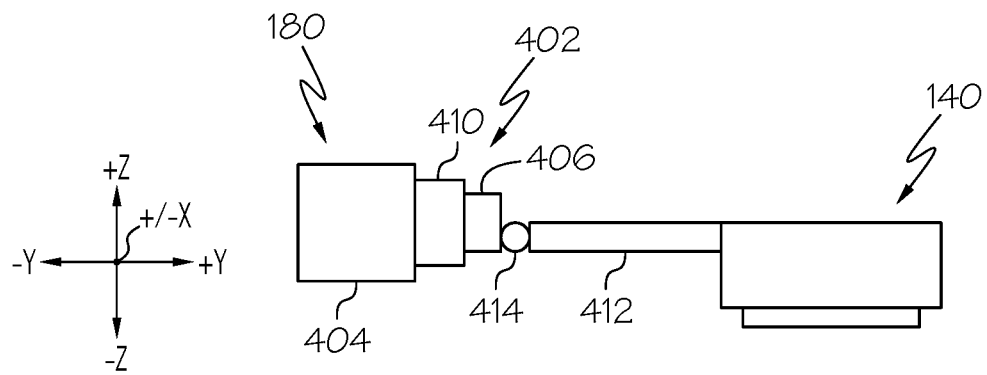
FIG. 10C schematically depicts a cross section of the actuator assembly of FIG. 10A.

Referring to FIGS. 10A-10C by way of example, FIG. 10A schematically depicts an alternative embodiment of an actuator assembly 402, FIG. 10B depicts a cross section of the actuator assembly 402 of FIG. 10A along line 10A, and FIG. 10C depicts a cross section of the actuator assembly 402 along line 10B. The actuator assembly 402 generally comprises a recoat head 140 and a print head 150 as described hereinabove with respect to the actuator assembly 102 depicted in FIG. 3. The recoat head 140 and the print head 150 may be as described herein with respect to FIGS. 2-3 and 5A-5C. The actuator assembly 402 also comprises a recoat head actuator 406 and a print head actuator 408. The actuator assembly 402 further comprises a support 404 that extends in a horizontal direction (i.e., a direction parallel to the +/−X direction of the coordinate axes depicted in the figures) parallel to the working axis 116 (FIG. 2) of the additive manufacturing apparatus, such as the additive manufacturing apparatuses 100, 101 depicted in FIGS. 2, 8, and 9, for example. In one embodiment, the support 404 is a side of a rail 180 that extends in a horizontal direction. For example, in one embodiment, the rail 180 may be rectangular or square in vertical cross section (i.e., a cross section in the Y-Z plane of the coordinate axes depicted in the figures) with a side surface of the rectangle or square forming the support 404. However, it should be understood that other embodiments are contemplated and possible. For example and without limitation, the rail 180 may have other cross sectional shapes, such as octagonal or the like, with the support 404 being one surface of facet of the rail 180. In embodiments, the support 404 is positioned in a vertical plane (e.g., a plane parallel to the X-Z plane of the coordinate axes depicted in the figures). However, it should be understood that, in other embodiments, the support 404 is positioned in a plane other than a vertical plane.

In the embodiments described herein, the recoat head actuator 406 and the print head actuator 408 are coupled to the support 404. The recoat head actuator 144 is bi-directionally actuatable along a recoat motion axis 146 and the print head actuator 154 is bi-directionally actuatable along a print motion axis 156. That is, the recoat motion axis 146 and the print motion axis 156 define the axes along which the recoat head actuator 144 and the print head actuator 154 are actuatable, respectively. In embodiments, the recoat head actuator 144 and the print head actuator 154 are bi-directionally actuatable independent of one another. The recoat motion axis 146 and the print motion axis 156 extend in a horizontal direction and are parallel with the working axis 116 (FIG. 2) of the apparatus 100. In the embodiments described herein, the recoat motion axis 146 and the print motion axis 156 are co-linear. With this configuration, the recoat head 140 and the print head 150 may occupy the same space (or portions of the same space) along the working axis 116 of the apparatus 100 at different times because the recoat motion axis 146 and the print motion axis 156 lie along the same line. In the embodiment of the actuator assembly 402 depicted in FIGS. 10A-10C, the recoat motion axis 146 and the print motion axis 156 are located in the same vertical plane. In embodiments where the support 404 is positioned in a vertical plane, the recoat motion axis 146 and the print motion axis 156 are located a vertical plane that is parallel to the vertical plane of the support 404, as depicted in FIGS. 10A-10C. However, it should be understood that other embodiments are contemplated and possible, such as embodiments in which the recoat motion axis 146 and the print motion axis 156 are located in a vertical plane that is non-parallel with the plane of the support 404.

In the embodiments described herein, the recoat head actuator 144 and the print head actuator 154 may be, for example and without limitation, mechanical actuators, electro-mechanical actuators, pneumatic actuators, hydraulic actuators, or any other actuator suitable for providing linear motion. Suitable actuators may include, without limitation, worm drive actuators, ball screw actuators, pneumatic pistons, hydraulic pistons, electro-mechanical linear actuators, or the like. In one particular embodiment, the recoat head actuator 144 and the print head actuator 154 are linear actuators similar to the PRO225LM Mechanical Bearing, Linear Motor Stage manufactured by Aerotech® Inc. of Pittsburgh, Pennsylvania.

For example, the actuator assembly 402 may comprise a guide 410 affixed to the support 404 of the rail 180. The recoat head actuator 144 and the print head actuator 154 may be moveably coupled to the rail 180 such that the recoat head actuator 144 and the print head actuator 154 can independently traverse a length of the guide 410. In embodiments, the motive force traversing the recoat head actuator 144 and the print head actuator 154 is supplied by direct-drive linear motors, such as brushless servomotors, for example.

In embodiments, the recoat head actuator 144, the print head actuator 154, and the guide 410 may be a cohesive sub-system that is affixed to the rail 180, such as when the guide 410, the recoat head actuator 144 and the print head actuator 154 are similar to the PRO225LM Mechanical Bearing, Linear Motor Stage, for example. However, it should be understood that other embodiments are contemplated and possible, such as embodiments where the recoat head actuator 144 and the print head actuator 154 comprise multiple components that are individually assembled onto the rail 180 to form the recoat head actuator 144 and the print head actuator 154, respectively.

Still referring to FIGS. 10A-10C, the recoat head 140 is coupled to the recoat head actuator 144 such that the recoat head 140 is situated proximate the working axis 116 (FIG. 2) of the additive manufacturing apparatus 100. Thus, bi-directional actuation of the recoat head actuator 144 along the recoat motion axis 146 affects bi-directional motion of the recoat head 140 on the working axis 116 of the additive manufacturing apparatus 100. In the embodiment of the actuator assembly 402 depicted in FIGS. 10A-10C, the recoat head 140 is coupled to the recoat head actuator 144 with strut 412 such that the recoat head 140 is cantilevered from the support 404 and positioned on the working axis 116 (FIG. 2) of the additive manufacturing apparatus 100. Cantilevering the recoat head 140 from the support 404 allows the recoat head actuator 144 and the guide 410 to be spaced apart from, for example, the build platform 120 of the additive manufacturing apparatus 100 thereby reducing the likelihood that the recoat head actuator 144, the guide 410, and associate electrical components will be fouled or otherwise contaminated with build material 400. This increases the maintenance interval for the recoat head actuator, increases the service life of the recoat head actuator, reduces machine downtime, and reduces build errors due to fouling of the recoat head actuator 144. In addition, spacing the recoat head actuator 144 apart from the build platform 120 of the apparatus 100 allows for improved visual and physical access to the build platform 120 and the supply platform 130, improving the ease of maintenance and allowing for better visual observation (from human observation, camera systems, or the like) of the additive manufacturing process. In some embodiments described herein, the recoat head 140 may be fixed in directions orthogonal to the recoat motion axis 146 and the working axis 116 (i.e., fixed along the +/−Z axis and/or fixed along the +/−Y axis).

In embodiments, the recoat head 140 may be pivotally coupled to the recoat head actuator 144. For example and without limitation, in the embodiment of the actuator assembly 402 depicted in FIGS. 10A-10C, the strut 412 is coupled to the recoat head 140 and pivotally coupled to the recoat head actuator 406 at pivot point 414. This allows the recoat head 140 to be pivoted with respect to the recoat head actuator 406 away from the working axis 116 (FIG. 2) of the apparatus 100 to facilitate, for example, maintenance or removal of components of the apparatus positioned below the recoat head 140 (e.g., the build receptacle, supply receptacle, or the like). In embodiments, the pivot point 414 may include an actuator, such as a motor or the like, to facilitate automated pivoting of the recoat head 140. In embodiments, a separate actuator (not depicted) may be provided between the recoat head 140 and the recoat head actuator 144 to facilitate automated pivoting of the recoat head 140. While FIG. 10C depicts the pivot point 414 positioned between the strut 412 and the recoat head actuator 406, it should be understood that other embodiments are contemplated and possible, such as embodiments where the pivot point 414 is positioned between the strut 412 and the recoat head 140.

Still referring to FIGS. 10A-10C, the print head 150 is coupled to the print head actuator 154 such that the print head 150 is situated proximate the working axis 116 (FIG. 2) of the additive manufacturing apparatus 100. Thus, bi-directional actuation of the print head actuator 154 along the print motion axis 156 affects bi-directional motion of the print head 150 on the working axis 116 of the additive manufacturing apparatus 100. In the embodiment of the actuator assembly 402 depicted in FIGS. 10A-10C, the print head 150 is coupled to the print head actuator 154 with strut 416 such that the print head 150 is cantilevered from the support 404 and positioned on the working axis 116 (FIG. 2) of the additive manufacturing apparatus 100. Cantilevering the print head 150 from the support 404 allows the print head actuator 154 and the guide 410 to be spaced apart from, for example, the build platform 120 of the additive manufacturing apparatus 100 thereby reducing the likelihood that the print head actuator 154, the guide 410, and associate electrical components will be fouled or otherwise contaminated with build material 400. This increases the maintenance interval for the print head actuator, increases the service life of the print head actuator, reduces machine downtime, and reduces build errors due to fouling of the print head actuator 154. In addition, spacing the print head actuator 154 apart from the build platform 120 of the apparatus 100 allows for improved visual and physical access to the build platform 120 and the supply platform 130, improving the ease of maintenance and allowing for better visual observation (from human observation, camera systems, or the like) of the additive manufacturing process. In some embodiments described herein, the print head 150 may be fixed in directions orthogonal to the recoat motion axis 146 and the working axis 116 (i.e., fixed along the +/−Z axis and/or fixed along the +/−Y axis).

In embodiments, the print head 150 may be pivotally coupled to the print head actuator 154. For example and without limitation, in the embodiment of the actuator assembly 402 depicted in FIGS. 10A-10C, the strut 416 is coupled to the print head 150 and pivotally coupled to the print head actuator 408 at pivot point 418. This allows the print head 150 to be pivoted with respect to the print head actuator 408 away from the working axis 116 (FIG. 2) of the apparatus 100 to facilitate, for example, maintenance or removal of components of the apparatus positioned below the print head 150 (e.g., the build receptacle, supply receptacle, or the like). In embodiments, the pivot point 418 may include an actuator, such as a motor or the like, to facilitate automated pivoting of the print head 150. In embodiments, a separate actuator (not depicted) may be provided between the print head 150 and the print head actuator 154 to facilitate automated pivoting of the print head 150. While FIG. 10B depicts the pivot point 418 positioned between the strut 416 and the print head actuator 408, it should be understood that other embodiments are contemplated and possible, such as embodiments where the pivot point 418 is positioned between the strut 416 and the print head 150.

As noted above, in embodiments described herein the recoat head 140 and the print head 150 are both located on the working axis 116 of the apparatus 100. As such, the movements of the recoat head 140 and the print head 150 on the working axis 116 occur along the same axis and are thus co-linear. With this configuration, the recoat head 140 and the print head 150 may occupy the same space (or portions of the same space) along the working axis 116 of the apparatus 100 at different times during a single build cycle. The recoat head 140 and the print head 150 may be moved along the working axis 116 of the apparatus 100 simultaneously in a coordinated fashion, in the same direction and/or in opposing directions, at the same speeds or different speeds. This, in turn, allows for individual steps of the additive manufacturing process, such as the distributing step (also referred to herein as the recoating step), the depositing step (also referred to herein as the printing step), the curing (or heating) step, and/or the cleaning step to be performed with overlapping cycle times. For example, the distributing step may be initiated while the cleaning step is being completed; the depositing step may be initiated while the distributing step in completed; and/or the cleaning step may be initiated while the distributing step is being completed. This may reduce the overall cycle time of the additive manufacturing apparatus 100 to less than the sum of the distributing cycle time (also referred to herein as the recoat cycle time), the depositing cycle time (also referred to herein as the print cycle time), and/or the cleaning cycle time.

The embodiment of the actuator assembly 402 depicted in FIGS. 10A-10C may be implemented in the embodiments of the additive manufacturing apparatuses 100, 101 depicted in FIGS. 2, 8, and 9, for example, as an alternative to the actuator assembly 102. As such, it should be understood that the embodiment of the actuator assembly 402 depicted in FIGS. 10A-10C may be utilized to build an object on the build platform 120 in a similar manner as described herein with respect to FIGS. 2 and 7A-7D.

Various configurations of additive manufacturing apparatuses with actuator assemblies are described below with specific reference to FIGS. 11-15.

Figure 11:
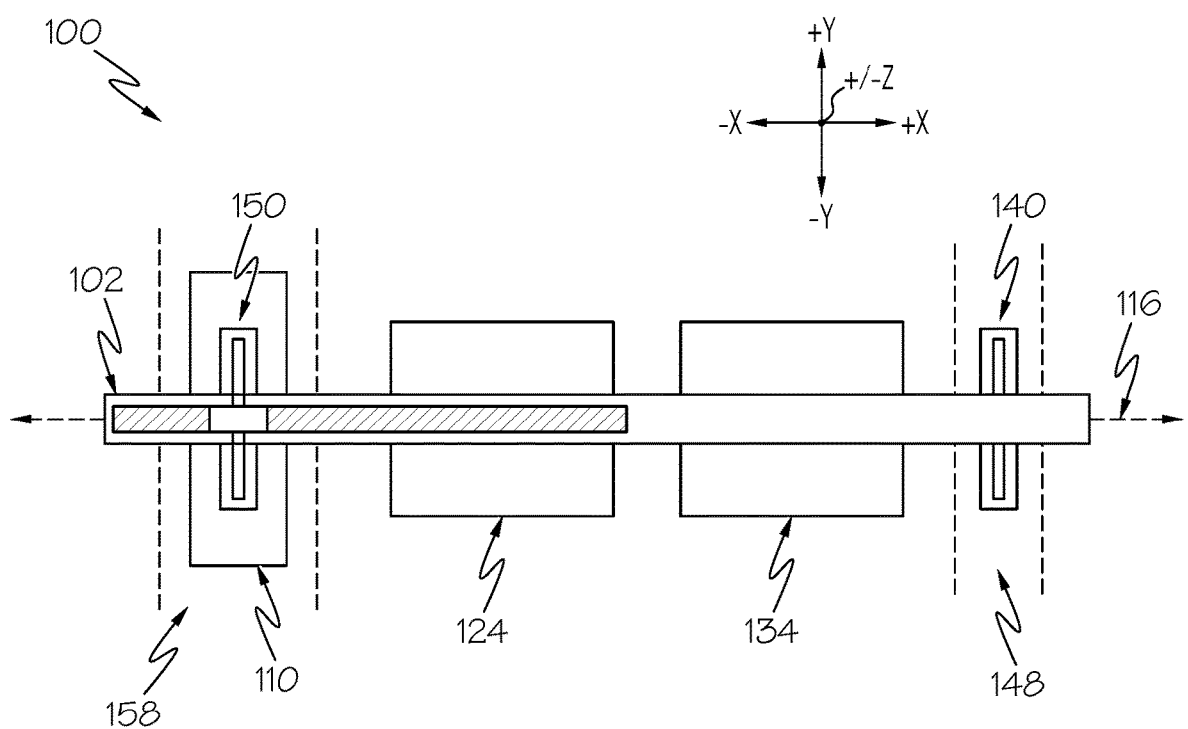
FIG. 11 schematically depicts a top-down view of the additive manufacturing apparatus of FIG. 2.

Referring now to FIG. 11, a top-down view of the additive manufacturing apparatus 100 of FIG. 2 is schematically depicted. As shown in FIG. 11, the additive manufacturing apparatus comprises a cleaning station 110, a build receptacle 124, a supply receptacle 134 and an actuator assembly 102. The actuator assembly 102 comprises, among other elements, a recoat head 140 for distributing build material and a print head 150 for depositing binder material. The cleaning station 110, the build receptacle 124, and the supply receptacle 134 are arranged along the working axis 116 of the apparatus 100 with the build receptacle 124 positioned between the cleaning station 110 and the supply receptacle 134. The actuator assembly 102 is constructed to facilitate independent control of the recoat head 140 and the print head 150 along the working axis 116 of the apparatus 100. For example, the actuator assembly 102 facilitates traversing the print head 150 along the working axis 116 from a print home position 158 co-located with the cleaning station 110, over the build receptacle 124 and back again. The actuator assembly also facilitates traversing the recoat head 140 along the working axis 116 from a recoat home position 148, over the supply receptacle 134, over the build receptacle 124 and back again. As noted herein, the actuator assembly allows for the recoat head 140 and the print head 150 to independently traverse the working axis 116 of the apparatus 100 in the same direction and/or in opposite directions and for the recoat head 140 and the print head 150 to traverse the working axis of the apparatus 100 at different speeds and/or the same speed. Independent actuation and control of the recoat head 140 and the print head 150, in turn, allows for at least some steps of the additive manufacturing process to be performed simultaneously thereby reducing the overall cycle time of the additive manufacturing process to less than the sum of the cycle time for each individual step.

Figure 12:
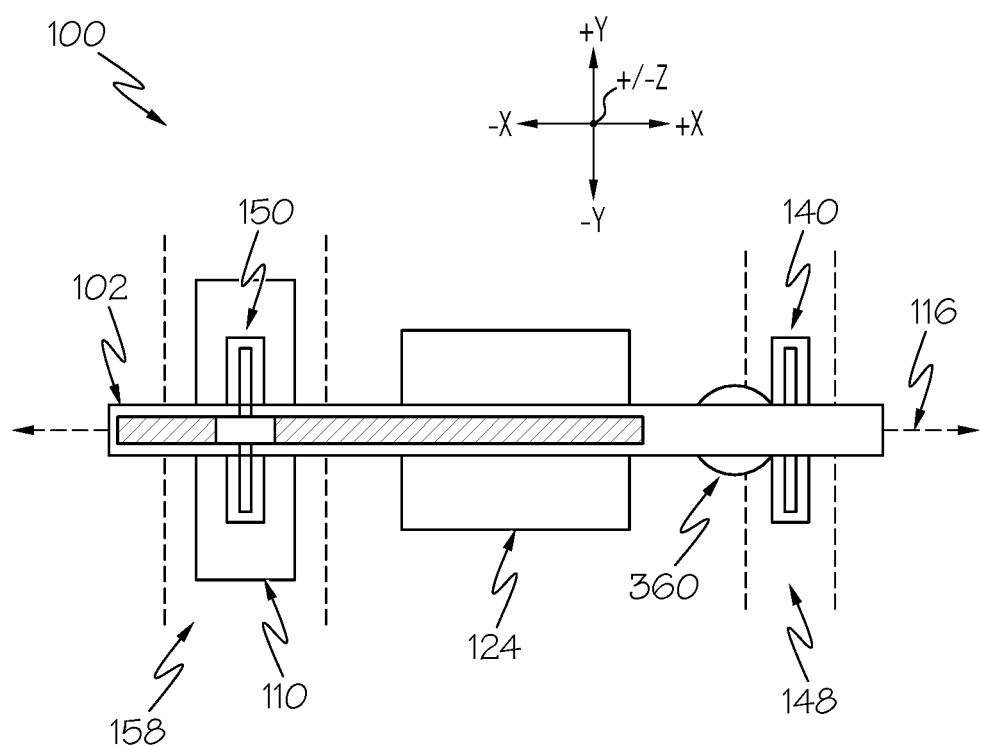
FIG. 12 schematically depicts a top-down view of the additive manufacturing apparatus of FIG. 8 according to one or more embodiments shown and described herein.

Referring now to FIG. 12, a top-down view of the additive manufacturing apparatus 101 of FIG. 8 is schematically depicted. As shown in FIG. 12, the additive manufacturing apparatus comprises a cleaning station 110, a build receptacle 124, and an actuator assembly 102. The actuator assembly 102 comprises, among other elements, a build material hopper 360 for delivering build material, a recoat head 140 for distributing build material, and a print head 150 for depositing binder material. The cleaning station 110 and the build receptacle 124 are arranged along the working axis 116 of the apparatus 100 between a print home position 158 of the print head 150 and a recoat home position 148 of the recoat head 140. The actuator assembly 102 is constructed to facilitate independent control of the recoat head 140 and the print head 150 along the working axis 116 of the apparatus 101. For example, the actuator assembly 102 facilitates traversing the print head 150 along the working axis 116 from the print home position 158 co-located with the cleaning station 110, over the build receptacle 124 and back again. The actuator assembly also facilitates traversing the recoat head 140 and the build material hopper 360 along the working axis 116 from a recoat home position 148, over the build receptacle 124 and back again. The actuator assembly 102 allows for the print head 150 and the recoat head 140 (with attached build material hopper 360) to independently traverse the working axis 116 of the apparatus 101 in the same direction and/or in opposite directions and for the print head 150 and the recoat head 140 (with attached build material hopper 360) to traverse the working axis 116 of the apparatus 101 at different speeds and/or the same speed. Independent actuation and control of the recoat head 140 (with attached build material hopper 360) and the print head 150, in turn, allows for at least some steps of the additive manufacturing process to be performed simultaneously thereby reducing the overall cycle time of the additive manufacturing process to less than the sum of the cycle time for each individual step.

Figure 13:
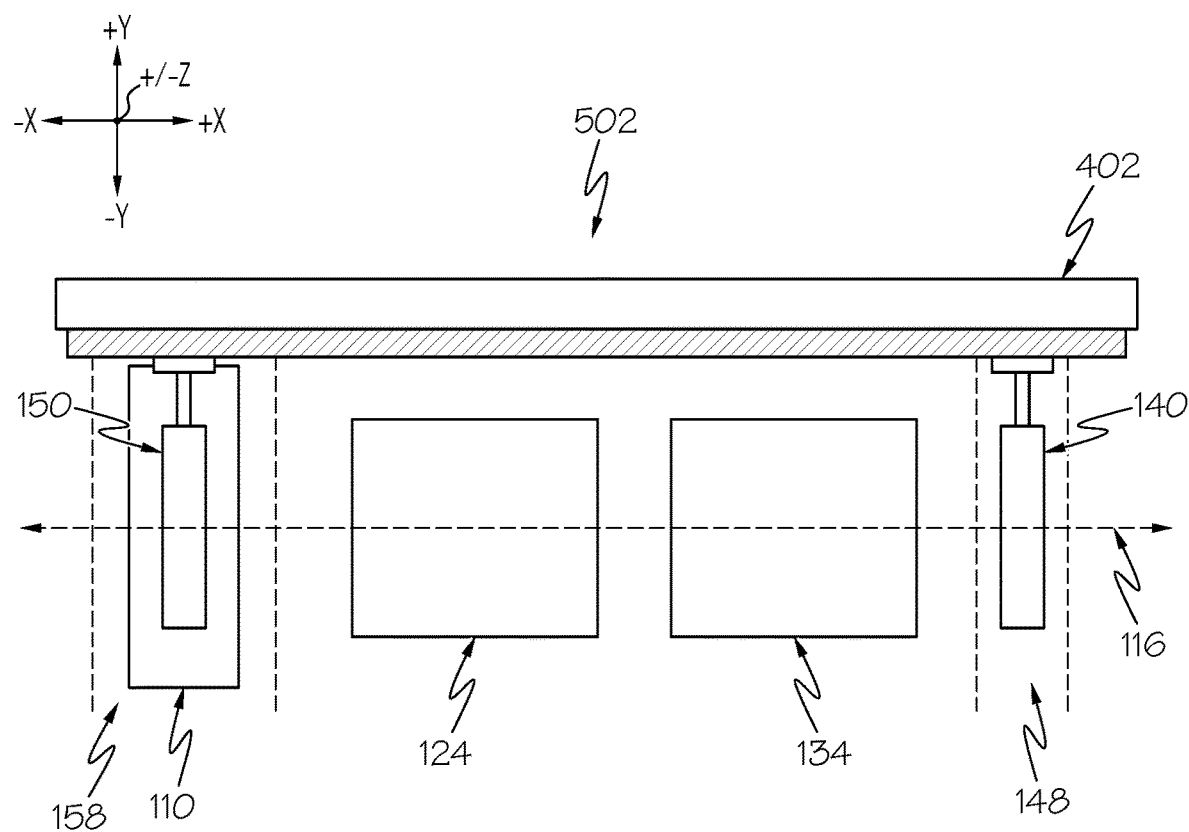
FIG. 13 schematically depicts a top-down view of an additive manufacturing apparatus comprising the actuator assembly of FIGS. 10A-10C according to one or more embodiments shown and described herein.

Referring now to FIG. 13, a top-down view of the additive manufacturing apparatus 502 comprising the actuator assembly 402 of FIGS. 10A-10C is schematically depicted. As shown in FIG. 13, the additive manufacturing apparatus 502 comprises a cleaning station 110, a build receptacle 124, a supply receptacle 134 and the actuator assembly 402. The actuator assembly 402 comprises, among other elements, a recoat head 140 for distributing build material and a print head 150 for depositing binder material. The cleaning station 110, the build receptacle 124, and the supply receptacle 134 are arranged along the working axis 116 of the apparatus 100 with the build receptacle 124 positioned between the cleaning station 110 and the supply receptacle 134. The actuator assembly 402 is laterally spaced apart from the build receptacle 124 that reduces fouling of the electrical components of the actuator assembly 402, as described hereinabove with respect to FIGS. 10A-10C. Further, the actuator assembly 402 is constructed to facilitate independent control of the recoat head 140 and the print head 150 along the working axis 116 of the apparatus 502. For example, the actuator assembly 402 facilitates traversing the print head 150 along the working axis 116 from a print home position 158 co-located with the cleaning station 110, over the build receptacle 24 and back again. The actuator assembly 402 also facilitates traversing the recoat head 140 along the working axis 116 from a recoat home position 148, over the supply receptacle 134, over the build receptacle 124 and back again. As noted herein, the actuator assembly 402 allows for the recoat head 140 and the print head 150 to independently traverse the working axis 116 of the apparatus 502 in the same direction and/or in opposite directions and for the recoat head 140 and the print head 150 to traverse the working axis of the apparatus 502 at different speeds and/or the same speed. Independent actuation and control of the recoat head 140 and the print head 150, in turn, allows for at least some steps of the additive manufacturing process to be performed simultaneously thereby reducing the overall cycle time of the additive manufacturing process to less than the sum of the cycle time for each individual step.

Figure 14:
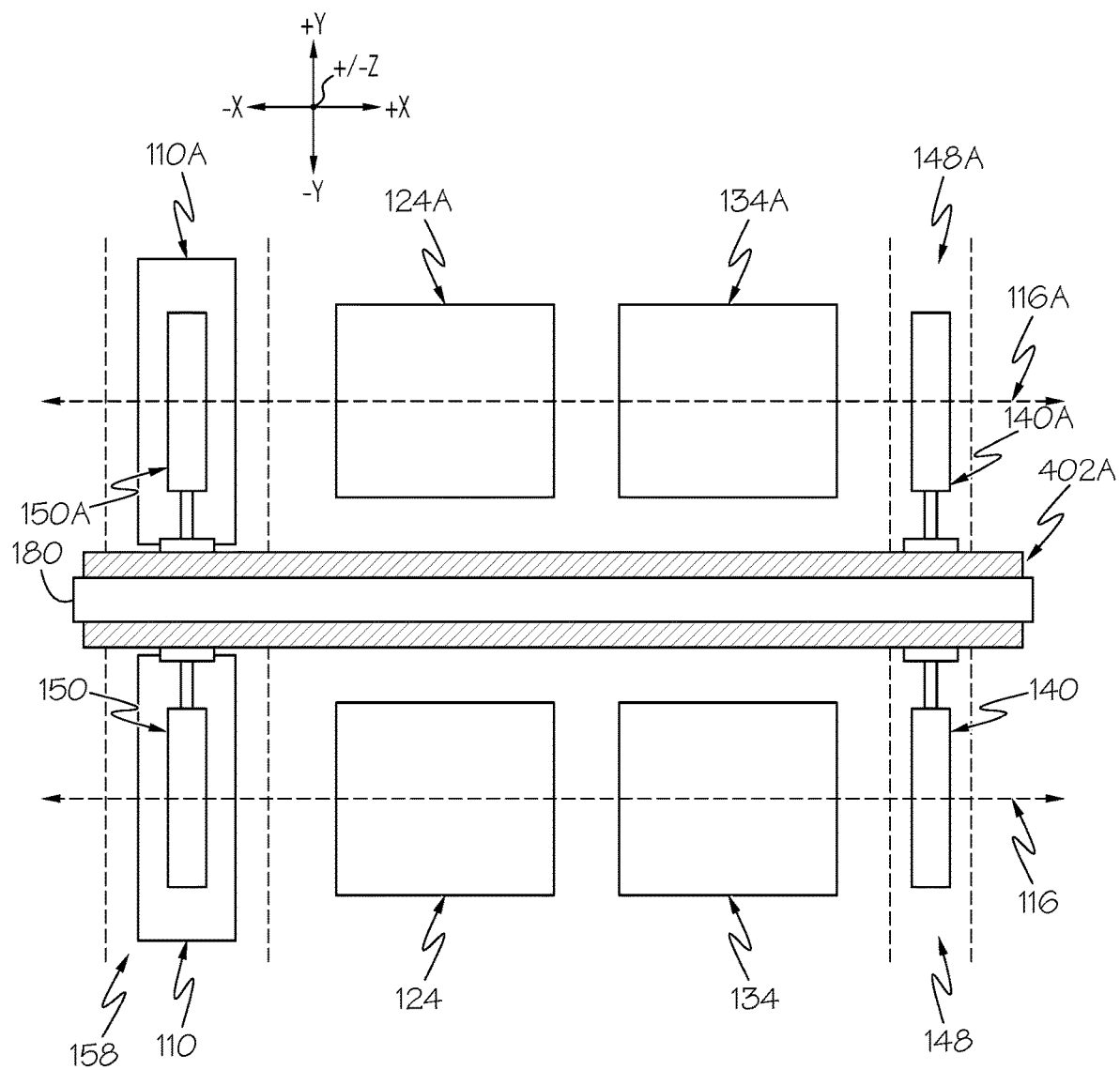
FIG. 14 schematically depicts a top-down view of an additive manufacturing apparatus comprising an alternate configuration of the actuator assembly according to FIGS. 10A-10C according to one or more embodiments shown and described herein.

FIG. 14 schematically depicts another embodiment of an additive manufacturing apparatus 503. In this embodiment, the additive manufacturing apparatus 503 comprises a cleaning station 110, a build receptacle 124, a supply receptacle 134 and an actuator assembly 402A arranged as described herein with respect to FIG. 13. The actuator assembly 402A further comprises a recoat head 140 and a print head 150 as described herein with respect to FIGS. 10A-10C and 13. However, in this embodiment, the additive manufacturing apparatus 503 further comprises a second cleaning station 110A, a second build receptacle 124A, and a second supply receptacle 134A. The second cleaning station 110A, the second build receptacle 124A, and the second supply receptacle 134A are arranged on the opposite side of the actuator assembly 402A from the cleaning station 110, the build receptacle 124, and the supply receptacle 134 and mirror the arrangement of the cleaning station 110, the build receptacle 124, and the supply receptacle 134. In this embodiment, the actuator assembly 402A further comprises a second recoat head 140A and a second print head 150A arranged on the opposite side of the rail 180 of the actuator assembly 402A from the recoat head 140 and the print head 150. The second recoat head 140A and the second print head 150A are arranged and configured in the same manner as the recoat head 140 and the print head 150 (i.e., as described herein with respect to FIGS. 10A-10C and 13), albeit on opposite sides of the rail 180. In this embodiment, the actuator assembly 402A is constructed to facilitate independent control of the recoat head 140 and the print head 150 along the working axis 116 of the apparatus 503 and to facilitate independent control of the second recoat head 140A and the second print head 150A along the second working axis 116A of the apparatus 503. The actuator assembly 402A is also constructed to facilitate control of the recoat head 140 and the print head 150 independent of the second recoat head 140A and the second print head 150A. This embodiment allows for objects to be independently and individually built in the build receptacle 124 and the second build receptacle 124A using a single actuator assembly 402A.

Figure 15:
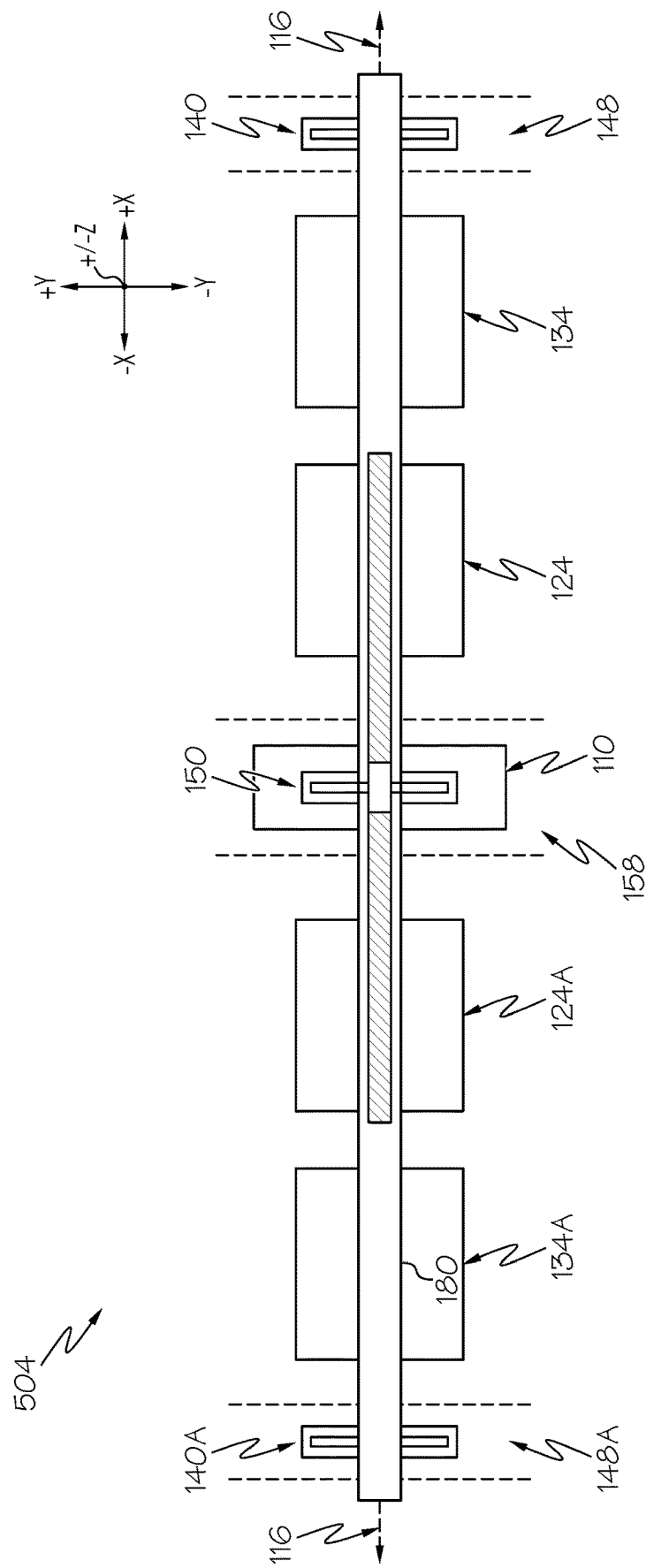
FIG. 15 schematically depicts a top-down view of an additive manufacturing apparatus having multiple build receptacles and supply receptacles according to one or more embodiments shown and described herein.

Referring now to FIG. 15, a top-down view of another embodiment of an additive manufacturing apparatus 504 is schematically depicted. As shown in FIG. 15, the additive manufacturing apparatus 504 comprises a cleaning station 110, a build receptacle 124, a supply receptacle 134 and an actuator assembly 102A. The additive manufacturing apparatus 504 further comprises a second build receptacle 124A and a second supply receptacle 134A. The actuator assembly 102A is similar to the actuator assembly 102 described above with respect to FIGS. 2 and 3 and comprises, among other elements, a recoat head 140 for distributing build material and a print head 150 for depositing binder material. However, in this embodiment, the actuator assembly further comprises a second recoat head 140A coupled to the rail 180 of the actuator assembly 102A such that the print head 150 is positioned between the recoat head 140 and the second recoat head 140A. In this embodiment, the second recoat head 140A may be arranged and configured in a similar manner as the recoat head 140.

In this embodiment, the cleaning station 110, the build receptacle 124, and the supply receptacle 134 are arranged along the working axis 116 of the apparatus 504 with the build receptacle 124 positioned between the cleaning station 110 and the supply receptacle 134. The second build receptacle 124A and the second supply receptacle 134A are arranged along the working axis 116 of the apparatus 504 with the second build receptacle 124A positioned between the cleaning station 110 and the second supply receptacle 134A. The build receptacle 124 and the supply receptacle 134 are located on a side of the cleaning station 110 opposite the second build receptacle 124A and the second supply receptacle 134A.

The actuator assembly 102A is constructed to facilitate independent control of the recoat head 140, the recoat head 140A, the print head 150, and the second print head 150A along the working axis 116 of the apparatus 504. For example, the actuator assembly 102A facilitates traversing the print head 150 along the working axis 116 from a print home position 158 co-located with the cleaning station 110, over the build receptacle 124 and back again. The actuator assembly 102A also facilitates traversing the recoat head 140 along the working axis 116 from a recoat home position 148, over the supply receptacle 134, over the build receptacle 124 and back again. The actuator assembly 102A also facilitates traversing the print head 150 along the working axis 116 from the print home position 158 co-located with the cleaning station 110, over the second build receptacle 124A and back again. The actuator assembly 102A also facilitates traversing the second recoat head 140A along the working axis 116 from a second recoat home position 148A, over the second supply receptacle 134A, over the second build receptacle 124A and back again.

The actuator assembly 102A of this embodiment allows for the recoat head 140, the second recoat head 140A, and the print head 150 to independently traverse the working axis 116 of the apparatus 504 in the same direction and/or in opposite directions and for the recoat head 140, the second recoat head 140A, and the print head 150 to traverse the working axis of the apparatus 504 at different speeds and/or the same speed. Independent actuation and control of the recoat head 140, the second recoat head 140A and the print head 150, in turn, allows for at least some steps of the additive manufacturing process to be performed simultaneously thereby reducing the overall cycle time of the additive manufacturing process to less than the sum of the cycle time for each individual step.

Moreover, including a second recoat head 140A on the actuator assembly, along with a second build receptacle 124A and a second supply receptacle 134A, may further maximize the working time of the print head 150, thereby increasing manufacturing throughput. Specifically, while the recoat head 140 is distributing build material from the supply receptacle 134 to the build receptacle 124, the print head 150 may be utilized to deposit binder material on build material in the second build receptacle 124A. Likewise, while the second recoat head 140A is distributing build material from the second supply receptacle 134A to the second build receptacle 124A, the print head 150 may be utilized to deposit binder material on build material in the build receptacle 124.

While FIGS. 2 and 7A-7D depict one embodiment of a build receptacle 124 and an additive manufacturing operation using the build receptacle 124, it should be understood that other embodiments of build receptacles are contemplated and possible. For example, the time for building an object by the additive manufacturing processes described herein may be further reduced by curing layers of binder material while subsequent layers of binder material are deposited on the build material. Accordingly, in some embodiments, the additive manufacturing apparatus 100 depicted in FIG. 2 may comprise a build receptacle 124 which facilitates curing layers of deposited binder material 500 while subsequent layers of binder material are deposited on build material 400 distributed on the build platform 120 of the build receptacle 124.

Referring now to FIG. 16, an alternative embodiment of a build receptacle 124A for use with an additive manufacturing apparatus 100 is schematically depicted. The build receptacle 124A includes, among other elements, a housing 910 comprising a sidewall 912 at least partially enclosing a build chamber 914, a build platform 120 positioned within the build chamber 914, and a plurality of heating elements 920 disposed around the build chamber 914. The build platform 120 is configured to couple to a lift system 800 of the additive manufacturing apparatus 100. The heating elements 920 of the build receptacle 124A may be utilize to cure layers of deposited binder material while subsequent layers of binder material are deposited on build material distributed on the build platform 120, as will be described in further detail herein.

Still referring to FIG. 16, a position of the build platform 120 is slidably adjustable within the build chamber 914 in a vertical direction (i.e., the +/−Z direction of the coordinate axes depicted in the figures) from a lower position proximate a bottom 970 of the build chamber 914 to one of a plurality of upper positions spaced part from the bottom 970 of the build chamber 914 in the upward vertical direction (i.e., in the +Z direction of the coordinate axes depicted in the figures) and from one of the plurality of upper positions to the lower position.

As described herein, the housing 910 comprises a sidewall 912 at least partially enclosing a build chamber 914. The phrase "at least partially enclosing," as used herein, means that the sidewall 912 bounds the build chamber 914 on at least one side. For example, the sidewall 912 bounds at least the vertical sides of the build chamber 914 (i.e., the sides of the build chamber extending in the +/−Z direction of the coordinate axes depicted in the figures) in the embodiment depicted in FIG. 16. In this embodiment, the sidewall 912 may be, for example, square in horizontal cross section (i.e., a cross section in a plane parallel to the XY plane of the coordinate axes depicted in the figures) enclosing the build chamber 914. In embodiments, the sidewall 912 may be rectangular, circular, or ovoid in horizontal cross section, or any other suitable cross-sectional shape.

The housing 910 and sidewall 912 of the build receptacle 124A may be constructed of, for example and without limitation, a metal or a metallic alloy. As non-limiting examples, the metal or metallic alloy may comprise aluminum or an aluminum alloy, steel, copper or a copper alloy, nickel or a nickel alloy, bronze, or combinations thereof.

Figure 18:
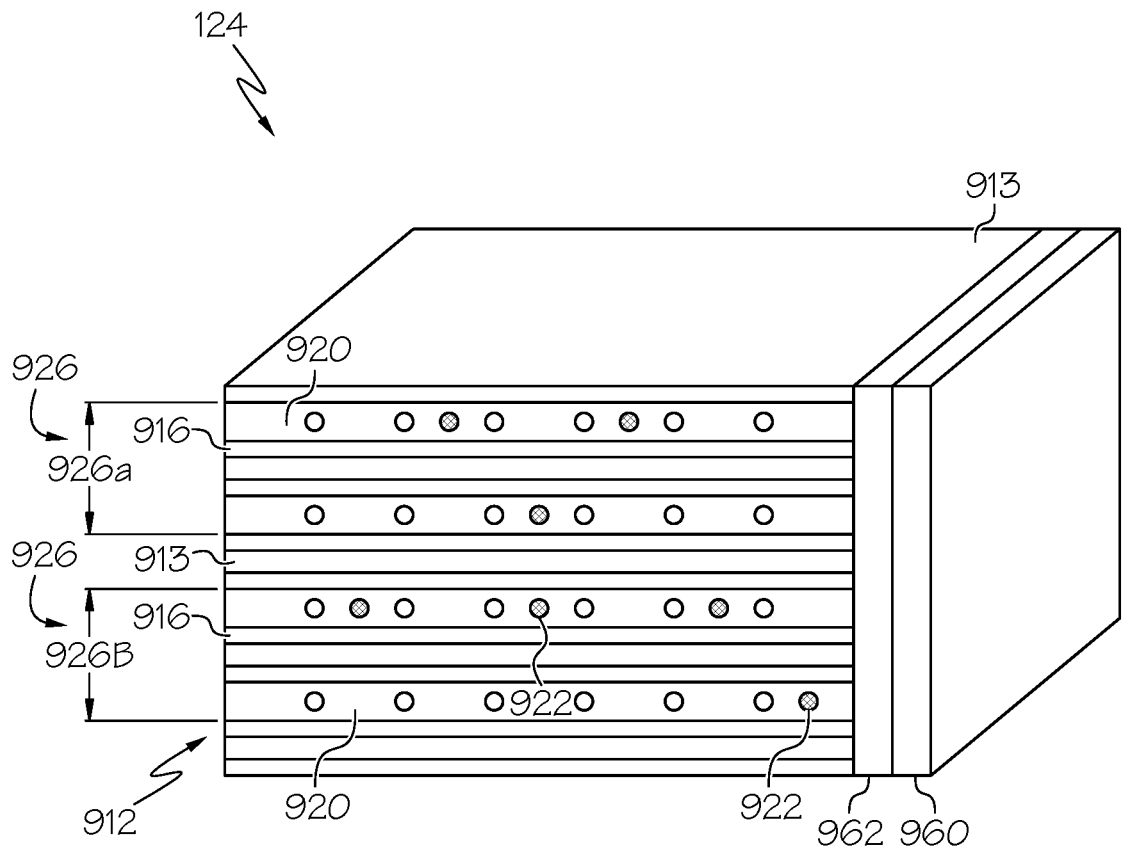
FIG. 18 schematically depicts heating elements coupled to a build receptacle according to one or more embodiments shown and described herein.

Referring now to FIGS. 16 and 18, the build receptacle 124A may include a plurality of heating elements 920, as noted herein. The plurality of heating elements 920 may aid in supplying heat to the build chamber 914 to facilitate curing binder material 500 deposited on build material 400 distributed on the build platform 120 within the build chamber 914. In conventional binder jet additive manufacturing processes, constructed objects are removed from the build chamber before the binder material is fully cured and placed in a separate enclosure, such as an oven or the like, to facilitate or complete curing. Removing the object from the additive manufacturing apparatus and relocating it to a separate apparatus constitutes an additional step in the production process, increasing downtime and decreasing efficiency and productivity. Further, removing uncured objects from the apparatus could potentially result in harm to the object during handling, particularly considering the binder material may be uncured or not fully cured. In the embodiments described herein, to address such concerns, the plurality of heating elements 920 are included in the build receptacle 124A so that the binder material incorporated in the built object may be cured within the build receptacle 124A during the additive manufacturing process.

In embodiments, the plurality of heating elements 920 may be disposed on an exterior surface 913 of the sidewall 912, as depicted in FIG. 18 and described in further detail herein. As an alternative embodiment, the plurality of heating elements 920 may be disposed within the sidewall 912, as depicted in FIG. 16. In yet other embodiments (not depicted), the plurality of heating elements 920 may be disposed both on the exterior surface 913 of the sidewall 912 and within the sidewall 912. The plurality of heating elements 920 may be positioned to facilitate curing of the binder material, as previously described, as the object is built in a layer-wise fashion. In embodiments, the plurality of heating elements 920 may be independently controlled to create a temperature gradient from a bottom 970 of the build chamber 914 to a top 978 of the build chamber 914.

In embodiments, the build platform 120 may be constructed to supply heat and/or supplemental heating to the build chamber 914. For example, in embodiments, the build platform 120 may comprise channels or bores in the thickness of the build platform 120 and heating elements 920 may be disposed within the channels or bores, as depicted in FIG. 16. In some embodiments (not depicted), the plurality of heating elements 920 may optionally be positioned in the top surface and/or affixed to a top surface 974 of the build platform 120. In embodiments (not depicted), the plurality of heating elements 920 may optionally be positioned in and/or affixed to a bottom surface 976 of the build platform 120. Additionally or alternatively, the build platform 120 may comprise channels (not depicted) in the top surface 974 of the build platform 120 and/or the bottom surface 976 of the build platform 120 and the heating elements may be disposed within the channels.

In embodiments, a plurality of heating elements 920 may optionally be disposed on a top surface 814 of a heating platen 810 of the lift system 800, disposed within the thickness of the heating platen 810 as depicted in FIG. 16, disposed in a top surface 814 of the heating platen 810, or any combination thereof. In these embodiments, heat from the heating elements 920 associated with the heating platen 810 may be conducted to the build receptacle 124 and into the build chamber 914 when the build receptacle 124 is positioned on the build heating platen 810 of the lift system 800.

In the embodiments described herein, the heating elements 920 may have one or more form factors. For example and without limitation, the plurality of heating elements 920 may be resistance heaters, cartridge heaters, heating cables, heating tape, or various combinations thereof.

Referring still to FIGS. 16 and 18, in embodiments, the plurality of heating elements 920 may be arranged in heating zones 926 around the build chamber 914. Each heating zone 926 may comprise one or more heating elements 920 as previously described. Heating zones 926 may include heating elements 920 positioned on the sidewall 912, heating elements 920 positioned on or in the build platform 120, and/or heating elements 920 positioned on or in the heating platen 810. In embodiments, each heating zone 926 may be spaced apart from an adjacent heating zone 926 in the vertical direction, as depicted in FIG. 18. The heating elements 920 forming the heating zone 926 may be arranged in a horizontal band around the build chamber 914 of the build receptacle 124A (as depicted in FIG. 18). In embodiments, the heating elements 920 positioned on or in the sidewall 912 may form a distinct heating zone 926, the heating elements 920 positioned on or in the build platform 120 may form another distinct heating zone 926, and the heating elements 920 positioned on or in the heating platen 810 may form yet another distinct heating zone 926. Alternatively or additionally, the heating elements 920 positioned on or in the sidewall 912 may form multiple distinct heating zones 926, the heating elements 920 positioned on or in the build platform 120 may form another distinct heating zone 926, and the heating elements 920 positioned on or in the heating platen 810 may form yet another distinct heating zone 926. Alternatively or additionally, in embodiments, the heating elements 920 positioned on or in the build platform 120 may form multiple distinct heating zones 926.

In embodiments, the build receptacle 124A may further comprise a plurality of temperature sensors 922 arranged around the build chamber 914. In embodiments, the temperature sensors 922 may be disposed on the exterior surface 913 of the sidewall 912. Alternatively, the temperature sensors 922 may be disposed within the sidewall 912. In embodiments where the build receptacle 124A comprises heating elements 920 disposed on or in the build platform 120, the build receptacle 124A may further comprise temperature sensors 922 on or in the build platform 120. In embodiments where the build receptacle 124A comprises heating elements 920 disposed on or in the heating platen 810, the build receptacle 124A may further comprise temperature sensors 922 on or in the heating platen 810.

In embodiments, the temperature sensors 922 may be coupled to individual ones of the plurality of heating elements 920. In embodiments, two temperature sensors 922 may be coupled to individual ones of the plurality of heating elements 920. In such embodiments, the temperature sensors may be positioned such that the diameter (or width) of the build chamber 914 is positioned between the temperature sensors 922.

As a non-limiting example, the plurality of temperature sensors 922 may include resistance temperature detectors. In embodiments, the temperature sensors 922 may detect the heat output of the plurality of heating elements 920, may detect the temperature of the build chamber 914, or both.

Figure 22:
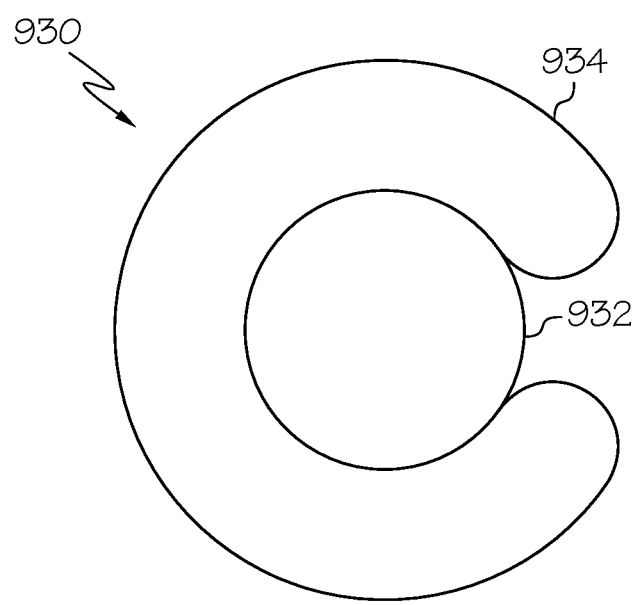
FIG. 22 schematically depicts a seal according to one or more embodiments shown and described herein.

Referring now to FIGS. 16 and 22, in some embodiments, the build receptacle 124A comprises a seal 930 disposed between the build platform 120 and an interior surface 915 of the sidewall 912. The seal 930 may prevent build material and/or binder material, as previously described, from passing between the build platform 120 and the sidewall 912. The seal 930 may be slidable against the sidewall 912, such that the build platform 120 may be actuated within the build chamber 914 in a vertical direction as previously described. Furthermore, the seal 930 may be compressible and recoverable so as to allow the build receptacle 124A and/or build platform 120 to expand and contract with temperature fluctuations while still remaining sealed.

In embodiments, the seal 930 may include a core portion 932 and an enveloping portion 934. In embodiments, the enveloping portion 934 at least partially encloses the core portion 932. In embodiments, the core portion 932 may include polytetrafluoroethylene and the enveloping portion 934 may include a fibrous material. For example, in embodiments, the core portion 932 may comprise a braided polytetrafluoroethylene packing seal. However, it should be understood that other materials may be used for the core portion 932 including, without limitation, Viton™ seals or the like. In embodiments, the fibrous material of the enveloping portion 934 may be a wool felt seal. However, it should be understood that other materials may be used for the enveloping portion 934 including, without limitation, felt seals constructed of other fibrous material or the like.

In embodiments, the build platform 120 may comprise a seal seat 936 formed in an edge of the build platform 120. The seal 930 may be positioned in the seal seat 936 such that the seal 930 is disposed between the build platform 120 and the interior surface 915 of the sidewall 912. In embodiments, the apparatus 100 further includes a seal frame 938 enclosing at least a portion of the seal seat 936. In embodiments, the seal frame 938 may be recessed in a top surface 974 of the build platform 120 (as depicted in FIG. 16) such that the seal frame 938 forms a portion of the top surface of the build platform 120. This configuration of the seal frame 938 and build platform 120 allows for the seal 930 to be serviced and/or replaced without removal of the build platform 120 from the build receptacle 124A. In embodiments in which the build platform 120 comprises a seal frame 938, the seal frame 938 maybe constructed from a metal or a metal alloy. As non-limiting examples, the metal or metal alloy may comprise aluminum or an aluminum alloy, steel, copper or a copper alloy, nickel or a nickel alloy, bronze, or combinations thereof.

In alternative embodiments (not depicted), the build platform 120 may comprise a groove in the perimeter of the build platform 120 between the top surface 974 and the bottom surface 976 of the build platform 120. In this embodiment, the seal 930 may be disposed in the groove such that the seal is positioned between the build platform 120 and the interior surface 915 of the sidewall 912 of the build receptacle 124A.

Figure 23A:
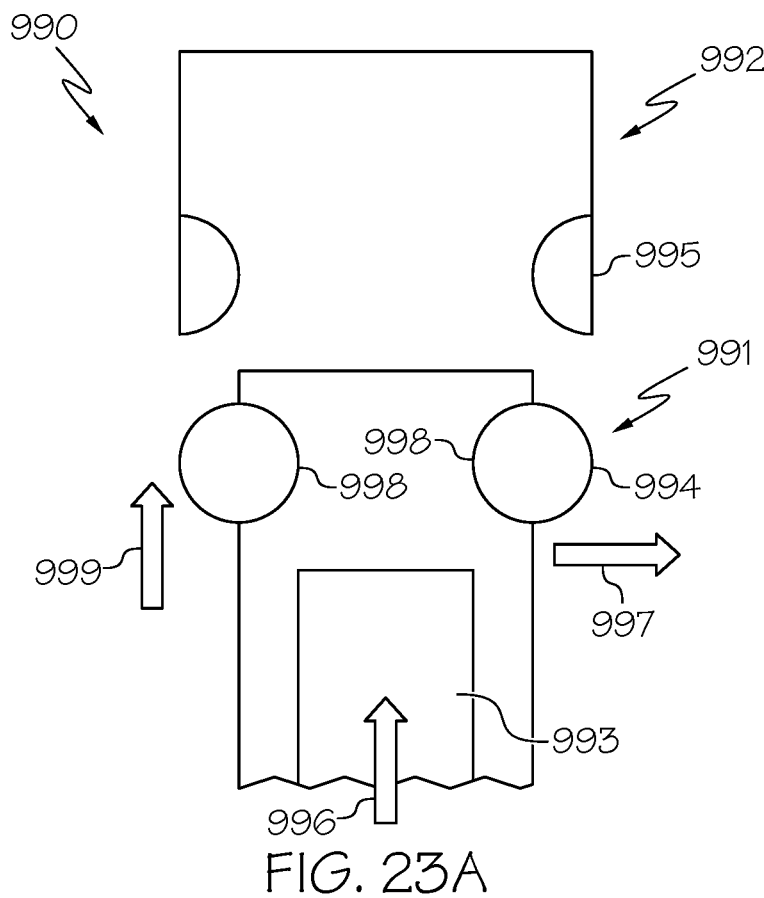
FIG. 23A schematically depicts a connector according to one or more embodiments shown and described herein.
Figure 23B:
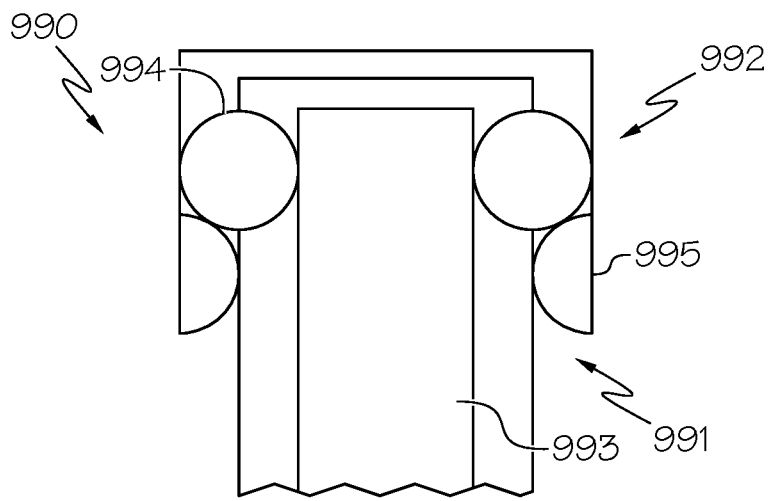
FIG. 23B schematically depicts a connector according to one or more embodiments shown and described herein.

Referring now to FIGS. 16 and 23A-23B, a bottom surface 976 of the build platform 120 may further comprise connectors 990 for coupling the build platform 120 to the heating platen 810 of the lift system 800. The connectors may comprise interference fit connectors, pneumatic connectors, electro-magnetic couplings, parallel groove connectors, or combinations thereof. In embodiments where the connectors 990 are pneumatic connectors, the connectors 990 may comprise mating connectors such as a male connector 991 and a female connector 992 as depicted in FIG. 23A. In such embodiments, pressurized air may push a pin 993 within the male connector 991 up as indicated by arrow 996, to contact inner portions 998 of ball bearings 994. The ball bearings 994 are then extended horizontally as indicated by arrow 997 while the male connector 991 is pushed into the female connector 992 as indicated by arrow 999. The ball bearings 994 then rest above detents 995 within the female connector 992, as depicted in FIG. 23B. In embodiments, the bottom surface 976 of the build platform 120 may comprise either the male connector 991 or the female connector 992, and the lift system 800 may comprise the corresponding connector, where the male connector 991 and the female connector 992 correspond to one another.

Referring again to FIG. 16, in embodiments, the housing 910 of the build receptacle 124A may comprise a flange 940 extending from the sidewall 912 proximate a top 972 of the sidewall 912. The flange 940 may support the build receptacle 124A within the additive manufacturing apparatus 100. For example, the build receptacle 124A may hang within the apparatus 100 by the flange 940.

Figure 24A:
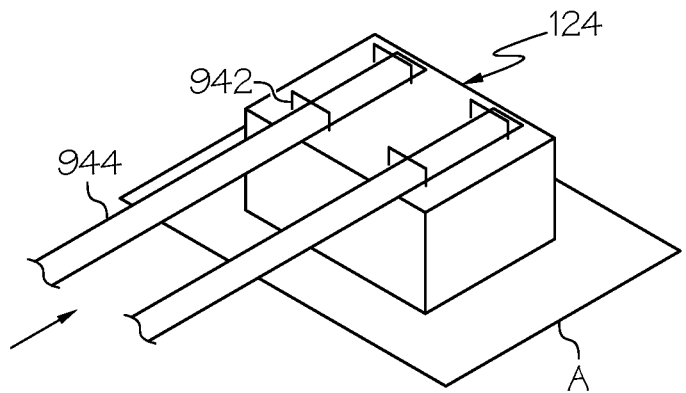
FIG. 24A schematically depicts a perspective view of a build receptacle for use with an additive manufacturing apparatus according to one or more embodiments shown and described herein.
Figure 24B:
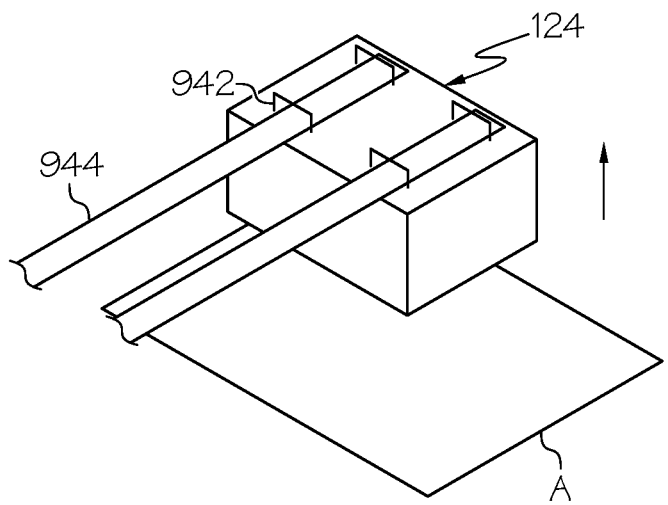
FIG. 24B schematically depicts a perspective view of a build receptacle for use with an additive manufacturing apparatus according to one or more embodiments shown and described herein.
Figure 24C:
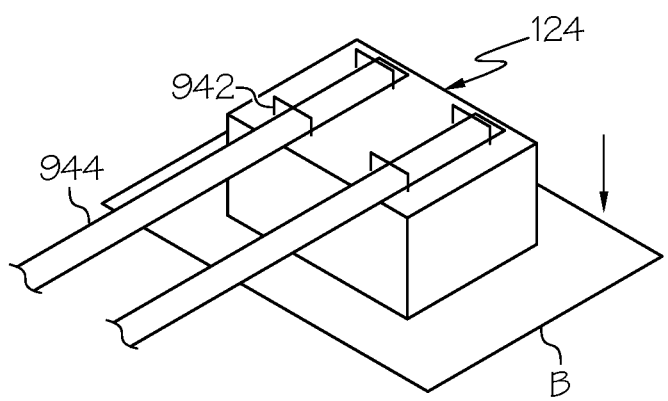
FIG. 24C schematically depicts a perspective view of a build receptacle for use with an additive manufacturing apparatus according to one or more embodiments shown and described herein.
Figure 28:
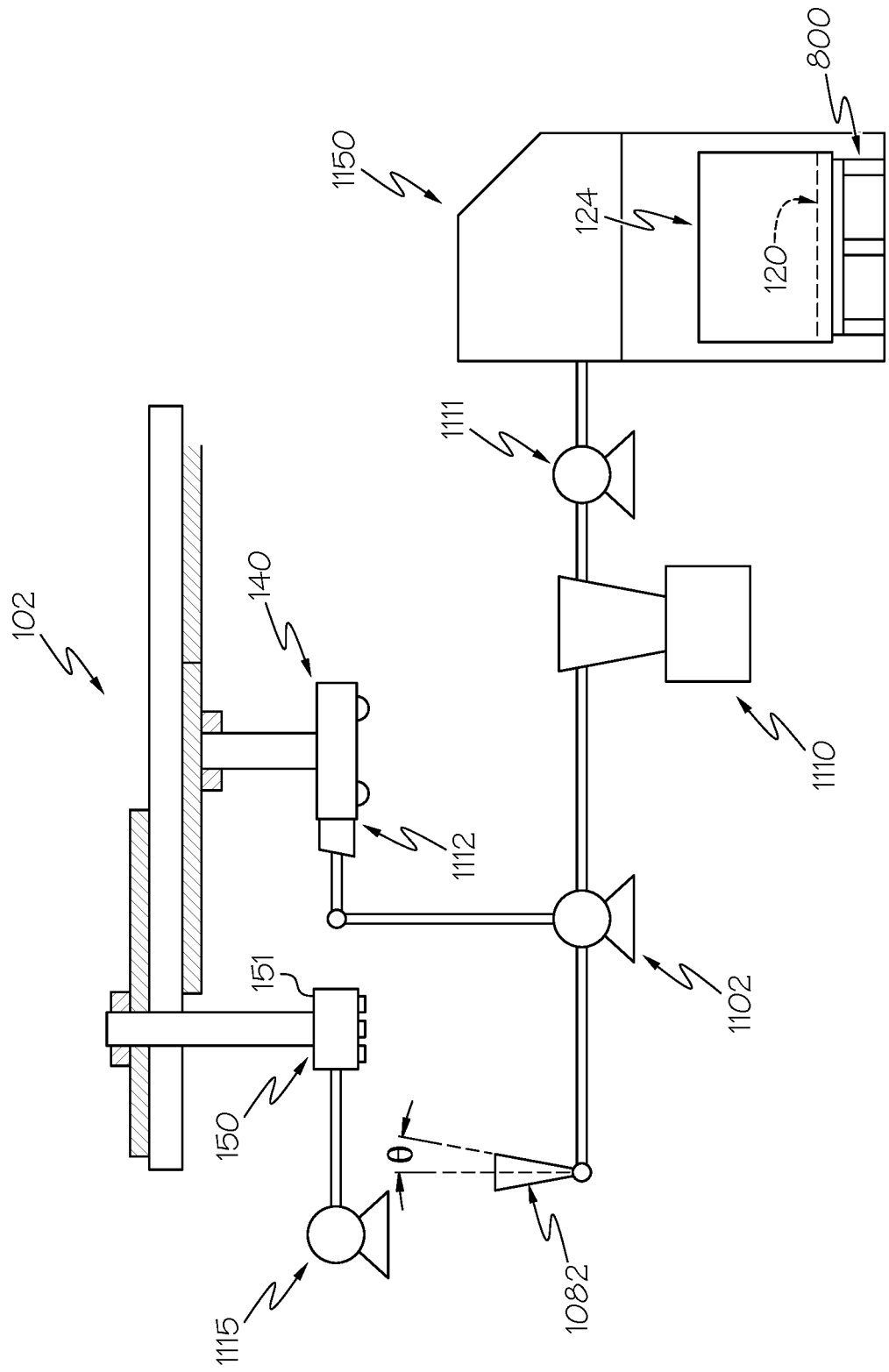
FIG. 28 schematically depicts the interconnectivity of various components and accessories of an additive manufacturing apparatus to a sieve system and an air pump according to one or more embodiments shown and described herein.

Referring to FIGS. 17 and 24A-24C, in embodiments, the build receptacle 124A may further comprise a plurality of lift points 942 located on the flange 940, on the sidewall 912, or both. The lift points 942 may facilitate lifting and lowering of the build receptacle 124A. In embodiments, the build receptacle 124A may be lifted from a first location, A, to move the build receptacle 124A to a second location, B, as depicted in FIGS. 24A-24C. As non-limiting examples, the build receptacle 124A may be lifted by a forklift, a lifting box, a pallet jack, a winch, or combinations thereof. When the build receptacle 124A is lifted by a forklift, the forks 944 of the forklift may be utilized to lift and lower the build receptacle 124A with the lift points 942, as depicted in FIGS. 24A-24B. The forklift may then transfer the build receptacle 124A to location B as depicted in FIG. 24C. The locations A and B may include, as non-limiting examples, the apparatus 100, a curing station, or a de-powdering station 1150 (FIG. 28). The curing station may be an enclosure separate from the apparatus 100 where the build receptacle 124A may be placed to cure the object within the build receptacle 124A at a curing temperature. For example, the build receptacle 124A may comprise electrical connectors (described in further detail herein) coupled to the heating elements 920 and, optionally, the temperature sensors 922. The heating elements 920 and the temperature sensors 922 may be coupled to the control system 200 (FIG. 6) and power supplies of the additive manufacturing apparatus 100 with the electrical connectors during a build operation. After the build operation is complete, the electrical connectors are decoupled from the control system 200 and power supplies of the additive manufacturing apparatus 100, moved to the curing station, and recoupled to the control system and/or power supplies of the curing station to complete curing. The de-powdering station 1150 may be a location separate from the apparatus 100 where the build receptacle 124A may be placed to remove excess build material from the build receptacle 124A and/or to cure the object within the build receptacle 124A. After the build operation is complete, the electrical connectors are decoupled from the control system 200 and power supplies of the additive manufacturing apparatus 100, moved to the de-powdering station, and recoupled to the control system and/or power supplies of the de-powdering station to complete curing and de-powdering.

In embodiments, each lift point of the plurality of lift points 942 may comprise a handle extending from the flange 940, the sidewall 912, or both. For example, and without limitation, the handle may be an inverted U-shaped member attached to the flange 940 or an inverted L-shaped member attached to the flange 940. Alternatively, the handle may be a C-shaped member attached to the sidewall 912. Alternatively, each lift point of the plurality of lift points 942 comprises a lift flange extending from the sidewall 912. For example, and without limitation, the lift flange may comprise a rod extending perpendicularly from the sidewall 912. Alternatively, the lift flange may comprise an L-shaped member attached to the sidewall 912.

Referring again to FIGS. 16 and 17, the build receptacle 124A may further comprise a lid 950. In embodiments, the lid 950 at least partially encloses the build chamber 914. The lid 950 may be positioned proximate the top 972 of the sidewall 912. In embodiments, the lid 950 may be flush with the flange 940 extending from the sidewall 912 proximate the top 972 of the sidewall 912. The lid 950 may prevent build material, as previously described, from exiting the build chamber 914 after completion of a build operation, such as when the build receptacle 124A is removed from the additive manufacturing apparatus 100 for de-powdering. In embodiments, the lid 950 may prevent the build material from exiting the build chamber 914 during movement of the build receptacle 124A between the apparatus 100, the curing station, and/or the de-powdering station. Alternatively or additionally, the lid 950 may assist in thermally insulate the build chamber 914 during curing and/or the lid 950 may prevent heat from leaking from the build chamber 914. In that regard, the lid 950 may comprise insulation. In embodiments, the lid may comprise a handle 952 to facilitate easy access to the build chamber 914 of the build receptacle 124A. In embodiments, the handle 952 may be an inverted U-shaped member attached to the lid 950. The lid 950 may comprise a metal or a metal alloy. As non-limiting examples, the metal or metal alloy may comprise aluminum or an aluminum alloy, steel, copper or a copper alloy, nickel or a nickel alloy, bronze, or combinations thereof.

Referring now to FIG. 18, in embodiments, the exterior surface 913 of the sidewall 912 of the build receptacle 124A may comprises grooves 916. In these embodiments, the plurality of heating elements 920 may be positioned in the grooves 916. In embodiments, the grooves 916 may be formed into the exterior surface 913 of the sidewall 912, such as by machining or the like. Alternatively or additionally, the grooves 916 may be formed by affixing strips of material to the exterior surface 913 of the sidewall 912. The grooves 916 may, for example, aid in aligning and/or attaching the heating elements 920 on the exterior surface 913 of the sidewall 912. The grooves 916 may also, for example, aid in thermally isolating adjacent heating elements 920 from one another, thereby improving the ability to establish and maintain a temperature gradient with respect to the build chamber 914.

While FIG. 18 depicts the exterior surface 913 of the sidewall 912 of the build receptacle 124A as comprising grooves 916, it should be understood that the grooves are optional and that, in some embodiments, the build receptacle 124A is constructed without grooves 916 in the sidewall 912 of the build receptacle 124A. In embodiments, each groove 916 may comprise a set of heating elements 920 within the groove 916. Furthermore, in embodiments, each set of heating elements 920 within each groove 916 may form separate heating zones 926.

Still referring to FIG. 18, in some embodiments, the build receptacle 124A may further comprise at least one cover 960 (one depicted in FIG. 18) affixed to the exterior surface 913 of the sidewall 912 such that the plurality of heating elements 920 are disposed between the cover 960 and the exterior surface 913 of the sidewall 912. The cover 960 may comprise a metal or a metal alloy. As non-limiting examples, the metal or metal alloy may comprise aluminum or an aluminum alloy, steel, copper or a copper alloy, nickel or a nickel alloy, bronze, or combinations thereof. The build receptacle 124A may further comprise insulation 962 positioned between the cover 960 and the plurality of heating elements 920. The insulation 962 may comprise, for example and without limitation, refractory ceramic materials such as alumina board or alumina fiber, fiberglass, mineral wool, cellulose, natural fibers, polystyrene, polyisocyanurate, polyurethane, urea-formaldehyde foam, phenolic foam, cementitious foam, or combinations of these. In the case of cementitious foam, the cementitious foam may include magnesium silicate, magnesium oxide, or both. Without intending to be bound by theory, the cover 960 (with or without insulation) may aid in maintaining heat within the build chamber 914 and may protect the plurality of heating elements 920 from damage, such as during handling of the build receptacle 124A.

Figure 19:
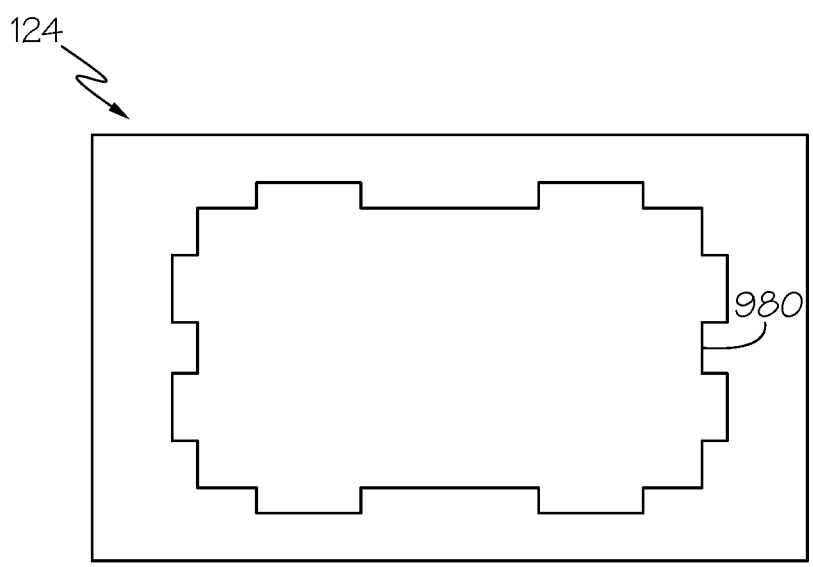
FIG. 19 schematically depicts a bottom view of a build receptacle according to one or more embodiments shown and described herein.

The housing 910 of the build receptacle 124A may further include a plurality of retention tabs 980, as depicted in FIG. 19. The plurality of retention tabs 980 may extend from the sidewall 912 of the build receptacle 124A into the build chamber 914 proximate a bottom of the sidewall 912. The build platform 120 may be seated on the plurality of retention tabs 980 when the build platform 120 is in the lower position as previously described. The plurality of retention tabs 980 may prevent the build platform 120 from descending below the bottom 970 of the build chamber 914.

Figure 17:
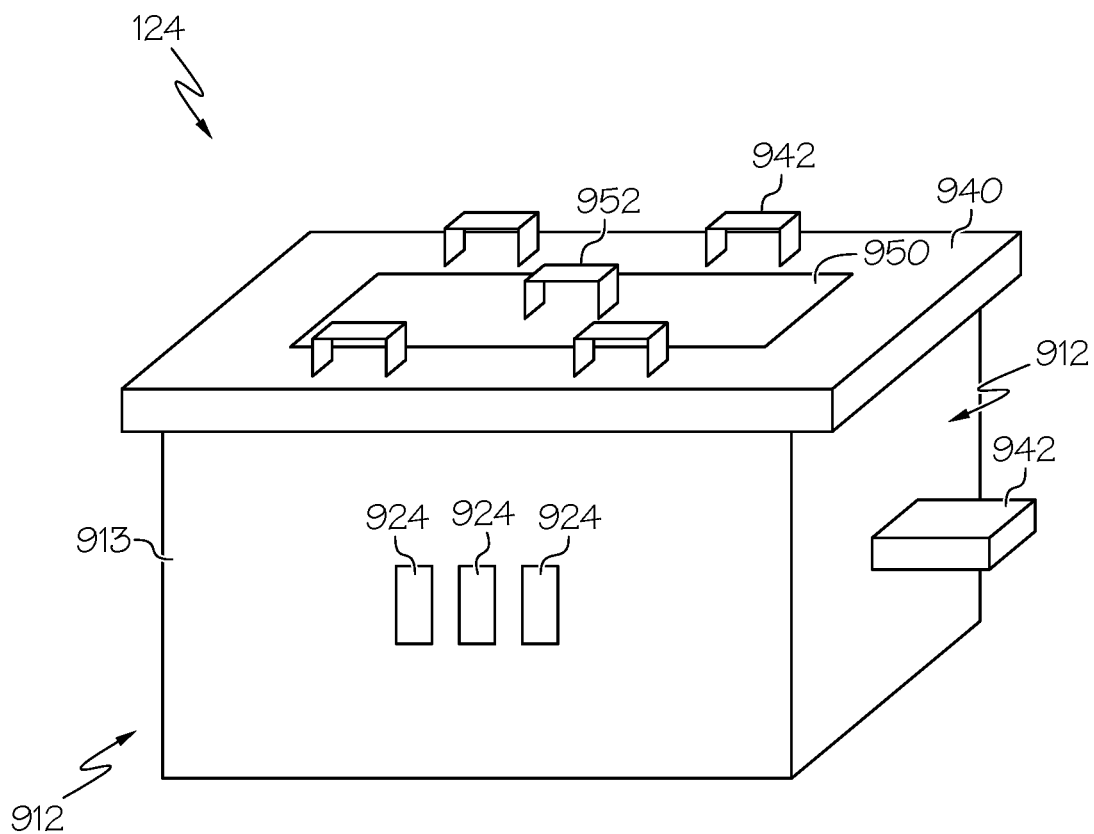
FIG. 17 schematically depicts a perspective view of a build receptacle for use with an additive manufacturing apparatus according to one or more embodiments shown and described herein.

Referring to FIGS. 16-18, the plurality of heating elements 920 may be communicatively coupled to at least one electrical connector 924, as described herein. The at least one electrical connector 924 may be disposed on the exterior surface 913 of the sidewall 912. In some embodiments, the at least one electrical connector 924 supplies power to the plurality of heating elements 920. In embodiments, the at least one electrical connector 924 may transmit electrical signals from the build receptacle 124A indicative of a temperature of the sidewall 912 of the build receptacle 124A. Specifically, in embodiments, the temperature sensors 922 may be communicatively coupled to at least one electrical connector 924 disposed on the exterior surface 913 of the sidewall 912. In some embodiments, the electrical connectors 924 supply power to the temperature sensors 922 and transmit electrical signals from the build receptacle 124A.

In embodiments, the electrical connectors 924 may also facilitate portability of the build receptacle 124A. For example, the electrical connectors 924 may be connected to a power source regardless of whether the build receptacle 124A is within the apparatus 100. In embodiments, the electrical connectors 924 may be connected to a power source when the build receptacle 124A is within the apparatus 100, when the build receptacle 124A is at a curing station as previously described, or when the build receptacle 124A is at a depowdering station as previously described.

Referring to FIG. 16, in the embodiments described herein, the additive manufacturing apparatus 100 may further comprise a lift system 800 that is removably coupled to the build platform 120 to facilitate movement of the build platform 120 in the vertical direction when the build receptacle 124A is disposed in the additive manufacturing apparatus 100. In embodiments, the lift system 800 may comprise a heating platen 810 and a plurality of heating elements 920, as described herein. The heating platen 810 may be coupled to an upper end of a build platform actuator 122.

The heating platen 810 is thermally coupled to the build platform 120, such as by proximity coupling, when the lift system 800 is coupled to the build platform 120 with the connectors 990 previous described (FIGS. 23A-23B). Specifically, when the lift system 800 is coupled to the build platform 120, a bottom surface of the build platform 120 may be in contact with an upper surface of the heating platen 810. The heating platen 810 may supply heat and/or supplemental heating to the build platform 120 with heating elements 920 operatively associated with the heating platen 810, as described herein. The heating platen 810 may be constructed of, for example and without limitation, a metal or a metal alloy. As non-limiting examples, the metal or metal alloy may comprise aluminum or an aluminum alloy, steel, copper or a copper alloy, nickel or a nickel alloy, bronze, or combinations thereof.

In the embodiment shown in FIG. 16, the build platform actuator 122 comprises a ball screw 802 coupled to a motor 804. The build platform actuator 122 may further comprise a drive linkage 806 connecting the ball screw 802 to an armature of the motor 804 such that the ball screw 802 is rotatably coupled to the armature of the motor 804. The drive linkage 806 may be, for example and without limitation, a belt, a chain, or the like. In embodiments, the armature of the motor rotates, thereby driving the drive linkage 806. The drive linkage 806, in turn, may rotate the ball screw 802, thereby advancing the build platform actuator 122. However, it should be understood that other embodiments are contemplated and possible.

While FIG. 16 depicts an embodiment of a lift system 800 with a build platform actuator 122 comprising a ball screw 802 coupled to a motor 804 with a drive linkage 806, it should be understood that other embodiments of the build platform actuator 122 are contemplated and possible, such as those previously described in reference to the build platform actuator 122 shown in FIG. 2.

In the embodiments described herein, the lift system 800 may further comprise a plurality of vertical guides 820 coupled to the heating platen 810. The plurality of vertical guides 820 extend in a vertical direction (i.e., a direction parallel to the +/−Z direction of the coordinate axes in the figures) and are spaced apart from one another in a horizontal direction (i.e., a direction parallel to the +/−X direction of the coordinate axes depicted in the figures). The lift system 800 may include a single vertical guide (not depicted), or multiple vertical guides 820, as depicted in FIG. 16. The vertical guides 820 may be circular or ovoid in horizontal cross section (i.e., a cross section in the Y-X plane of the coordinate axes depicted in the figures). However, it should be understood that other embodiments are contemplated and possible. The vertical guides 820 may maintain the orientation of the build platform 120 as the build platform 120 is actuated within the build receptacle 124A between the lower position and the plurality of upper positions by the build platform actuator 122.

In embodiments, the lift system 800 may include sensors for determining the location of the heating platen 810, the build platform 120, or both. For example, the lift system 800 may include a heating platen position sensor 840 for detecting a vertical position of the heating platen 810. The heating platen position sensor 840 may be positioned proximate to a lower end 860 of the lift system 800 and, in some embodiments, includes a limit switch. In embodiments, the limit switch may comprise a capacitive limit switch, an inductive limit switch, a photoelectric limit switch, a mechanical limit switch, or combinations thereof. The heating platen position sensor 840 may be communicatively coupled to the control system 200 such that the control system 200 receives electrical signals indicative of the position of the heating platen 810. The control system 200 may utilize these signals to control positioning of the heating platen 810 (and hence the build platform 120 attached to the heating platen 810) within the build receptacle 124A.

The lift system 800 may further include a build platform position sensor 850 for detecting a vertical position of the build platform 120. In some embodiments, the build platform position sensor 850 may include an inductive limit switch. In embodiments, the limit switch may comprise a capacitive limit switch, an inductive limit switch, a photoelectric limit switch, a mechanical limit switch, or combinations thereof. The build platform position sensor 850 may be communicatively coupled to the control system 200 such that the control system 200 receives electrical signals indicative of the position of the build platform 120. The control system 200 may utilize these signals to control positioning of the build platform 120 within the build receptacle 124A.

Although the lift system 800 is described herein in the context of the build receptacle 124A, it should be understood that the additive manufacturing apparatus 100 may include a similar lift system 800 removably coupled to the supply receptacle 134 (FIG. 2).

Figure 20:
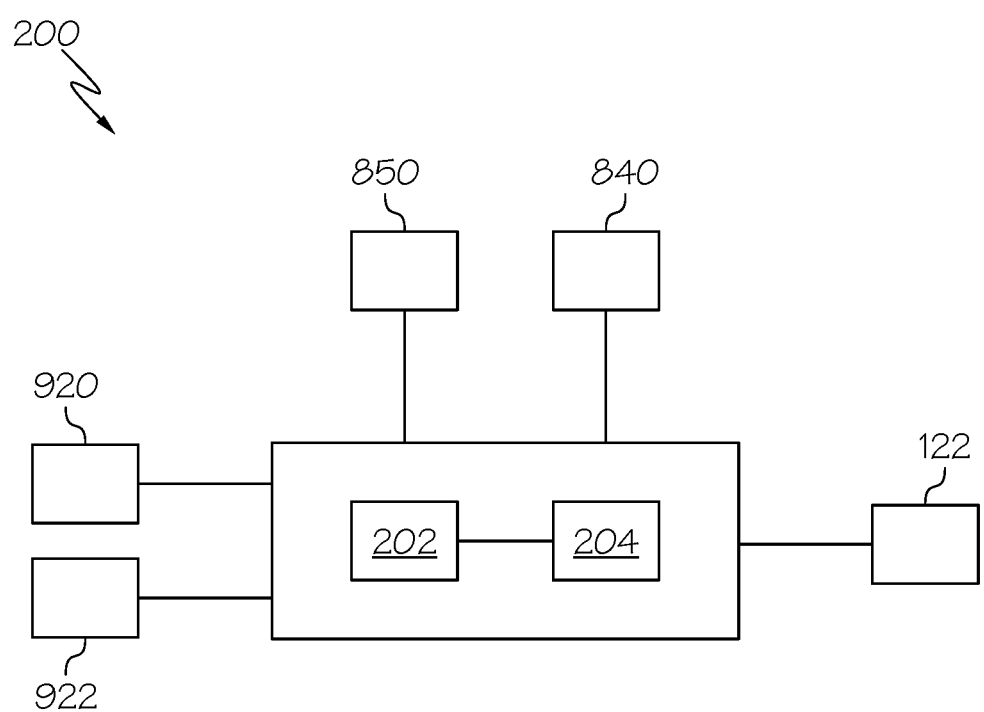
FIG. 20 schematically depicts a control unit for a build receptacle according to one or more embodiments shown and described herein.

Referring to FIGS. 16 and 20, another portion of the control system 200 for controlling the additive manufacturing apparatus 100 of FIG. 6 is schematically depicted. The control system 200 may be communicatively coupled to the build platform actuator 122, the plurality of heating elements 920, the temperature sensors 922, the heating platen position sensor 840, and the build platform position sensor 850.

In the embodiments described herein, the processor 202 of the control system 200 is configured to provide control signals to (and thereby actuate) the build platform actuator 122, the plurality of heating elements 920, and the temperature sensors 922. The control system 200 may also be configured to receive signals from the plurality of heating elements 920, the temperature sensors 922, the heating platen position sensor 840, and the build platform position sensor 850 and, based on these signals, actuate either the build platform actuator 122 and/or the plurality of heating elements 920.

In embodiments, the heating platen position sensor 840 may be communicatively coupled to the control system 200 as described herein. The heating platen position sensor 840 may provide a feedback signal to the control system 200 to cease actuating the lift system 800. The heating platen position sensor 840 may detect the position of the heating platen 810 to ensure the heating platen 810 and the build platform 120 are not actuated below a lower end 860 of the lift system 800, to avoid damage to the apparatus 100.

In embodiments, the build platform position sensor 850 may be communicatively coupled to a control system 200 as described herein. The build platform position sensor 850 may provide a feedback signal to the control system 200 to cease actuating the lift system 800. The build platform position sensor 850 may detect the position of the build platform 120 to ensure the build platform 120 and the heating platen 810 are not actuated below a lower limit proximate a lower end 860 of the lift system 800, to avoid damage to the apparatus 100.

Referring to FIGS. 18 and 20, as stated previously, the plurality of heating elements 920 may be arranged in heating zones 926. In embodiments, each heating zone 926 of heating elements 920 is independently actuatable by the control system 200. Independently actuatable heating zones 926 means that the control system 200 may heat each heating zone 926 of heating elements 920 to a specific temperature independently of any other heating zone 926. For example, and without limitation, when each heating zone 926 is spaced apart from an adjacent heating zone 926 in the vertical direction and each heating zone 926 is arranged in a horizontal band on the sidewall 912 (as depicted in FIG. 18), the heating zones 926 may be actuated to establish a temperature gradient within the build chamber 914. Furthermore, heating zones 926 formed by the heating elements 920 positioned on the build platform 120 and the heating platen 810 may be actuated by the control system 200 to establish or contribute to the temperature gradient.

In embodiments, the plurality of heating elements 920 positioned around the build chamber 914 may form two distinct heating zones 926, specifically heating zone 926A and heating zone 926B (as depicted in FIG. 18). In such embodiments, the two distinct heating zones 926A and 926B may be independently actuated by the control system 600. In embodiments, the two distinct heating zones 926A and 926B may be arranged vertically spaced from one another and may comprise a horizontal band of heating elements 920 (as depicted in FIG. 18). Alternatively or additionally, the build receptacle 124A may comprise two distinct heating zones 926A and 926B that are horizontally spaced from one another and comprise a vertical band of heating elements 920 (not depicted). In embodiments, the two distinct heating zones 926A and 926B may repeat and form vertically alternating heating zones 926A and 926B, or form horizontally alternating heating zones 926A and 926B.

In embodiments, following the logic described previously in regards to two distinct heating zones 926 (926A and 926B), it is contemplated that the plurality of heating elements 920 positioned on the build receptacle 124A may form three or more distinct heating zones 926 (926A, 926B, 926C, etc.). These distinct heating zones may form blocked groupings or alternating groupings.

The operation of the build receptacle 124A will now be described in further detail with specific reference to FIGS. 16, 20, and 21A-21C. As referenced previously, in describing the operation of the additive manufacturing apparatus 100, specific reference will be made herein to build material 400 and binder material 500. It should be understood that the following operation of the build receptacle 124A may be used in conjunction with method of operating the additive manufacturing apparatus 100 described hereinabove with respect to FIGS. 2 and 7A-7D.

Figure 21A:
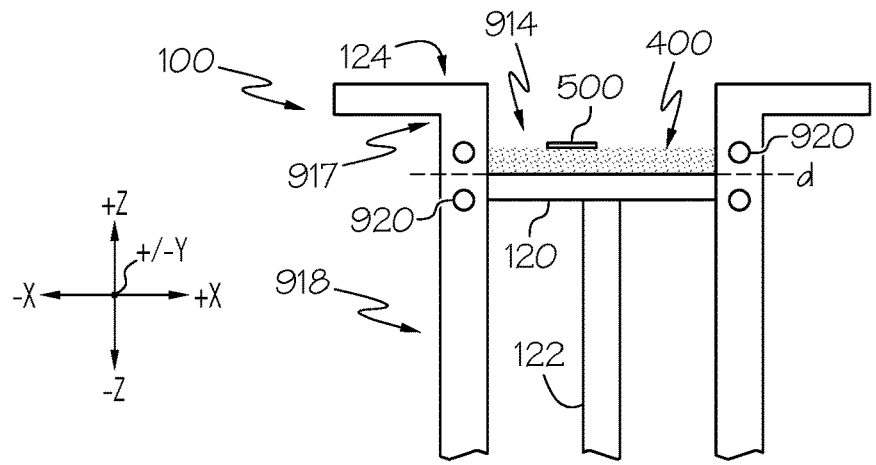
FIG. 21A schematically depicts the build receptacle of FIG. 16 in use according to one or more embodiments shown and described herein.

Referring initially to FIG. 21A, the build receptacle 124A is depicted at the initiation of a thermal curing process. The thermal curing process may begin with build material 400 and binder material 500 deposited on the build platform 120 (as depicted), or, as a non-limiting example, may begin during deposition of the build material 400 and the binder material 500, such as in embodiments where the recoat head comprises an energy source as described herein.

In FIG. 21A, the build material 400 and the binder material 500 are deposited on the build platform 120 as previously described. The build material 400 and the binder material 500 are deposited on the build platform 120 in a deposition region 917 of the build chamber 914 vertically spaced above axis d, which is parallel to the working axis 116 of the apparatus 100 (FIG. 2). Axis d represents the transition from the deposition region 917 of the build chamber 914 to a curing region 918 of the build chamber 914. The deposition region 917 of the build chamber 914 is located vertically above (i.e. in the +Z direction of the coordinate axes depicted in the figures) the curing region 918 of the build chamber 914. While axis d is described herein as delineating the deposition region 917 from the curing region 918, it should be understood that some curing of the binder material 500 may take place in the deposition region 917, such as when the binder material 500 is exposed to an energy source coupled to, for example and without limitation, the recoat head.

The deposition region 917 of the build chamber 914 may be pre-heated to a pre-heat temperature prior to deposition, and/or during deposition of the build material 400 and the binder material 500. For example, in some embodiments, the deposition region 917 of the build chamber 914 may be pre-heated to a pre-heat temperature prior to deposition of the build material 400 and the binder material 500. The deposition region 917 of the build chamber 914 may be pre-heated using any of the plurality of heating elements 920 previously described. In some embodiments, the pre-heating is achieved with the plurality of heating elements 920 positioned around the build chamber 914 and/or below the build platform 120.

As stated previously, the plurality of heating elements 920 may be arranged in heating zones wherein each heating zone is independently actuatable by the control system 200 (depicted in FIG. 20). In embodiments, individual heating elements of the plurality of heating elements 920 that are positioned vertically above axis d may be part of a different heating zone than individual heating elements of the plurality of heating elements 920 that are positioned vertically below axis d. Therefore, individual heating elements of the plurality of heating elements 920 that are positioned vertically above axis d may be actuated to pre-heat the deposition region 917 of the build chamber 914 to the pre-heat temperature, whereas individual heating elements of the plurality of heating elements 920 that are positioned vertically below axis d may not be actuated or may be actuated to a different temperature than the heating elements positioned vertically above axis d.

If the pre-heat temperatures is too low, the binder material tends to seep into and diffuse into the powder material. If the pre-heat temperature is too high, the binder material may become too dry which, in turn, weakens the part. Accordingly, in the embodiments described herein, the pre-heat temperature may be less than or equal to 100° C., less than or equal to 90° C., less than or equal to 80° C., less than or equal to 75° C., less than or equal to 70° C., less than or equal to 65° C., less than or equal to 60° C., less than or equal to 55° C., less than or equal to 50° C., less than or equal to 40° C., or even less than or equal to 30° C. In some embodiments, the pre-heat temperature may range from 25° C. to 130° C., from 30° C. to 100° C., from 40° C. to 100° C., from 50° C. to 100° C., from 55° C. to 100° C., from 60° C. to 100° C., from 65° C. to 100° C., from 70° C. to 100° C., from 75° C. to 100° C., from 80° C. to 100° C., from 90° C. to 100° C., from 30° C. to 90° C., from 40° C. to 90° C., from 50° C. to 90° C., from 55° C. to 90° C., from 60° C. to 90° C., from 65° C. to 90° C., from 70° C. to 90° C., from 75° C. to 90° C., from 80° C. to 90° C., from 30° C. to 80° C., from 40° C. to 80° C., from 50° C. to 80° C., from 55° C. to 80° C., from 60° C. to 80° C., from 65° C. to 80° C., from 70° C. to 80° C., from 75° C. to 80° C., from 30° C. to 75° C., from 40° C. to 75° C., from 50° C. to 75° C., from 55° C. to 75° C., from 60° C. to 75° C., from 65° C. to 75° C., from 70° C. to 75° C., from 30° C. to 70° C., from 40° C. to 70° C., from 50° C. to 70° C., from 55° C. to 70° C., from 60° C. to 70° C., from 65° C. to 70° C., from 30° C. to 65° C., from 40° C. to 65° C., from 50° C. to 65° C., from 55° C. to 65° C., from 60° C. to 65° C., from 30° C. to 60° C., from 40° C. to 60° C., from 50° C. to 60° C., from 55° C. to 60° C., from 30° C. to 55° C., from 40° C. to 55° C., or from 50° C. to 55° C.

The aforementioned pre-heat temperatures may be used, for example, when the binder material is a water-based binder material. Accordingly, it should be understood that, for different binder materials (such as non-water-based binder materials) different pre-heat temperatures may be used.

Figure 21B:
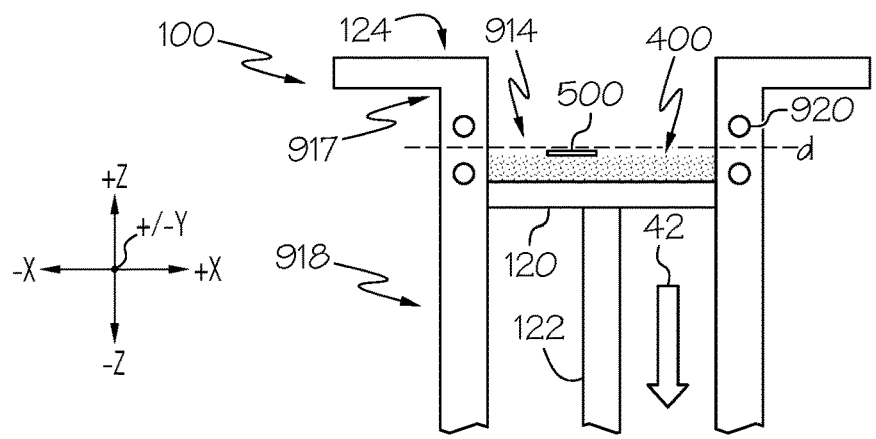
FIG. 21B schematically depicts the build receptacle of FIG. 16 in use according to one or more embodiments shown and described herein.

After distributing a layer of build material 400 on the build platform 120 positioned within the build chamber 914 and then depositing a layer of binder material 500 on the layer of build material 400 as described previously, the position of the build platform 120 may be adjusted in the downward vertical direction, as depicted in FIG. 21B. The position of the build platform 120 may be adjusted such that a portion of the build material 400 and the binder material 500 previously deposited in the build platform 120 is within the curing region 918 of the build chamber 914. Specifically, the build platform 120 may be adjusted by actuating the build platform 120 in the downward vertical direction (i.e. in the −Z direction of the coordinate axes depicted in the figures) with the build platform actuator 122 as indicated by arrow 42 to position a portion of the build material 400 and the binder material 500 within the curing region 918 of the build chamber 914.

The curing region 918 of the build chamber 914 may be heated to a curing temperature to cure the portion of build material 400 and binder material 500 within the curing region 918 of the build chamber 914. In embodiments, the curing temperature may be greater than the pre-heat temperature. The curing region 918 of the build chamber 914 may be heated using any of the plurality of heating elements 920 previously described. In some embodiments, the heating is achieved with the plurality of heating elements 920 positioned around the build chamber 914 and/or below the build platform 120.

As stated previously, in embodiments, individual heating elements of the plurality of heating elements 920 that are positioned vertically above axis d may be part of a different heating zone than individual heating elements of the plurality of heating elements 920 that are positioned vertically below axis d. Therefore, individual heating elements of the plurality of heating elements 920 that are positioned vertically below axis d may be actuated to heat the curing region 918 of the build chamber 914 to the curing temperature, whereas individual heating elements of the plurality of heating elements 920 that are positioned vertically above axis d may not be actuated, or may be actuated to pre-heat the deposition region 917 of the build chamber 914 to a pre-heat temperature.

The curing temperature (i.e., the temperature to which the curing region of the 918 of the build chamber 914 is heated) may range from 40° C. to 300° C., from 50° C. to 300° C., from 70° C. to 300° C., from 100° C. to 300° C., from 130° C. to 300° C., from 150° C. to 300° C., from 175° C. to 300° C., from 200° C. to 300° C., from 225° C. to 300° C., from 250° C. to 300° C., from 40° C. to 250° C., from 50° C. to 250° C., from 70° C. to 250° C., from 100° C. to 250° C., from 130° C. to 250° C., from 150° C. to 250° C., from 175° C. to 250° C., from 200° C. to 250° C., from 225° C. to 250° C., from 40° C. to 225° C., from 50° C. to 225° C., from 70° C. to 225° C., from 100° C. to 225° C., from 130° C. to 225° C., from 150° C. to 225° C., from 175° C. to 225° C., from 200° C. to 225° C., from 40° C. to 200° C., from 50° C. to 200° C., from 70° C. to 200° C., from 100° C. to 200° C., from 130° C. to 200° C., from 150° C. to 200° C., from 175° C. to 200° C., from 40° C. to 175° C., from 50° C. to 175° C., from 70° C. to 175° C., from 100° C. to 175° C., from 130° C. to 175° C., from 150° C. to 175° C., from 40° C. to 150° C., from 50° C. to 150° C., from 70° C. to 150° C., from 100° C. to 150° C., from 130° C. to 150° C., from 40° C. to 130° C., from 50° C. to 130° C., from 70° C. to 130° C., from 100° C. to 130° C., from 40° C. to 100° C., from 50° C. to 100° C., or from 70° C. to 100° C.

Referring to FIGS. 18 and 21A-21C, as previously discussed, the heating elements 920 may be arranged into independently actuatable heating zones 926. In embodiments, the heating zones 926 may be arranged to form a temperature gradient within the build chamber 914, where the top 978 of the build chamber 914 is heated to the pre-heat temperature and the bottom 970 of the build chamber 914 is heated to the curing temperature. In embodiments, the heating zones 926 may be arranged to form a temperature gradient within the build chamber 914, where the build chamber 914 above axis d is heated to the pre-heat temperature and the build chamber 914 below axis d is heated to the curing temperature. For example, and not by way of limitation, the heating elements 920 positioned above axis d may form a distinct heating zone, and may not be heated to greater than the pre-heat temperature. Additionally or alternatively, the heating elements 920 positioned below axis d may form a distinct heating zone, and may be heated to greater than the pre-heat temperature. In embodiments, the heating elements 920 below axis d may be heated to the curing temperature to facilitate curing of the binder material 500. In embodiments, the heating elements 920 positioned below axis d may be operated to create an increasing temperature gradient from axis d to the bottom 970 of the build chamber 914.

Figure 21C:
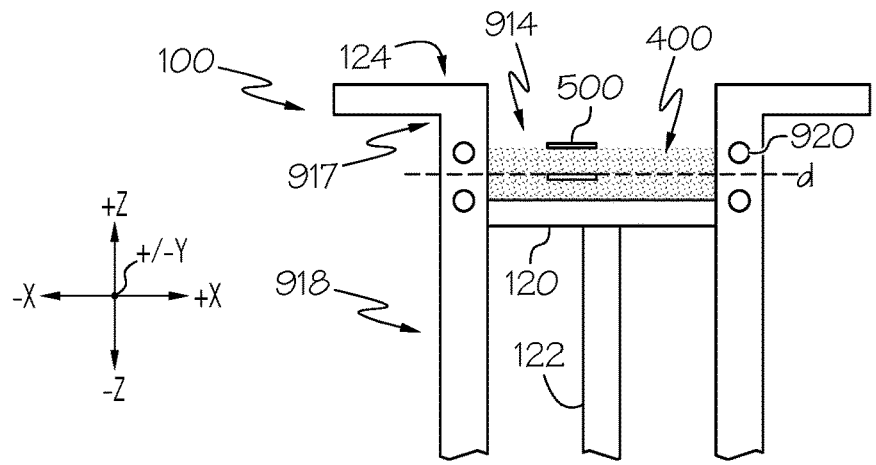
FIG. 21C schematically depicts the build receptacle of FIG. 16 in use according to one or more embodiments shown and described herein.

Referring now to FIG. 21C, the build cycle may begin again with a new layer of build material 400 and a new layer of binder material 500 distributed within the deposition region 917 on the build platform 120 and above the curing region.

In embodiments, the temperature of the curing region 918 may be detected during the thermal curing process. The control system, as previously described, may detect the temperature of the curing region 918 of the build chamber 914 through the use of temperature sensors. In some embodiments, the curing temperature of the curing region 918 of the build chamber 914 may be adjusted based on the detected temperature of the curing region 918. Without being bound by theory, the curing temperature of the curing region 918 of the build chamber 914 may be adjusted depending on the thermal conductivity of the build platform 120, the thermal conductivity of the sidewall 912 of the housing 910, and/or the thermal conductivity of the heating platen 810.

Further, in some embodiments, the temperature within the curing region 918 may be adjusted as a build operation progresses. For example, the temperature gradient between the axis d and the bottom 970 of the build chamber 914 may be reduced as the build operation progresses such that the temperature within the build chamber 914 is the same at the bottom 970 of the build chamber 970 as at the axis d.

As noted herein, the build receptacle 124A and methods for using the build receptacle 124A may be used in conjunction with one or more of the embodiments of the additive manufacturing apparatuses described herein, including the method of operating an additive manufacturing apparatus as described herein with respect to FIGS. 7A-7D.

The foregoing description includes various embodiments of components of additive manufacturing apparatuses and methods for using the same. It should be understood that various combinations of these components may be included in additive manufacturing apparatuses and arranged in (or coupled to) a support chassis.

Figure 25:
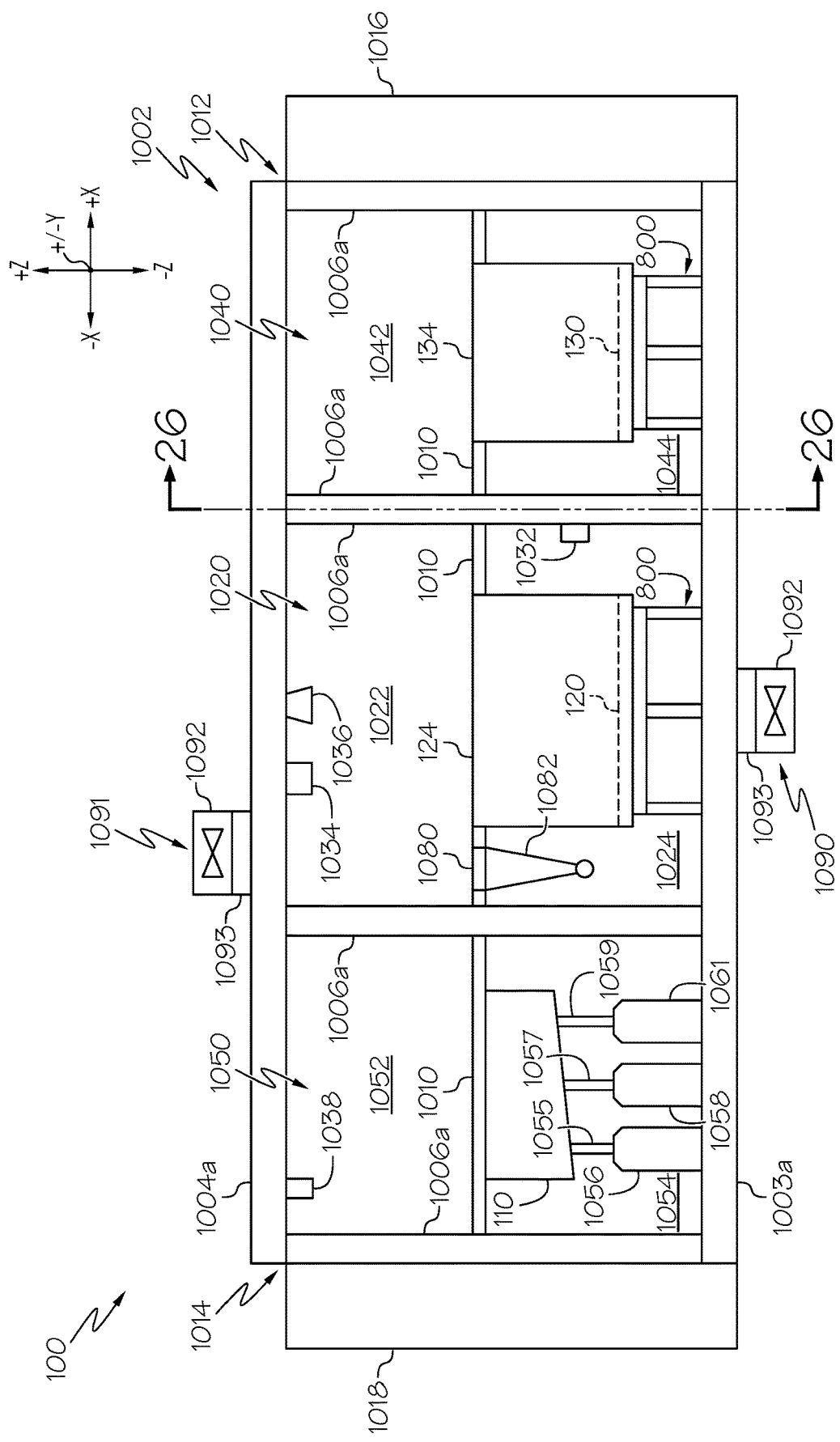
FIG. 25 schematically depicts an additive manufacturing apparatus comprising a support chassis according to one or more embodiments shown and described herein.
Figure 26:
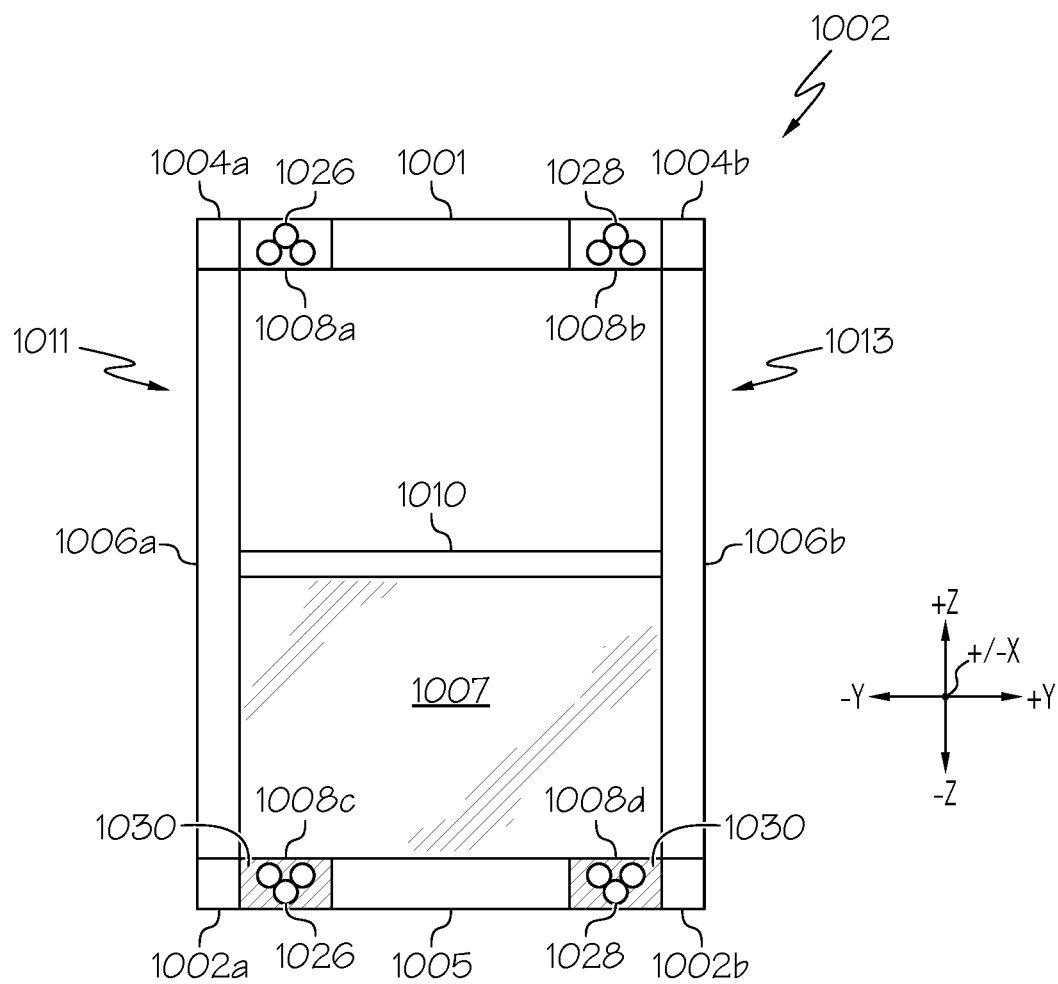
FIG. 26 schematically depicts a vertical cross section of the additive manufacturing apparatus of FIG. 25 according to one or more embodiments shown and described herein.

Referring to FIGS. 25 and 26 by way of example, the additive manufacturing apparatus 100 comprising a support chassis 1002 is schematically depicted. While specific reference is made herein to the support chassis as being a component of the additive manufacturing apparatus 100, it should be understood that the support chassis 1002 may be used in conjunction with any embodiment of an additive manufacturing apparatus described herein. The support chassis 1002 generally comprises a pair of lower horizontal support members 1003a, 1003b, a pair of upper horizontal support members 1004a, 1004b and a plurality of pairs of vertical support members 1006a, 1006b (one pair depicted in FIG. 26). Lower horizontal support member 1003a is spaced apart from lower horizontal support member 1003b in the lateral direction in a horizontal plane (i.e., the lower horizontal support member 1003a is spaced apart from lower horizontal support member 1003b in the +/−Y direction in a plane parallel to the Y-Z plane of the coordinate axes depicted in the figures). Similarly, upper horizontal support member 1004a is spaced apart from upper horizontal support member 1004b in the lateral direction in a horizontal plane (i.e., the upper horizontal support member 1004a is spaced apart from upper horizontal support member 1004b in the +/−Y direction in a plane parallel to the Y-Z plane of the coordinate axes depicted in the figures). The pair of upper horizontal support members 1004a, 1004b are spaced apart from the pair of lower horizontal support members 1003a, 1003b in the vertical direction (i.e., the +/−Z direction of the coordinate axes depicted in the figures). A top panel 1001 (FIG. 26) extends between the pair of upper horizontal support members 1004a, 1004b. Similarly, a floor panel 1005 (FIG. 26) extends between the pair of lower horizontal support members 1003a, 1003b.

Pairs of vertical support members 1006a, 1006b extend between and are coupled to the pair of lower horizontal support members 1003a, 1003b and the pair of upper horizontal support members 1004a, 1004b, as depicted in FIGS. 25 and 26. The pairs of vertical support members 1006a, 1006b segment the volume enclosed by the support chassis 1002 into a plurality of bays, specifically a build bay 1020, a material supply bay 1040 (also referred to as recoat bay 1040), and a print bay 1050. In the embodiments described herein, the build bay 1020 is positioned between the material supply bay 1040 and the print bay 1050 along the working axis 116 (FIG. 2) of the additive manufacturing apparatus 100. Each of the build bay 1020, the material supply bay 1040, and the print bay 1050 will be described in further detail herein.

Still referring to FIGS. 25 and 26, the support chassis 1002 further comprises a working surface 1010 supported by the pairs of vertical support members 1006a, 1006b within the volume defined by the support chassis 1002. The working surface 1010 is generally horizontal (i.e., parallel to the X-Y plane of the coordinate axes depicted in the figures) and extends through each of the build bay 1020, the material supply bay 1040, and the print bay 1050. The working surface 1010 segments each of the build bay 1020, the material supply bay 1040, and the print bay 1050 into upper compartments 1022, 1042, 1052 and lower compartments 1024, 1044, 1054. In the embodiments described herein, the actuator assembly (not depicted in FIGS. 25 and 26) is positioned over the working surface 1010 and extends from the upper compartment 1052 of the print bay 1050, through the upper compartment 1022 of the build bay 1020, and into the upper compartment 1042 of the material supply bay 1040 such that the print head and recoat head associated with the actuator assembly are able to traverse over portions of the working surface 1010 of the additive manufacturing apparatus 100 along the working axis 116 (FIG. 2).

In the embodiments described herein, the pair of vertical support members 1006a, 1006b positioned between the print bay 1050 and the build bay 1020 and the pair of vertical support members 1006a, 1006b positioned between the print bay 1050 and the build bay 1020 each comprise a bulkhead 1007. Referring to FIG. 26 by way of example, a cross section of the additive manufacturing apparatus 100 through the line 26-26 of FIG. 25 is schematically depicted. As depicted in FIG. 26, the bulkhead 1007 extends from the working surface 1010 to the floor panel 1005 in the vertical direction (i.e., the +/−Z directions of the coordinate axes depicted in the figures) and from the vertical support member 1006a to the vertical support member 1006b in the lateral direction (i.e., the +/−Y directions of the coordinate axes depicted in the figures). The bulkhead 1007 is sealed to the working surface 1010, the floor panel 1005, and the vertical support members 1006a, 1006b such as with adhesives, mechanical seals, welds, or combinations thereof. Another bulkhead is similarly arranged between the vertical support members 1006a, 1006b separating the build bay 1020 and the print bay 1050. The bulkheads 1007, in conjunction with the working surface 1010, the floor panel 1005, and the build receptacle 124 (when installed in the build bay 1020) isolate the lower compartment 1024 of the build bay 1020 from the adjacent compartments of the additive manufacturing apparatus 100 which, in turn, assists in containment of loose build material disposed in the build receptacle 124.

Referring now to FIG. 25, in embodiments, the support chassis 1002 of the additive manufacturing apparatus 100 may further comprise a high voltage supply cabinet 1016 and a low voltage supply cabinet 1018. In embodiments, the high voltage supply cabinet 1016 is positioned on a first end 1012 of the support chassis 1002 and the low voltage supply cabinet 1018 is positioned on a second end 1014 of the support chassis 1002 opposite the first end 1012. The high voltage supply cabinet 1016 houses power supplies and associated electronics operating at voltages of 120 volts or greater, such as power supplies and associated electronics powering the motors, heaters, fans, etc. of the additive manufacturing apparatus 100. The low voltage supply cabinet 1018 houses power supplies and associated electronics operating at voltages of less than 120 volts, such as power supplies and associated electronics powering the control system, pumps, sensors, etc. of the additive manufacturing apparatus 100. Separating the high voltage supply cabinet 1016 from the low voltage supply cabinet 1018 avoids electro-magnetic interference with (and potential damage to) sensitive electronic components (such as control units, sensors, pumps, etc.) that operate at lower voltages due to the magnetic fields generated by power supplies and associated electronics operating with high voltage.

Referring again to FIGS. 25 and 26, in embodiments, the high voltage supply lines coupled into the high voltage supply cabinet 1016 and the low voltage supply lines coupled into the low voltage supply cabinet 1018 may also be physically separated to avoid electromagnetic interference. For example, in embodiments, the support chassis 1002 may further comprise cable trays 1008a, 1008b, 1008c, 1008d that extend along the length (or at least a portion of the length) of the support chassis 1002 in the +/−X direction of the coordinate axes depicted in the figures. For example, the support chassis 1002 may comprise a front 1011 and a back 1013. Cable trays 1008a, 1008c may be positioned proximate a front 1011 of the support chassis 1002 (i.e., distal from the back 1013 of the support chassis 1002) and cable trays 1008b, 1008d may be positioned proximate a back 1013 of the support chassis 1002. In embodiments, the cable trays 1008a, 1008b, 1008c, 1008d may be located proximate a top of the support chassis 1002 (i.e., proximate the top panel 1001 and distal from the floor panel 1005) and/or proximate a bottom of the support chassis 1002 (i.e., proximate the floor panel 1005 and distal from the top panel 1001). For example, in the embodiment depicted in FIG. 26, the cable trays 1008a, 1008b are positioned proximate the top of the support chassis 1002 while the cable trays 1008c, 1008d are positioned proximate the bottom of the support chassis 1002.

In embodiments, the low voltage supply lines 1026 are directed through cable trays 1008a, 1008c at the front 1011 of the support chassis 1002 and the high voltage supply lines 1028 are directed through cable trays 1008b, 1008d at the back 1013 of the support chassis 1002, as depicted in FIG. 26. In an alternative embodiment (not depicted), the low voltage supply lines 1026 may be directed through cable trays 1008b, 1008d at the back 1013 of the support chassis 1002 and the high voltage supply lines 1028 may be directed through cable trays 1008a, 1008c at the front 1011 of the support chassis 1002. As another alternative, the low voltage supply lines 1026 may be directed through cable trays 1008c, 1008d at the bottom of the support chassis 1002 and the high voltage supply lines 1028 may be directed through cable trays 1008a, 1008b at the top of the support chassis 1002. In yet another alternative, the high voltage supply lines 1028 may be directed through cable trays 1008c, 1008d at the bottom of the support chassis 1002 and the low voltage supply lines 1026 may be directed through cable trays 1008a, 1008b at the top of the support chassis 1002. Physically separating the high voltage supply lines 1028 from the low voltage supply lines 1026, as described herein avoids electromagnetic interference between the supply lines and the potential damage to sensitive electronic components.

In embodiments, the cable trays 1008c, 1008d extend through the lower compartments 1024, 1044, 1054 of the build bay 1020, material supply bay 1040, and print bay 1050, respectively. In these embodiments, the cable trays 1008c, 1008d may pass through the bulkhead 1007 between the build bay 1020 and the material supply bay 1040 and through the bulkhead 1007 between the build bay 1020 and the print bay 1050. To facilitate sealing the portions of the cable trays 1008c, 1008d that pass through the bulkheads 1007, the cable trays 1008c, 1008d may further comprise sealing glands 1030 which form a seal between the cable trays 1008c, 1008d, the bulkheads 1007 and any lines (or other conduits) passing through the bulkheads 1007 in the cable trays 1008c, 1008d.

Still referring to FIGS. 25 and 26, in addition to the low voltage supply lines 1026 and the high voltage supply lines 1028, the cable trays 1008a, 1008b, 1008c, 1008d may also comprise other lines or conduits. For example, in addition to the low voltage supply lines 1026 and the high voltage supply lines 1028, the cable trays 1008a, 1008b, 1008c, 1008d may also include air lines for supplying air to various components of the additive manufacturing apparatus 100, vacuum lines for supplying vacuum to various components of the additive manufacturing apparatus 100, and/or liquid lines for supplying liquid (e.g., binder, cleaning solution, and the like) to various components of the additive manufacturing apparatus 100.

Referring again to FIG. 25, in the embodiments described herein, the print bay 1050 comprises a cleaning station 110 positioned in the working surface 1010 within the print bay 1050. The cleaning station 110 may be used, for example, to clean the print head (not depicted) of the additive manufacturing apparatus 100, as described herein. In embodiments, the lower compartment 1054 of the print bay 1050 may comprise a cleaning solution supply tank 1056 fluidly coupled to the cleaning station 110 to supply fresh cleaning fluid to the cleaning station 110. The cleaning solution supply tank 1056 may be fluidly coupled to the cleaning station 110 with supply line 1055. In embodiments, the lower compartment 1054 of the print bay 1050 may further comprise a cleaning solution recovery tank 1058 fluidly coupled to the cleaning station 110 to collect used cleaning fluid from the cleaning station 110. The cleaning solution recovery tank 1058 may be fluidly coupled to the cleaning station 110 with supply line 1057. In embodiments, the lower compartment 1054 of the print bay 1050 may further comprise a binder supply tank 1061 fluidly coupled to the print head (not depicted) to the print head. The binder supply tank 1061 may be fluidly coupled to the print head with supply line 1059.

In embodiments, the lower compartment 1024 of the build bay 1020 comprises a build receptacle 124. In these embodiments, the working surface 1010 of the support chassis 1002 comprises an opening for receiving the build receptacle 124 such that the build receptacle 124 is removably positioned in the working surface 1010 and the lower compartment 1024 of the build bay 1020. This allows for the build receptacle 124 (and the contents thereof) to be removed from the additive manufacturing apparatus 100 after a build operation is completed and an empty build receptacle 124 to be installed in the working surface 1010 and lower compartment 1024 of the build bay 1020. The lower compartment of the build bay 1020 may further comprise a lift system 800 for raising and lowering the build platform 120 of the build receptacle 124, as described herein.

In embodiments, the lower compartment 1024 of the build bay 1020 may further comprise a build bay temperature sensor 1032 for detecting the temperature of the lower compartment of the build bay 1020. The build bay temperature sensor 1032 may be, for example, and without limitation, a thermocouple or similar temperature sensor. The build bay temperature sensor 1032 may be coupled to the control system 200 and provides the control system 200 with a signal indicative of the temperature of the lower compartment 1024 of the build bay 1020. The control system 200 may use this signal to monitor the temperature the lower compartment 1024 of the build bay 1020 and provide a warning signal if an over-temperature (e.g., an overheating condition) condition is present. In embodiments, the control system 200 may take remedial actions to correct the over-temperature condition, such as by increasing the airflow through the lower compartment 1024 of the build bay 1020 to reduce the temperature.

In embodiments, the build bay 1020 may further comprise a build temperature sensor 1034 located in the upper compartment 1022 of the build bay 1020. The build temperature sensor 1034 is oriented to detect the temperature of the build material located on the build platform 120. The build temperature sensor 1034 may be, for example, and without limitation, an infrared temperatures sensor, such as an infrared camera, a pyrometer, or a similar temperature sensor. The build temperature sensor 1034 may be coupled to the control system 200 (as described in further detail herein) and provides the control system 200 with a signal indicative of the temperature of the build material (and binder material) located on the build platform 120. The control system 200 may use this signal to monitor the temperature of the build material and adjust the heating of the build material (and binder material) in the build receptacle 124 with the energy sources of the recoat head 140 and/or the heating elements 920 of the build receptacle 124, as described herein.

In embodiments, the build bay 1020 may further comprise a camera system 1036 located in the upper compartment 1022 of the build bay 1020. The camera system 1036 is oriented to collect an image of the build material located on the build platform 120. The camera system 1036 may be coupled to the control system 200 (as described in further detail herein) and provides the control system 200 with a signal indicative of the image of the surface of the build material (and binder material) located on the build platform 120. The control system 200 may use this signal to monitor the deposition of the build material on the build platform 120 and adjust the operation of the build platform 120 of the build receptacle 124, the operation of the supply platform 130 of the supply receptacle 134 and/or the operation of the recoat head 140 to obtain a layer of build material with the desired characteristics (e.g., surface uniformity, thickness, or the like). Alternatively or additionally, the control system 200 may use this signal to monitor the deposition of the binder material on the build platform 120 and adjust the operation of the print head to achieve deposition of the binder material with the desired characteristics (e.g., surface uniformity, pattern uniformity, pattern consistency, or the like).

In addition to the foregoing, in embodiments, at least one of the build bay 1020, the material supply bay 1040, and the print bay 1050 may further comprise an environmental sensor 1038 for detecting an air temperature or a humidity within the support chassis 1002. The environmental sensor 1038 may comprise, for example, and without limitation, a hygrometer and/or a temperature sensor. The environmental sensor 1038 may be coupled to the control system 200 (as described in further detail herein) and provides the control system 200 with a signal indicative of the temperature and or humidity within the support chassis 1002. The control system 200 may use this signal to monitor the temperature and/or humidity within the support chassis 1002 and provide a warning signal if either the temperature and/or humidity within the support chassis 1002 is outside of a predetermined range. In embodiments, the control system 200 may take remedial actions to correct the temperature and/or humidity, such as by adjusting the airflow through the support chassis 1002.

In some embodiments, the lower compartment 1044 of the material supply bay 1040 comprises a supply receptacle 134. In these embodiments, the working surface 1010 of the support chassis 1002 comprises an opening for receiving the supply receptacle 134 such that the supply receptacle 134 is removably positioned in the working surface 1010 and the lower compartment 1044 of the material supply bay 1040. In embodiments, this may allow for an empty supply receptacle 134 to be extracted from the additive manufacturing apparatus 100 after a build operation is completed and full build receptacle 124 to be installed in the working surface 1010 and lower compartment 1044 of the material supply bay 1040. The lower compartment 1044 of the build bay 1020 may further comprise a lift system 800 for raising and lowering the supply platform 130 of the supply receptacle 134, as described herein.

While FIG. 25 depicts the material supply bay 1040 as comprising a supply receptacle 134 and a lift system 800, it should be understood that the supply receptacle 134 and the lift system 800 are optional and may be omitted in some embodiments, such as embodiments where the additive manufacturing apparatus 100 comprises a hopper for distributing the build material rather than supply receptacle.

Figure 27:
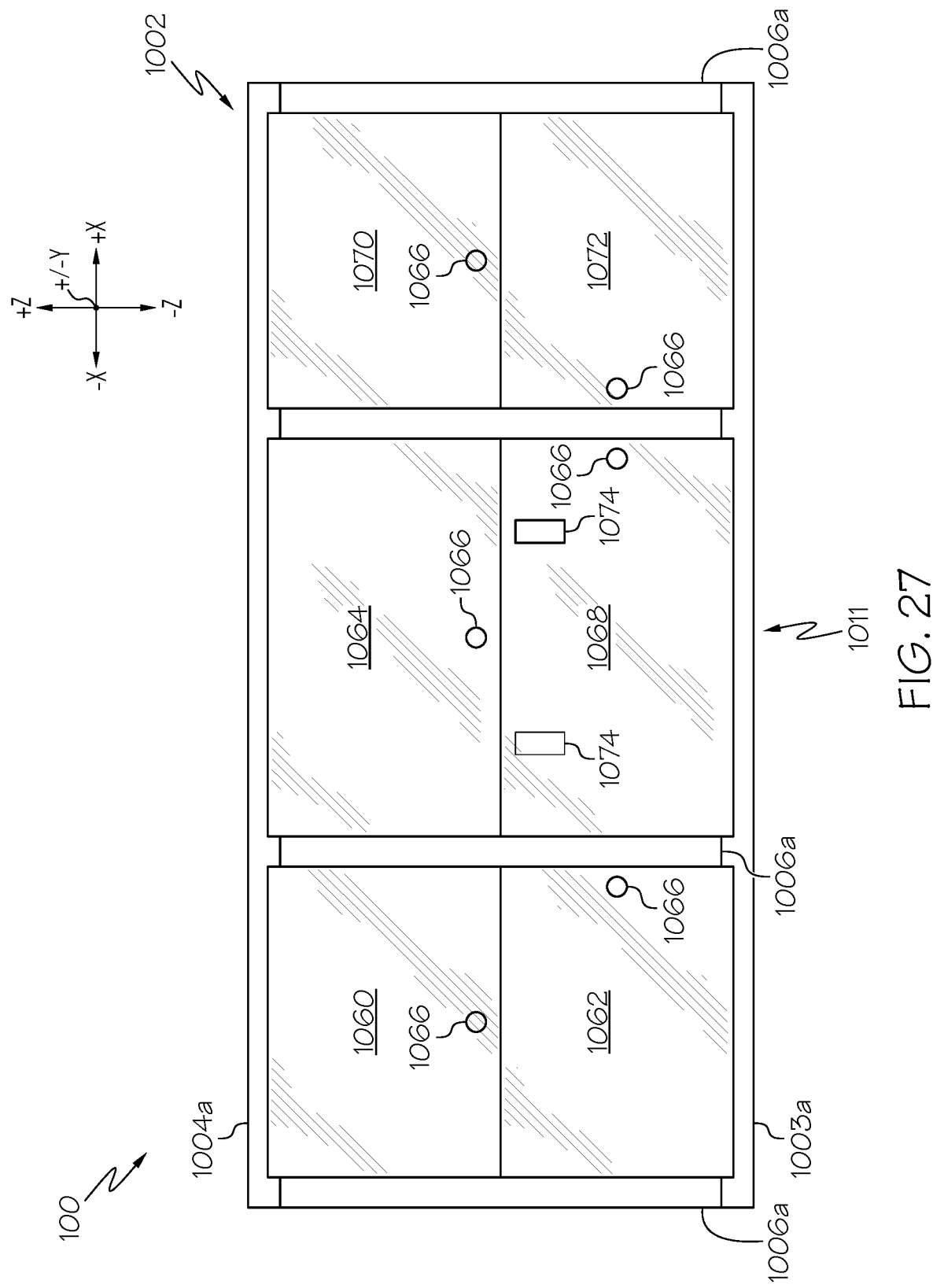
FIG. 27 schematically depicts the additive manufacturing apparatus of FIG. 25 further comprising access panels coupled to the support chassis according to one or more embodiments shown and described herein.

Referring now to FIGS. 25 and 27, the additive manufacturing apparatus 100 may further comprise at least one access panel coupled to the lower compartment 1024, 1044, 1054 of each of the build bay 1020, the material supply bay 1040, and the print bay 1050 and at least one access panel coupled to the upper compartment 1022, 1042, 1052 of each of the build bay 1020, the material supply bay 1040, and the print bay 1050.

For example, the upper compartment 1022 of the build bay 1020 comprises an upper access panel 1064 hingedly coupled to the upper horizontal support member 1004a at the front 1011 of the additive manufacturing apparatus 100. The upper access panel 1064 may comprise a latch 1066 for latching the upper access panel 1064 to the working surface 1010 or a vertical support member 1006a. In embodiments, seals (not depicted) may be disposed between the upper access panel 1064 and the upper horizontal support member 1004a, the vertical support members 1006a, and the working surface 1010 to facilitate sealing the upper access panel 1064 to the support chassis 1002 when the upper access panel 1064 is in a closed position.

Further, the lower compartment 1024 of the build bay 1020 comprises a lower access panel 1068 hingedly coupled to the vertical support member 1006a at the front 1011 of the additive manufacturing apparatus 100, between the build bay 1020 and the material supply bay 1040 or between the build bay 1020 and the print bay 1050. The lower access panel 1068 may comprise a latch 1066 for latching the lower access panel 1068 to the working surface 1010 or a vertical support member 1006a. In embodiments, seals (not depicted) may be disposed between the lower access panel 1068 and the lower horizontal support member 1003a, the vertical support members 1006a, and the working surface 1010 to facilitate sealing the lower access panel 1068 to the support chassis 1002 when the lower access panel 1068 is in a closed position. In embodiments, the lower compartment 1024 of the build bay 1020 may comprise air inlets 1074 proximate the top of the compartment (i.e., proximate to but below the working surface 1010). In embodiments, the air inlets 1074 extend through the lower access panel 1068 of the build bay 1020.

Still referring to FIGS. 25 and 27, the upper compartment 1042 of the material supply bay 1040 comprises an upper access panel 1070 hingedly coupled to the upper horizontal support member 1004a at the front 1011 of the additive manufacturing apparatus 100. The upper access panel 1070 may comprise a latch 1066 for latching the upper access panel 1070 to the working surface 1010 or a vertical support member 1006a. In embodiments, seals (not depicted) may be disposed between the upper access panel 1070 and the upper horizontal support member 1004a, the vertical support members 1006a, and the working surface 1010 to facilitate sealing the upper access panel 1070 to the support chassis 1002 when the upper access panel 1070 is in a closed position.

Further, the lower compartment 1044 of the material supply bay 1040 comprises a lower access panel 1072 hingedly coupled to the vertical support member 1006a at the first end 1012 of the support chassis 1002 at the front 1011 of the additive manufacturing apparatus 100. The lower access panel 1072 may comprise a latch 1066 for latching the lower access panel 1072 to the working surface 1010 or a vertical support member 1006a. In embodiments, seals (not depicted) may be disposed between the lower access panel 1072 and the lower horizontal support member 1003a, the vertical support members 1006a, and the working surface 1010 to facilitate sealing the lower access panel 1072 to the support chassis 1002 when the lower access panel 1072 is in a closed position.

The upper compartment 1052 of the print bay 1050 comprises an upper access panel 1060 hingedly coupled to the upper horizontal support member 1004a at the front 1011 of the additive manufacturing apparatus 100. The upper access panel 1060 may comprise a latch 1066 for latching the upper access panel 1060 to the working surface 1010 or a vertical support member 1006a. In embodiments, seals (not depicted) may be disposed between the upper access panel 1060 and the upper horizontal support member 1004a, the vertical support members 1006a, and the working surface 1010 to facilitate sealing the upper access panel 1060 to the support chassis 1002 when the upper access panel 1060 is in a closed position.

Further, the lower compartment 1054 of the print bay 1050 comprises a lower access panel 1062 hingedly coupled to the vertical support member 1006a at the second end 1014 of the support chassis 1002 at the front 1011 of the additive manufacturing apparatus 100. The lower access panel 1062 may comprise a latch 1066 for latching the lower access panel 1062 to the working surface 1010 or a vertical support member 1006a. In embodiments, seals (not depicted) may be disposed between the lower access panel 1062 and the lower horizontal support member 1003a, the vertical support members 1006a, and the working surface 1010 to facilitate sealing the lower access panel 1062 to the support chassis 1002 when the lower access panel 1062 is in a closed position.

While FIG. 27 schematically depicts the upper and lower access panels disposed on the front 1011 of the additive manufacturing apparatus 100, it should be understood that the back 1013 of the additive manufacturing apparatus 100 may include similar access panels.

In the embodiment depicted in FIG. 27 the upper access panels 1060, 1064, 1070 may be constructed of a transparent material, such as plastic or glass, to allow the build process of the additive manufacturing apparatus 100 to be visually monitored. Optionally, the lower access panels 1062, 1069, 1072 may be constructed of a transparent material, such as plastic or glass.

Still referring to FIGS. 25 and 27, in embodiments, the additive manufacturing apparatus further comprises a lower exhaust system 1090 coupled to the lower compartment 1024 of the build bay 1020 proximate to the bottom of the lower compartment 1024. In the embodiment depicted in FIG. 25, the lower exhaust system 1090 is coupled to the floor panel of the build bay 1020. However, it should be understood the lower exhaust system 1090 may be coupled to, for example, the lower access panel 1068 of the build bay 1020. The lower exhaust system 1090 generally comprises an exhaust fan 1092 and, optionally, a filter 1093, such as a HEPA filter. The exhaust fan 1092 is communicatively coupled to the control system 200 that controls the speed of the fan and, therefore, the amount of air drawn through the fan per unit of time. The control system 200 may also control the direction of rotation of the fan so that air can either be drawn into the lower compartment 1024 of the build bay 1020 or expelled from the lower compartment 1024 of the build bay 1020.

In embodiments, the lower exhaust system 1090 is operated to draw air out of the build bay 1020, such as out of the lower compartment 1024 of the build bay 1020. In these embodiments, fresh air is drawn into the lower compartment 1024 through the air inlets 1074 and is exhausted from the lower compartment 1024 through the lower exhaust system 1090. The exhausted air passes through filter 1093 to remove particulates, such as particulates of build material, from the air. The air circulating through the lower compartment 1024 assists in preventing the buildup of heat in the lower compartment 1024 around the build receptacle 124. In addition, exhausting air through the lower exhaust system 1090 may aid in reducing particulates of build material in the air in the lower compartment 1024, thereby reducing the potential of fouling the components of the additive manufacturing apparatus 100. As noted hereinabove, the control system 200 may utilize the build bay temperature sensor 1032 to determine the temperature of the lower compartment 1024 and, based on the temperature, operate the exhaust fan 1092 of the lower exhaust system 1090 to maintain the temperature of the lower compartment 1024 within a predetermined range.

In embodiments, the additive manufacturing apparatus further comprises an upper exhaust system 1091 coupled to the top panel 1001 of the support chassis 1002. The upper exhaust system 1091 generally comprises an exhaust fan 1092 and, optionally, a filter 1093, such as a HEPA filter. The exhaust fan 1092 is communicatively coupled to the control system 200 that controls the speed of rotation of the fan and, therefore, the amount of air drawn through the fan per unit of time. The control system 200 may also control the direction of rotation of the fan so that air can either be drawn into the support chassis 1002 or expelled from the support chassis 1002.

In embodiments, the upper exhaust system 1091 is operated to draw air out of the volume enclosed by the support chassis 1002. The exhausted air passes through filter 1093 to remove particulates, such as particulates of build material, from the air. Exhausting air through the upper exhaust system 1091 may aid in regulating the temperature and/or humidity around the build platform 120. In addition, exhausting air through the upper exhaust system 1091 may aid in reducing particulates of build material in the air within the volume of the support chassis 1002, thereby reducing the potential of fouling the components of the additive manufacturing apparatus 100. As noted hereinabove, the control system 200 may utilize the environmental sensor 1038 to determine the temperature and/or humidity within the support chassis 1002 and, based on the temperature and/or humidity, operate the exhaust fan 1092 of the upper exhaust system 1091 to maintain the temperature and/or humidity within a predetermined range.

Referring now to FIGS. 25 and 28, the additive manufacturing apparatus 100 may further comprise a powder recovery slot 1080 extending through the working surface 1010 in one of the build bay 1020 or the material supply bay 1040. In the embodiment depicted in FIGS. 25 and 28, the powder recovery slot 1080 is in the build bay 1020. The powder recovery slot 1080 may be positioned in the working surface 1010 between the build receptacle 124 and the cleaning station 110 such that excess build material from the build receptacle 124 is pushed into the powder recovery slot 1080 when build material is distributed onto the build platform 120 with the recoat head (not depicted). In embodiments, the powder recovery slot 1080 is coupled to a recovery funnel 1082 positioned below the working surface 1010. The recovery funnel 1082 may have a cone angle θ of less than or equal to 60 degrees with respect to vertical to ensure that particulate matter, such as build material, flows through the recovery funnel 1082 without sticking to the sidewalls of the recovery funnel 1082.

In embodiments, the recovery funnel 1082 is fluidly coupled to a vacuum system 1102. The vacuum system 1102 applies a negative pressure to the recovery funnel 1082 and the powder recovery slot 1080 that, in turn, aids in drawing build material through the powder recovery slot 1080 and the recovery funnel 1082. The vacuum system 1102 is coupled to a sieve system 1110 such that the vacuum system 1102 directs the recovered build material into the sieve system 1110. The sieve system 1110 screens the recovered build material, removing agglomerated build material, agglomerated binder material, or the like, such that the recovered build material can be reused in the additive manufacturing apparatus 100.

Still referring to FIG. 28, in embodiments, the recoat head 140 of the actuator assembly 102 comprises a containment housing 1112 for collecting lofted build material during a recoat operation. The containment housing 1112 is fluidly coupled to the vacuum system 1102. The vacuum system 1102 applies a negative pressure to the containment housing 1112 such that build material is drawn into the containment housing 1112. The vacuum system 1102 is coupled to a sieve system 1110 such that the vacuum system 1102 directs the recovered build material from the containment housing 1112 into the sieve system 1110. The sieve system 1110 screens the recovered build material, removing agglomerated build material, agglomerated binder material, or the like, such that the recovered build material can be reused in the additive manufacturing apparatus 100.

The sieve system 1110 may also be coupled to a de-powdering station 1150. As described herein, the de-powdering station 1150 comprises a lift system 800 to facilitate raising a build platform 120 of a build receptacle 124 during a de-powdering operation. In embodiments, the de-powdering station 1150 may also have electrical connections for power the heating elements of the build receptacle such as when the build receptacle is as described herein with respect to FIGS. 16-18. The de-powdering station in fluidly coupled to a vacuum system 1111. Loose build material from the build receptacle 124 may be drawn out of the build receptacle 124 with vacuum system 1111. The vacuum system 1111 is coupled to a sieve system 1110 such that the vacuum system 1111 directs the recovered build material from the de-powdering station 1150 into the sieve system 1110. The sieve system 1110 screens the recovered build material, removing agglomerated build material, agglomerated binder material, or the like, such that the recovered build material can be reused in the additive manufacturing apparatus 100.

Still referring to FIG. 28, in embodiments, the print head 150 of the actuator assembly 102 is coupled to an air pump 1115. Specifically, the print head 150 comprises a housing 151 and the air pump 1115 is fluidly coupled to the housing 151 and provides an overpressure to the housing 151. The overpressure in the housing 151 prevents the intrusion of entry of build material into the print head 150, thereby reducing the potential of fouling the components of the print head 150.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

The invention claimed is:

1. An additive manufacturing apparatus comprising:
   a support chassis comprising:
      a print bay, a build bay, and a material supply bay, each bay comprising an upper compartment and a lower compartment;
      a pair of lower horizontal support members;
      a pair of upper horizontal support members; and
      a plurality of pairs of vertical support members extending between the pair of lower horizontal support members and the pair of upper horizontal support members, the plurality of pairs of vertical support members provided between the print bay, the build bay, and the material supply bay;
   a working surface separating each of the print bay, the build bay, and the material supply bay into the upper compartment and the lower compartment, the lower compartment of the build bay isolated from the lower compartment of the print bay and the lower compartment of the material supply bay by a pair of bulkheads extending between a respective pair of the plurality of pairs of vertical support members; and
   an actuator assembly comprising a recoat head, the recoat head comprising a containment housing, wherein:
      a powder recovery slot extends through the working surface in one of the build bay or the material supply bay;
      a recovery funnel is coupled to the powder recovery slot; and
      a vacuum system is coupled to the recovery funnel and the containment housing, the vacuum system applying a negative pressure to the recovery funnel, the powder recovery slot, and the containment housing.

2. The additive manufacturing apparatus of claim 1, wherein:
   the print bay comprises a cleaning station;
   a cleaning solution supply tank is positioned in the lower compartment of the print bay and fluidly coupled to the cleaning station; and
   a binder supply tank positioned in the lower compartment of the print bay, wherein the binder supply tank is fluidly coupled to a print head of the additive manufacturing apparatus.

3. The additive manufacturing apparatus of claim 1, further comprising an environmental sensor positioned within the build bay, the material supply bay, or the print bay, the environmental sensor configured to detect at least one of an air temperature within the support chassis and humidity within the support chassis.

4. The additive manufacturing apparatus of claim 1, wherein:
   the working surface in the material supply bay comprises an opening for receiving a supply receptacle; and
   a lift system is positioned in the lower compartment of the material supply bay, the lift system for raising and lowering a supply platform of the supply receptacle when the supply receptacle is positioned in the opening of the working surface of the material supply bay.

5. The additive manufacturing apparatus of claim 1, wherein a sidewall of the powder recovery slot comprises a cone angle of less than or equal to 60 degrees with respect to a vertical axis.

6. The additive manufacturing apparatus of claim 1, further comprising a sieve system, wherein the vacuum system couples the powder recovery slot, the recovery funnel, and the containment housing to the sieve system.

7. The additive manufacturing apparatus of claim 1, further comprising:
   an actuator assembly comprising a print head, the print head comprising a print head housing; and
   an air pump coupled to the print head housing, the air pump providing an overpressure to the print head housing.

8. The additive manufacturing apparatus of claim 1, further comprising:
   a high voltage electrical supply cabinet; and
   a low voltage electrical supply cabinet, wherein the high voltage electrical supply cabinet is located at a first end of the support chassis and the low voltage electrical supply cabinet is located at a second end of the support chassis opposite the first end.

9. The additive manufacturing apparatus of claim 8, wherein:
   the support chassis comprises a front and back;
   low voltage supply lines are directed through cable trays at the front or the back of the support chassis; and
   high voltage supply lines are directed through cable trays at the other of the front and back of the support chassis.

10. The additive manufacturing apparatus of claim 9, wherein the cable trays, low voltage supply lines, and high voltage supply lines extend through the lower compartment of the build bay and are sealed to the bulkheads with sealing glands.

11. The additive manufacturing apparatus of claim 9, wherein the cable trays are formed in the floor panel.

12. The additive manufacturing apparatus of claim 1, wherein:
   the working surface in the build bay comprises an opening for removably receiving a build receptacle; and
   a lift system is positioned in the lower compartment of the build bay, the lift system for raising and lowering a build platform of the build receptacle when the build receptacle is positioned in the opening of the working surface of the build bay.

13. The additive manufacturing apparatus of claim 12, further comprising a build temperature sensor positioned in the build bay and oriented to detect a temperature of a surface of the build platform of the build receptacle when the build receptacle is positioned in the opening of the working surface of the build bay.

14. The additive manufacturing apparatus of claim 12, further comprising a build bay temperature sensor positioned in the lower compartment of the build bay, the build bay temperature sensor configured to detect a temperature of the lower compartment of the build bay.

15. The additive manufacturing apparatus of claim 12, further comprising a camera system oriented to capture images of a surface of the build platform of the build receptacle when the build receptacle is positioned in the opening of the working surface of the build bay.

16. The additive manufacturing apparatus of claim 1, further comprising:
    air inlets in the lower compartment of the build bay; and
    a lower exhaust system coupled to the lower compartment of the build bay, wherein air is drawn into the lower compartment of the build bay through the air inlets and exhausted out of the build bay with the lower exhaust system.

17. The additive manufacturing apparatus of claim 16, wherein the air inlets are positioned proximate a top of the lower compartment of the build bay and the lower exhaust system is coupled to the lower compartment of the build bay proximate a bottom of the lower compartment of the build bay.

18. The additive manufacturing apparatus of claim 16, wherein:
    the support chassis comprises a top panel enclosing a top of the support chassis; and
    an upper exhaust system is coupled to the top panel.

* * * * *